US012414493B2

(12) United States Patent
Rosen

(10) Patent No.: US 12,414,493 B2
(45) Date of Patent: Sep. 16, 2025

(54) RESILIENT PLANT DEVELOPMENT MEDIA

(71) Applicant: AeroFarms, Inc., Newark, NJ (US)

(72) Inventor: Mark Ira Rosen, Franklin Lakes, NJ (US)

(73) Assignee: New AeroFarms, Inc., Ringgold, VA (US)

(*) Notice: Subject to any disclaimer, the term of this patent is extended or adjusted under 35 U.S.C. 154(b) by 0 days.

(21) Appl. No.: 18/014,527

(22) PCT Filed: Jun. 30, 2021

(86) PCT No.: PCT/US2021/039908
§ 371 (c)(1),
(2) Date: Jan. 5, 2023

(87) PCT Pub. No.: WO2022/010712
PCT Pub. Date: Jan. 13, 2022

(65) Prior Publication Data
US 2023/0217852 A1    Jul. 13, 2023

Related U.S. Application Data

(60) Provisional application No. 63/163,324, filed on Mar. 19, 2021, provisional application No. 63/048,402, filed on Jul. 6, 2020.

(51) Int. Cl.
A01C 1/04      (2006.01)
A01G 24/46     (2018.01)
(Continued)

(52) U.S. Cl.
CPC .............. *A01C 1/044* (2013.01); *A01G 24/46* (2018.02); *A01G 31/00* (2013.01); *B32B 5/12* (2013.01);
(Continued)

(58) Field of Classification Search
CPC ........ A01C 1/044; A01G 24/46; A01G 31/00; B32B 5/12; B32B 2262/0207; B32B 2262/101; B32B 2410/00
See application file for complete search history.

(56) References Cited

U.S. PATENT DOCUMENTS 2,627,644 A * 2/1953 Foster ..................... D06Q 1/02
28/279
3,300,895 A    1/1967 Miroslav et al.
(Continued)

FOREIGN PATENT DOCUMENTS

CN    105142393 A    12/2015
CN    205727458 U    11/2016
(Continued)

OTHER PUBLICATIONS

Translation of JP 2000308426 A (Year: 2000).*
(Continued)

*Primary Examiner* — Peter M Poon
*Assistant Examiner* — Danielle A Clerkley
(74) *Attorney, Agent, or Firm* — McCarter & English, LLP

(57) ABSTRACT

Resilient plant development media are disclosed that can include a first layer that includes a plurality of adjacent strands, a second layer that includes a plurality of strands that are adjacent and that is in stacked relation relative to the first layer, wherein the strands of the first layer and the strands of the second layer are in a non-aligned orientation relative to each other. The strands in the first layer and the strands in the second layer may define a crisscross pattern. The multilayer resilient media is effective in supporting seeds during germination and plants throughout their growth and development. The multilayer resilient media is effective for use in various plant growing modalities, e.g., aeroponic,
(Continued)

nutrient film, and hydroponic plant growing environments, ratooning processes, and may be easily cleaned for reuse.

6 Claims, 29 Drawing Sheets

(51) Int. Cl.
*A01G 31/00* (2018.01)
*B32B 5/12* (2006.01)

(52) U.S. Cl.
CPC . *B32B 2262/0207* (2013.01); *B32B 2262/101* (2013.01); *B32B 2410/00* (2013.01)

(56) References Cited

U.S. PATENT DOCUMENTS

| | | | | |
|---|---|---|---|---|
| 3,863,388 | A | 2/1975 | Loads | |
| 4,421,439 | A * | 12/1983 | ter Burg | D03D 15/573 405/262 |
| 4,743,486 | A * | 5/1988 | Mercer | B29D 28/00 264/DIG. 81 |
| 4,960,349 | A * | 10/1990 | Willibey | E02D 29/0241 405/262 |
| 5,207,020 | A * | 5/1993 | Aslam | E02B 3/122 428/903.3 |
| 5,255,998 | A * | 10/1993 | Beretta | E02D 3/10 405/36 |
| 5,419,659 | A * | 5/1995 | Mercer | D04H 3/007 405/262 |
| 5,851,089 | A * | 12/1998 | Beretta | B29C 48/301 405/262 |
| 6,156,682 | A * | 12/2000 | Fletemier | B32B 37/226 442/164 |
| 6,295,756 | B1 * | 10/2001 | Bergevin | E01C 9/004 47/1.01 R |
| 7,470,094 | B2 | 12/2008 | Heathcott et al. | |
| 8,303,815 | B2 * | 11/2012 | Beppu | B01D 63/101 210/321.74 |
| 2005/0217173 | A1 * | 10/2005 | Walraevens | A01G 13/0268 47/56 |
| 2007/0196185 | A1 * | 8/2007 | Kohel | E02D 17/20 405/302.6 |
| 2012/0090235 | A1 * | 4/2012 | Horn | A01G 24/00 47/65.9 |
| 2017/0150688 | A1 * | 6/2017 | Wang | A01G 9/021 |

FOREIGN PATENT DOCUMENTS

| | | |
|---|---|---|
| CN | 106171882 A | 12/2016 |
| CN | 107360959 A | 11/2017 |
| JP | 2000308426 A * | 11/2000 |
| JP | 3296475 B2 | 7/2002 |
| WO | 2020005319 A1 | 1/2020 |

OTHER PUBLICATIONS

International Search Report and Written Opinion from related International Patent Application No. PCT/US2021/039908 as issued Jul. 6, 2023.
Search Report from related European Patent Application No. 21838911.2 issued Jun. 14, 2024.
Search Report from European Patent Application No. 21838911.2 issued Jun. 14, 2024.
Office Action from related Chinese Patent Application No. 202180054848.0 issued Dec. 31, 2024.

* cited by examiner

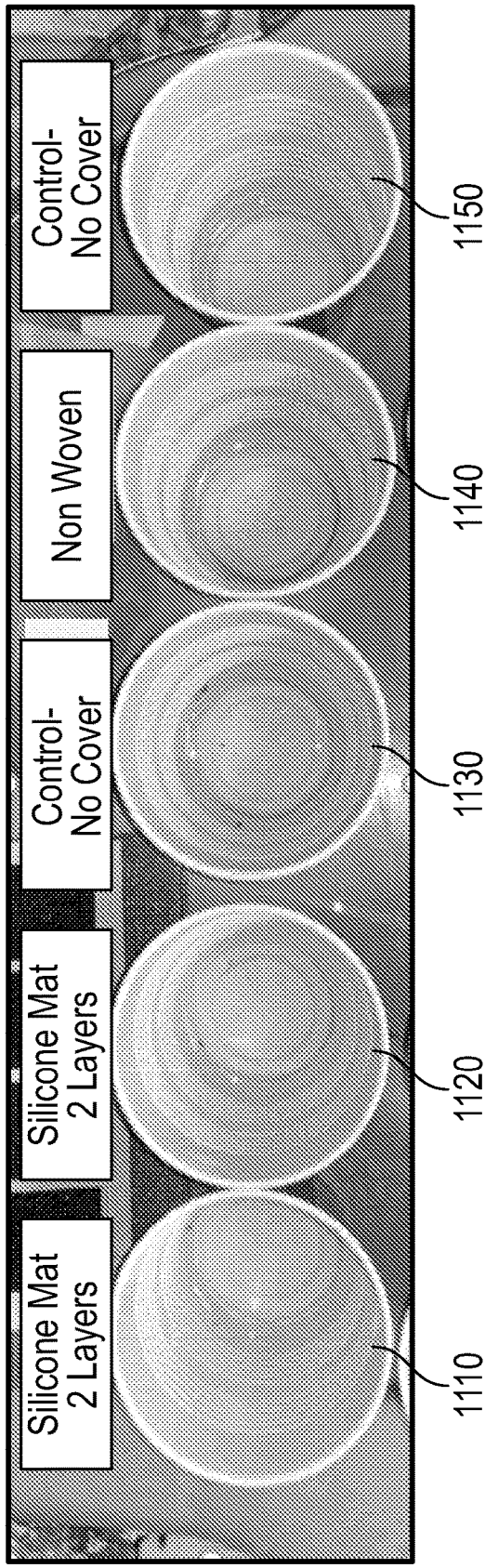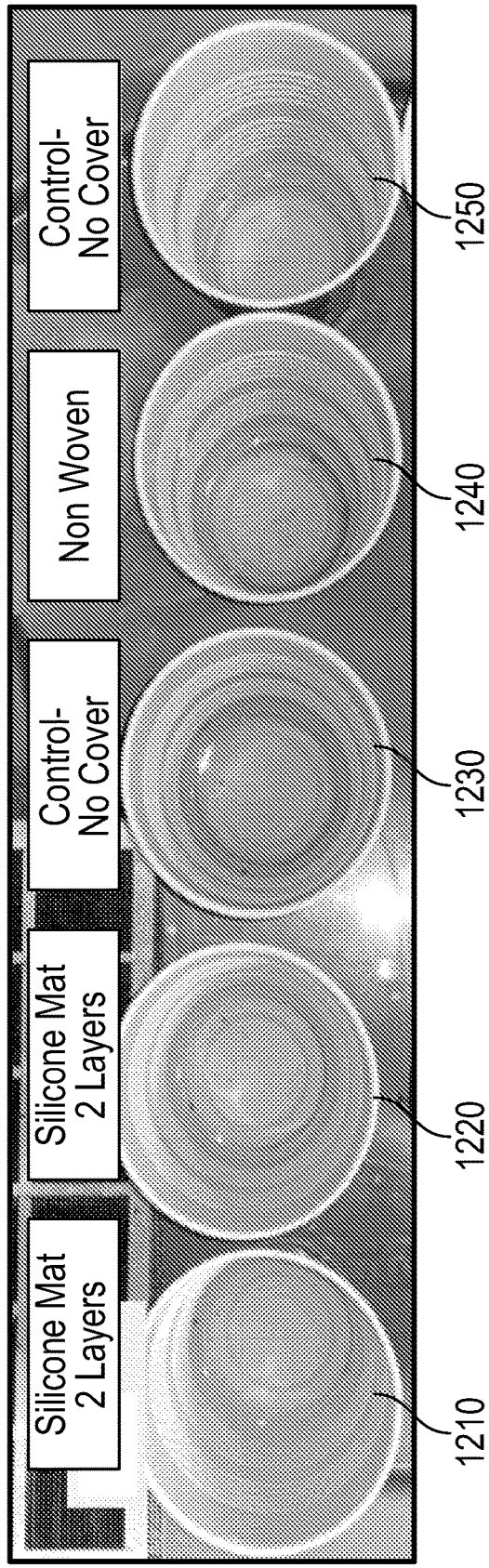

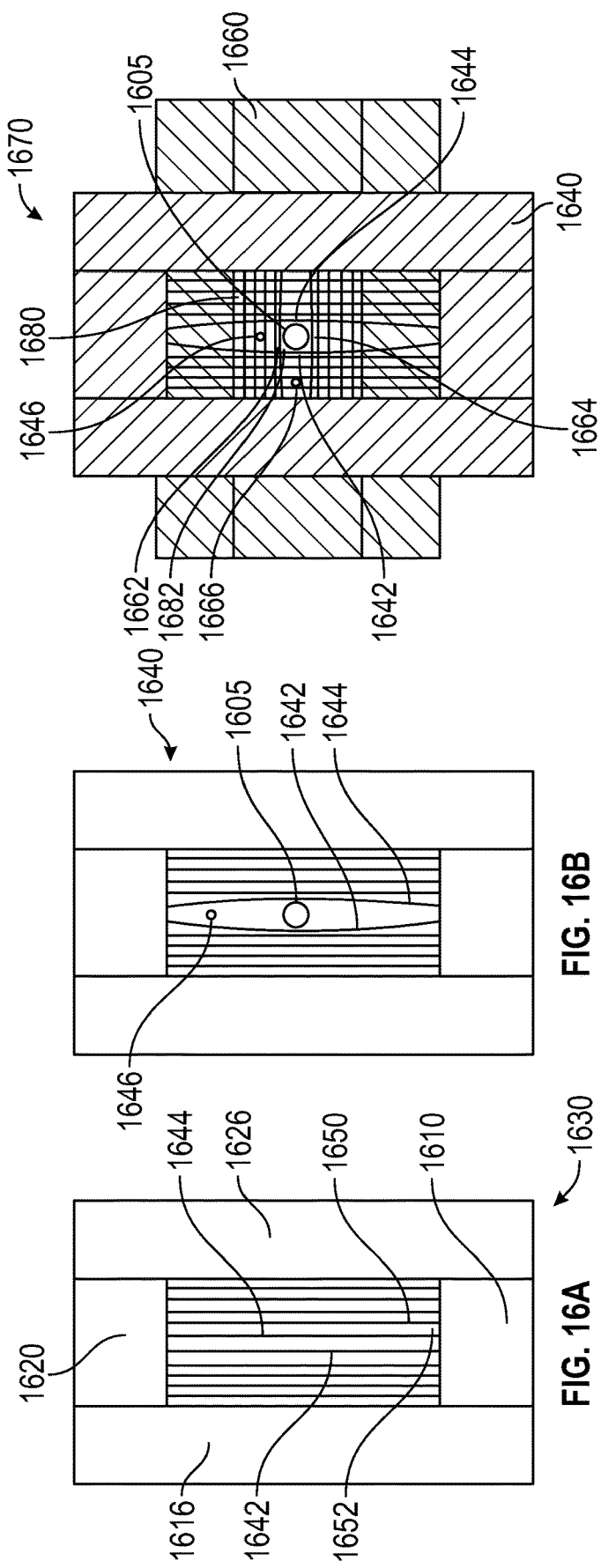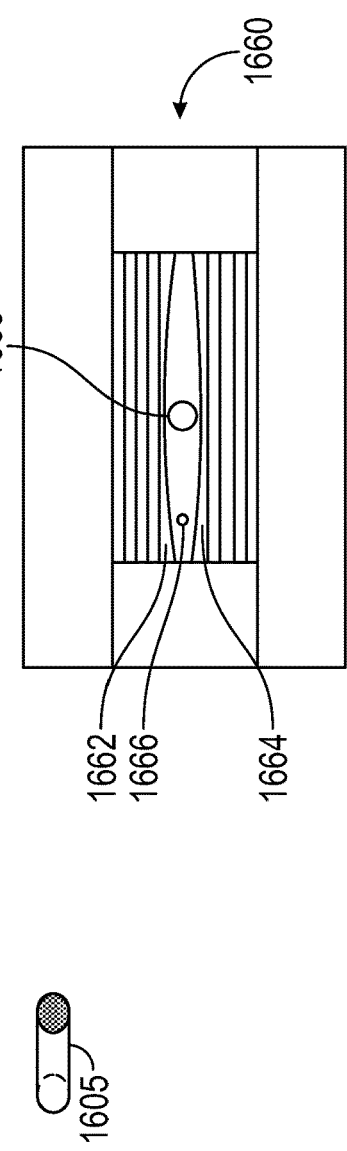

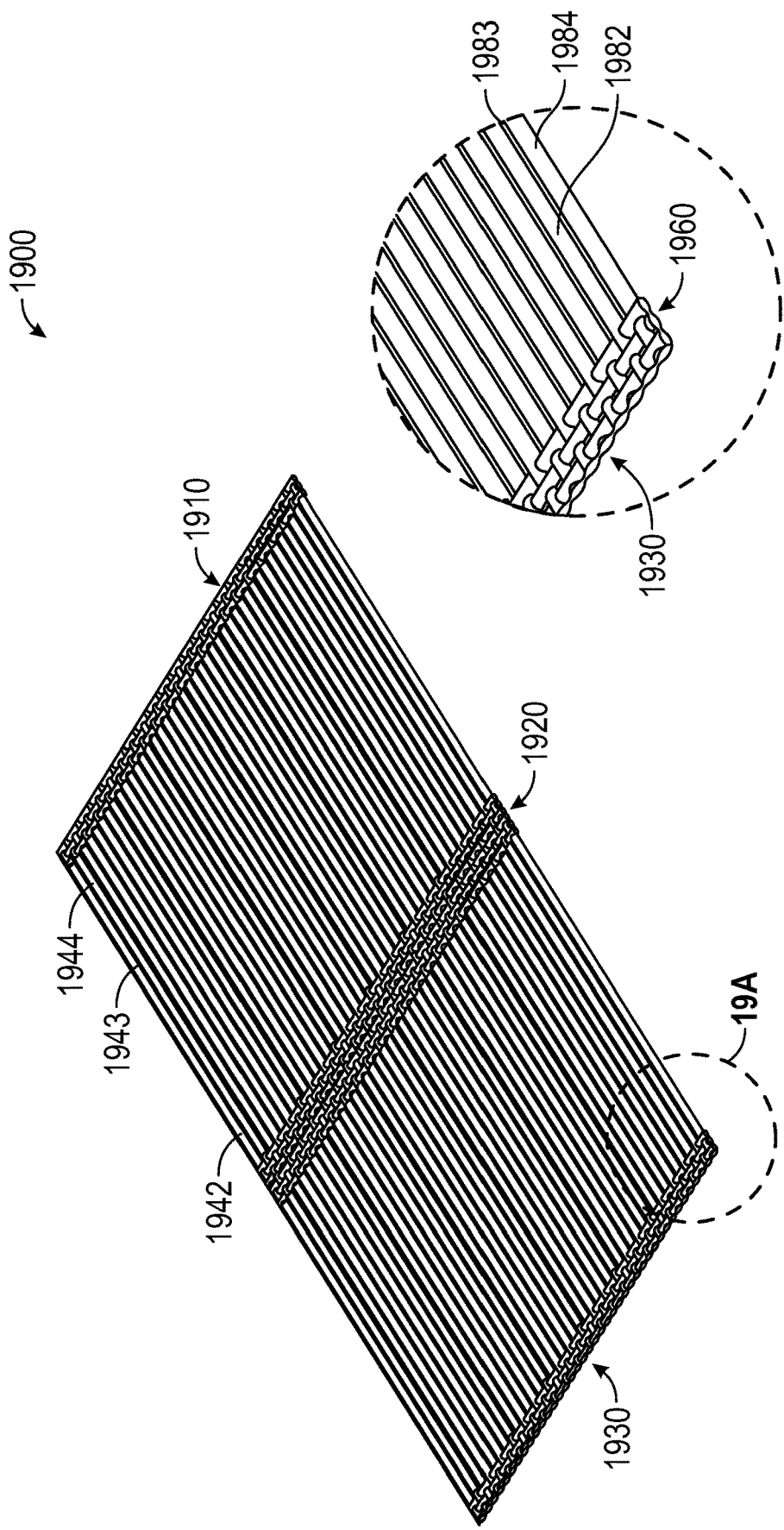

RESILIENT PLANT DEVELOPMENT MEDIA

CROSS-REFERENCE TO RELATED APPLICATIONS

This patent application is a 35 U.S.C. § 371 National Stage filing based on International Application No. PCT/US2021/039908, filed on Jun. 30, 2021, which application claims priority benefit to U.S. Provisional Patent Application No. 63/048,402, filed on Jul. 6, 2020, and U.S. Provisional Patent Application No. 63/163,324, filed on Mar. 19, 2021, the disclosures of which are incorporated herein by reference in their entireties.

TECHNICAL FIELD

Embodiments of the disclosure relate to resilient media and methods of using the media for indoor farming to germinate seeds and develop/support plants.

BACKGROUND

Indoor farms employing hydroponic or aeroponic growing techniques can utilize soilless growth media to germinate seeds on and to support developing plants. In some aeroponic farming, the soilless growth media can be a cloth mounted on a metal tray that is placed in a growth chamber where a nutrient solution is supplied to the roots from below the cloth. Light of suitable frequencies is provided to the developing plants from above the cloth.

Cloth is useful as a substrate for growing plants. It can be used to germinate seeds on its surface and can allow penetration of different plant roots from developing plants through the cloth. The cloth can be removed from the growth chamber, cleaned to remove roots, stems, and algae, and reused many times before it is recycled. Unfortunately, some roots and stems remain entangled with the cloth even after cleaning and the cloth can shrink over time making it more difficult to mount the cloth to trays as the cloths get older. Also, cloth substrates can be torn by handling requiring repair by patching and stitching which can be time consuming and costly.

Rockwool is a soilless plant development media commonly used in indoor farming that is a fibrous substrate made from inorganic materials at high temperatures. Its fibrous nature generates small particles and makes handling the material cumbersome. Once rockwool has been used to grow plants, it is difficult to remove the roots, entrained algae, and reuse the rockwool for growing other plants. High temperature and energy intensive re-melting and spinning may be used to reclaim used rockwool material.

There is a continuing need for improved soilless plant development media that are effective to support plant seeds during germination, support plants throughout the growth cycle, facilitate harvesting operations, reduce algal growth, can be cleaned and reused many times, and that, more generally, improve the overall efficiency and efficacy of indoor farming.

SUMMARY

The present disclosure provides advantageous resilient media that can be used to grow and develop plants from seeds. The resilient media can be used for multiple plant development and harvest cycles. The resilient media can be configured to have openings formed by constrained strands that can be used to develop plants. The disclosed resilient media can be used in various farming applications, including nutrient film, hydroponic, and aeroponic farming applications. Thus, the disclosed resilient media may be used in conjunction with nutrient films, hydroponic and/or aeroponic systems and assemblies and for seed germination. The disclosed resilient media is not limited to the foregoing application(s) and may be used generally in farming applications involving plants at any stage from seed germination or plant cuttings, plant growth and development, and harvesting.

Strands in embodiments of the disclosure in combination with the constraining positions provide the resilient media. The mechanical properties of the strands can range from resilient to non-resilient, or elastic to rigid respectively, and variations between these. The mechanical properties of the constraining position can range from resilient to non-resilient, or elastic to rigid respectively, and variations between these.

The plurality of strands of resilient media can be generally fixed or constrained in a first position or region and in a second position or region that can be spaced relative to each other. In some embodiments the plurality of strands can be generally fixed or constrained at first and second positions that can be spaced relative to each other. The strands may be fixed/constrained at additional regions and/or position(s) beyond the first/second positions or regions, e.g., outward of the first region or position, outward of the second region or position, or both. A length of each of the strands can span between the first/second constraining regions or positions and can generally be adapted for lateral bowing/arching of the strands relative to each other to create greater spacing as compared to the opening between strands in the absence of such bowing/arching. Spacing of the constraining regions or supports for the strands can permit enough free length of strands to bow/arch that can produce a larger opening between the strands. The noted lateral bowing/arching of the strands of resilient media to form an opening may be prompted, for example, by the growth of plants and/or the passage of roots through the openings defined between strands.

In some embodiments, the resilient media of the disclosure can include two or more layers that together can form a multilayer resilient media. Each of the layers or sheets of resilient media in the multilayer structure can include a plurality of strands that can be positioned relative to each other and can define openings and/or elongated open spaces therebetween. The strands in a layer or sheet of resilient media can be generally fixed or constrained at first and second regions or positions that can be spaced relative to each other. The strands may be fixed/constrained at additional regions or position(s) beyond the first/second regions or positions, e.g., outward of the first region or position, outward of the second region or position, or both. A length of each of the strands can span between the first/second regions or positions and is generally adapted for lateral bowing/arching relative to other strands to create greater spacing as compared to the spacing of adjacent strands in a layer in the absence of such bowing/arching. The strands can generally bend or arch in any direction with the application of a force. The noted lateral bowing/arching of strands generally within a layer may be prompted, for example, by the growth of plants and/or the passage of roots through the elongated opening defined within the layer. The layers of resilient media of the present disclosure can be generally positioned adjacent one another. In some embodiments the layers of resilient media can generally be positioned one above the other. The resilient media of the present disclosure may include two or more layers that can be stacked one on top of the other. The strands in each layer can move independently of strands in the same layer and can move independently of strands in adjacent layers, such movement occurring for each of the strands in the regions between the constraining first/second positions. The elongated openings in each layer of the multilayer media can combine to effectively create a plurality of openings or passages from a first layer through an adjacent layer. For multilayer resilient media in embodiments of the disclosure, the elongated openings in each layer of the multilayer resilient media can be larger than the combine opening formed through adjacent layers.

The strands in each layer or sheet of resilient media in combination with the constraining regions, can allow the strands to be separated from each other anywhere along their length and can create flexible and resilient openings and passages through the media that can accommodate roots, shoots, and combinations of these. The flexible and resilient openings and passages through the media that can facilitate the penetration of roots and stems during plant development can also facilitate the removal, of roots, shoots, or both from the media during cleaning. In multilayer embodiments, strands of one layer can at least partially cover openings and/or strands in adjacent or non-adjacent layers. In some embodiments the strands in one layer can for example be parallel to strands in an adjacent layer and can be positioned over the openings between the strands in the adjacent layer. In other embodiments the strands of one layer can at least partially cross over strands in adjacent or non-adjacent layers. The crisscrossing of strands in adjacent layers can reduce or close up openings formed by the growth of the plant and can mechanically anchor the plants with the resilient media.

In some embodiments strands of one layer can at least cross over strands and/or elongated openings formed by strands in an adjacent layer. In some embodiments of the disclosure adjacent layers can be oriented relative to each other such that an axis defined by the openings or strands of a first layer can be generally non-aligned relative to an axis defined by the openings or strands of a second layer. The non-alignment of the axes of the openings or strands of first and second adjacent layers may range from 5 degrees to 90 degrees (5° to 90°) and can be generally between 45° and 90°. In some embodiments the non-alignment of the axes of elongated openings or strands of first and second adjacent layers may range from 5° to 90°, and can be generally between 45° and 90°. Multilayer seed germination and development media in embodiments of the disclosure that include strands in a first layer that cross over openings and/or cross over strands of an adjacent second layer can be beneficial because the strands in the adjacent layers can more evenly support vertical arching or bending of strands in the adjacent layer (compared to parallel elongated openings of parallel strands) and reduce vertical bowing/arching of the strands in both layers while still allowing lateral bowing/arching of the strands in the plane of each of the layers to accommodate penetration and/or removal of roots, shoots, and combination of these from the resilient media. Strands that cross over openings and/or cross over strands of an adjacent layer with an angle closer to 90°, for example between 45° and 90°, can better support adjacent layer strands compared to adjacent layer strands that are aligned (parallel) or nearly parallel, e.g., aligned <5° to each other. Reduced vertical bowing or sagging of the strands in layers can beneficially reduce nutrient puddling and drowning of seeds that can happen with cloth and fabric substrates.

Having a resilient media which stays flat can be beneficial when the media is used for plant development. For example, during harvest with a horizontal cutting saw blade, a flat grow surface allows for closer cuts with respect to the substrate and improvements in efficiency of the cutting and improvements in harvest yields. Also, in aeroponic grow systems, plant roots tend to bind up on the growth frame under the grow media. This can make cleaning more difficult. If the growth media can resist sagging, then the growth frame can have fewer support members with greater spacing and larger gaps. Strands between constraining regions that can span larger gaps without sagging can be used with such open support frames and can provide fewer locations for the roots to bind up with the frame. Strands making up a layer and strands from adjacent layers can cooperate to support and distribute the weight of developing plants on the resilient media. The resilient media can improve plant harvesting, shoot system and root removal, and may be easily cleaned for reuse.

The resilient media in some embodiments of the disclosure can have two or more layers where the openings and strands in the layers can be separately positioned to form one or more tortuous paths between a top layer and a bottom layer. The two layers can be freely separable from each other. The resilient media in some other embodiments of the disclosure can have two or more layers where the regularly sized openings and regularly spaced strands in the layers can be positioned to form one or more tortuous paths between a top layer and a bottom layer. Multiple layers of resilient media can result in a more tortuous path through the media which can help reduce water vapor losses and can improve light blocking. For example, the size of the openings, strand width, and axis defined by the openings or strands of the first layer may be oriented at an angle relative to the size of the openings, strand width and axis defined by the openings or strands of a second layer, and the size of the openings, strand width, and axis defined by the openings of a third layer may be chosen and oriented at an angle relative to the axis defined by the openings or strands of the first layer to form one or more tortuous paths. The angles defined between the axis of the openings or strands of the first layer and the second layer may range from 5° to 90° (e.g., 45° to 90°), and the angles defined between the axis of the elongated openings or strands of the second layer and the third layer may range from 5° to 90° (e.g., 45° to 90°). The angle of the axes of the openings or strands of the first layer and the axes of the openings or strands of the third layer may be aligned or parallel, and the openings for the first and third layer can be off set to form a tortuous path. Thus, the strands of adjacent/stacked layers can crisscross each other, rather than being aligned. In some embodiments of the resilient media in embodiments of the disclosure, the crisscrossed strands of adjacent/stacked layers can define a tortuous path from top-to-bottom. Resilient multilayer media having tortuous paths can be beneficial in indoor vertical farming by reducing light penetration to nutrient solutions below the resilient media and for reducing overspray when the media are used in an aeroponic grow chamber.

Embodiments of the disclosure can include methods of developing plants on resilient media and harvesting the developing plants at a desired stage of growth. The resilient media can include a layer of resilient strands that can have or can form resilient and flexible openings between the strands. In some embodiments of the disclosure the unconstrained length of strand between constraining regions can be at least five times the spacing between adjacent strands at or near the constraining region. In some embodiments of the disclosure, the resilient media can include one or more layers, or two or more layers, having resilient strands that can form such openings.

Some embodiments of methods of developing plants on the resilient media can optionally include the act or step of removing a top or outside layer of the resilient media after a first harvest and re-growing or re-developing the remaining stems and secondary leaves supported by remaining adjacent layer(s) of resilient media for a subsequent harvest or crop. The top layer of the multilayer resilient media that is removed can have plant debris thereon from the harvest. Multiple cycles of harvesting, removing an outside layer of resilient media, and re-growing the remaining stems and secondary leaves supported on an adjacent layer can be performed. For high density plantings on a substrate, removal of the outside layer after each harvest can be very beneficial in capturing debris from the harvest and preventing the debris from accumulating on the outer resilient media layer and contributing to algae, rot, or mold.

For indoor vertical farming or factory farming, the resilient media in embodiments of the disclosure for developing plants can be beneficial because the media can support plant development including seed germination and plant growth, the media can reduce or eliminate algae growth, the media can benefit harvesting by providing a flat and supportive surface, and the resilient media can be cleaned easily for reuse.

In the germination phase of plant development, the resilient media can beneficially retain water on its surface, retain water between strands, and retain water between strands from different surfaces in multilayer configurations. In various embodiments water can be retained for up to 3 days or longer to trigger seeds to germinate. Typically, germination is done in a sealed or wrapped environment to prevent water evaporation and create conditions for germination. The resilient media can be highly porous yet sufficiently thin to allow for good root penetration by the end of germination. The one of more layers of resilient media can provide, or cooperate with adjacent layers, to reduce puddling on the media top surface during germination. Once the seeds have germinated and the resilient media can be placed in a growth chamber, the good root penetration through the media allows easy access of the roots to nutrient solutions from spray nozzles, nutrient thin films, or hydroponic reservoirs. The resilient media in embodiments of the disclosure can have strand cross section and strand spacing that can provide openings that support seed germination from different size seeds (from tiny watercress sized seeds to pumpkin sized seeds, or larger sized seeds) without the seeds becoming submerged in water (drowning) or falling through the media which helps reduce costs and increase overall yields. The resilient media in embodiments of the disclosure can have strand cross section and strand spacing that can, in addition to supporting seeds for germination, provide openings that can support tray plants, rhizomes, root cuttings and other germplasm without these becoming submerged in water (drowning) or falling thru the media which helps reduce costs and increase overall yields. The flexible and resilient openings of the resilient media in embodiments of the disclosure are an advantage during germination over molded sprouting trays with fixed sized openings because different fixed sized mesh openings would be needed for different seed sizes (smaller seeds would pass thru a larger mesh size) increasing costs and inventory requirements for different sprouting trays. Fixed sized openings of molded sprouting tray meshes also result in high water vapor loss, greater air conditioning energy costs for an indoor farm, and allows light to pass thru the larger mesh openings which can promotes algae growth.

Advantageously the resilient media in embodiments of the disclosure can act as a barrier during the plant growth phase and can stay drier on the top surface compared to lower media surfaces nearer the nutrient supply. The resilient media is a soilless growth media that can reduce water vapor loss thereby reducing indoor heating and cooling costs compared to other soilless growth media like cloth or rockwool. During growth and development of the seedlings, the water previously on the upper surface of the resilient media in embodiments of the disclosure can evaporate, and the upper surface can become drier. A drier resilient media top surface can lead to a reduction in algae and the like on the top surface of the media during plant development. The presence of mold, algae, or other biofilms on the top surface of cloth soilless growth media can hinder undergrowth of the plants, result in more difficult cleaning of the media, and possibly contribute to higher likelihood of plant diseases, mold, and odors. The resilient media in embodiments of the disclosure can act as a barrier to reduce light penetration into nutrient solutions near the plant roots that cause algal formation in the solutions. The barrier properties of the resilient media can also prevent leakage of aeroponic spray from the nozzle and through the resilient media onto the undergrowth and lower leaves of the plants on the top light facing surface and reduce "burning" of the leaves and stunting of the plant growth. The adjacency of strands and ability to block openings in other layers also reduces evaporative water vapor loss during plant development in a growth chamber and can beneficially reduce energy requirements to dehumidify the air to maintain a proper humidity level in an indoor farm for strong plant growth. The one of more layers of resilient media can provide, or cooperate with adjacent layers to provide, good plant support during growth.

The resilient media advantageously remains flat during harvest which can allow for the even cutting of the plants at harvest using an automated cutting blade and can maximize harvest yields. The flat resilient media can also enable a second lower cutting of the stems with a second pass of the cutting blade set close to the growth media which can be difficult for cloth due to its unevenness and tendency to droop in unsupported areas. The resilient media is reusable and can be cleaned before reuse. The flexible and resilient openings formed between strands can support plants during growth but can allow for removal of stems and roots after harvesting. This cleaning process can be done with high pressure water which can provide sufficient force to separate the strands and remove the roots and stems. Compared to a mat with fixed sized openings or cloth with small inflexible openings which can become plugged when stems and roots grow larger than the openings and become locked in the openings, the resilient media cleans more easily because of the flexible and resilient openings. The ease of cleaning the resilient media when used for plant development can reduce the number of high-pressure water cleaning treatments, reduce damage to the media, and decrease water use and cleaning time.

Additional features, functions, and benefits of the disclosed resilient media of the disclosure will be apparent from the description which follows.

BRIEF DESCRIPTION OF THE DRAWINGS

A more complete understanding of the present disclosure and the advantages thereof may be acquired by referring to the following description, taken in conjunction with the accompanying drawings in which like reference numbers indicate like features and wherein:

FIG. 11 illustrates algae growth test results after 4 days;

FIG. 12 illustrates algae growth test results after 7 days;

FIGS. 16A-D further illustrate openings in two layers of resilient media and the partial overlap of strands from each layer with openings in the adjacent layer that occurs when the layers are combined;

FIG. 19 illustrates a resilient media including strands separated by woven constrained regions, and FIG. 19A is a detail of the resilient media of FIG. 19.

DETAILED DESCRIPTION

Figure 1A:
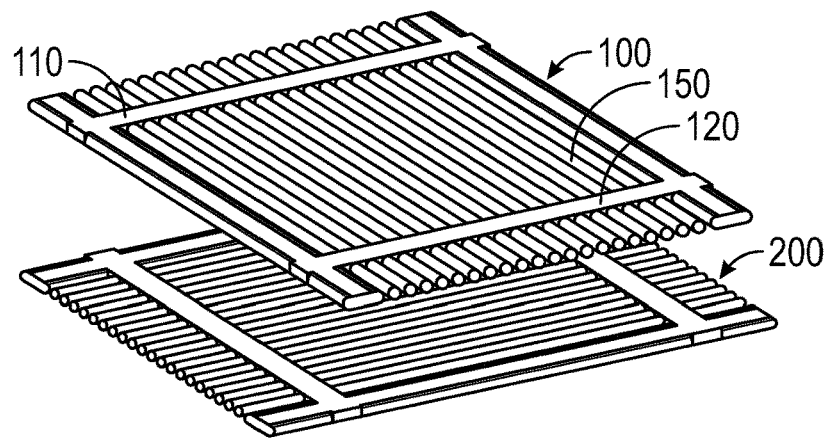
FIGS. 1A-1C illustrate a resilient media of the present disclosure.

In the following description, it is understood that terms such as "top," "bottom," "outward," "inward," and the like are words of convenience and are not to be construed as limiting terms. Reference will now be made in detail to embodiments of the disclosure, which are illustrated in the accompanying figures and examples. Referring to the drawings in general, it will be understood that the illustrations are for the purpose of describing particular embodiments of the disclosure and are not intended to limit the same.

Whenever a particular embodiment of the disclosure is to comprise or consist of at least one element of a group and combinations thereof, it is understood that the embodiment may comprise or consist of any of the elements of the group, either individually or in combination with any of the other elements of that group. These, and other, aspects of the embodiments will be better appreciated and understood when considered in conjunction with the description and the accompanying drawings. The description, while indicating various embodiments and numerous specific details thereof, is given by way of illustration and not of limitation. Many substitutions, modifications, additions, or rearrangements may be made within the scope of the various embodiments, and the disclosure includes all such substitutions, modifications, additions, or rearrangements.

In embodiments of the disclosure, the term "developing plant(s)" can refer to one or more germinating seeds, one or more seedlings with or without true leaves, one or more growing plants, or any combination of these that may be on a generally top surface of a resilient media. Plants can be developed from seeds into seedlings, and the seedlings grown into plants until harvested.

Nutrient solution in embodiments of the disclosure generally refers to a solution that is used to provide one or more of water, metal ions like potassium, sodium, copper, magnesium, sources of nitrogen, phosphorous, and sulfur and other dissolved nutrients to the roots of the developing plants.

Embodiments of the disclosure are directed to resilient media that can be reused multiple times in nutrient thin film, aeroponic, and hydroponic growth chambers. Resilient materials in embodiments of the disclosure refer to those materials that can have fixed strand constraining regions and separable adjacent strands spanning between the constraining regions. The separable strands can form flexible openings between the constraining regions. In some embodiments the separable strands can form flexible elongated openings between the constraining regions. Strands of the resilient materials between the constraining regions that have been separated by plant roots or stems can return back to substantially their original position in the absence of the roots or stems. The resilient materials can recoil or spring back into shape after bending, stretching, or being compressed. The resilient media are not permanently deformed by their use or reuse and the resilient media can substantially revert back to their original shape after plant development, harvesting, and cleaning. These seed germination and plant development resilient media hold their shape after cleaning and do not need to be stretched or held on a supporting tray like cloth soilless growth media. The resilient materials in embodiments of the disclosure can have a good combination of strength and drainage when wet with nutrient solution, can resist sagging, and can resist the formation of puddles. Puddle formation is undesirable and can happen with cloth growth media which can contribute to drowning of germinating seeds and algal growth on cloth growth media.

A layer of the resilient media in embodiments of the disclosure can include a plurality of adjacent strands as illustrated in FIGS. 1A-C, FIG. 2A, and FIG. 8A. The adjacent strands can be spaced apart, the spaced strands can be touching, or the adjacent strands can be touching in some parts and spaced in other parts across their length. In some embodiments, each layer of resilient media can include a plurality of adjacent strands. Although the present disclosure refers to adjacent "strands", the term "strands" may also refer to webs, ribbons, rods, ropes, cords, and the like between constraining regions. Regardless of the term used, each of the above referenced structures defines an elongated element that extends from a first end to a second end and, in combination, the plurality of adjacent structures, spaced structures, and/or substantially parallel spaced structures, define along with the constraining regions, a layer of the disclosed reusable multilayer media.

Figure 3B:
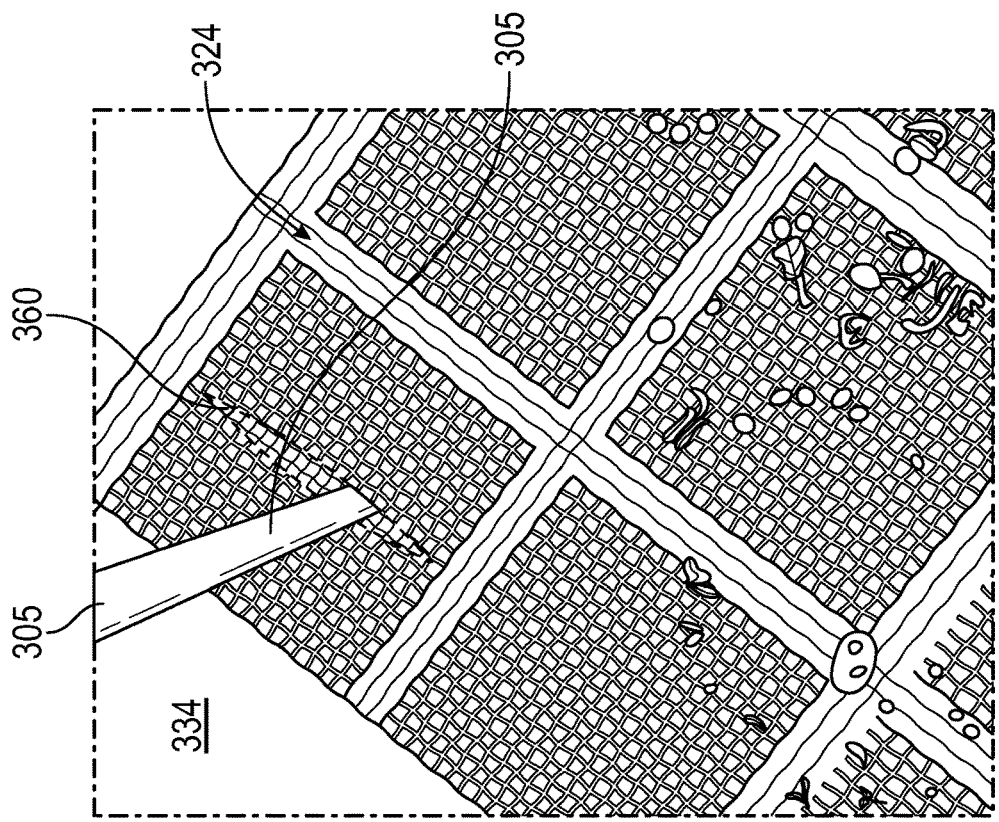
FIGS. 3A-C illustrate various aspects of two layers of a resilient media that can be used for germinating seeds and developing plants.
Figure 3A:
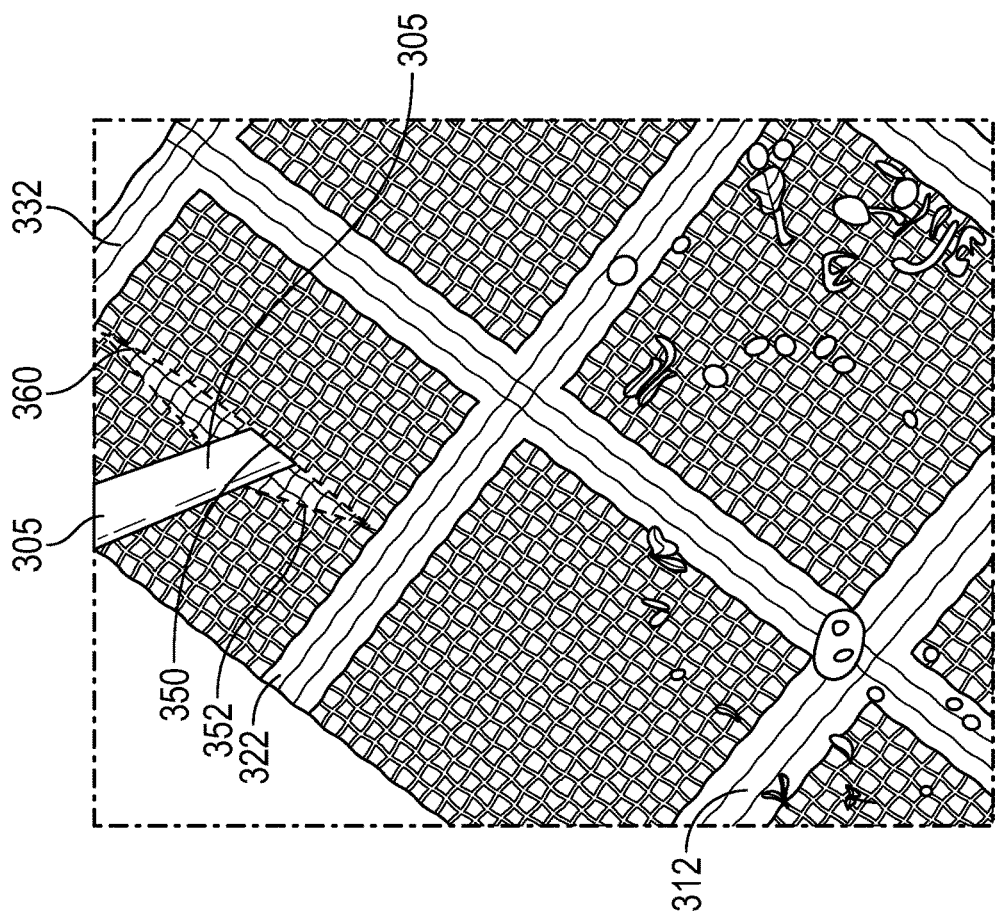

The strands in a layer of a resilient media can be constrained at least at a fixed first position or region and at a second fixed position or region spaced from the first position or region. A length of each of the strands can span between or span across these two positions or regions. The strands that span between these positions or regions can terminate in these constraining positions or regions, or the strands can pass through the constraining region as shown for example in FIGS. 3A-C and FIGS. 8A-D. Constraining regions can also optionally be formed at one or more of the perimeter edges of strands or a layer of strands. The perimeter constraining regions can be parallel with the long axis of the strands and can overlap with constraining regions or positions that cross the strands as shown in FIG. 3B and FIG. 8B. In FIGS. 3A-B for example, the perimeter constraining regions 324 and 334 can intersect with the fixed position of constraining regions 322 and 332 spanned by the strand 350.

Although the present disclosure refers to strands constrained at a "position", the term position can also refer to a region or area of the resilient media where the strands can be held. Regardless of the term used, each refers to a point or area in the resilient media where the strands can be constrained. The terms "position" or "region" in reference to constraint of the strands can be used interchangeably in the specification and claims. Individual strands in a layer may be constrained at first positions and can be contained in a plane or slab that can be perpendicular to axes defined by the strands, or two or more of the individual strands may be constrained at first positions that are not aligned in a plane that can be perpendicular to axes defined by the strands. In some embodiments individual strands in a layer may be constrained at first positions and can be contained in a plane or slab that can be parallel to a longitudinal axes defined by the strands. Similarly, the individual strands in a layer may be constrained at second positions and can be contained in a plane or slab that may be perpendicular to axes defined by the strands, or two or more of the individual strands may be constrained at second positions that may not be aligned in a plane perpendicular to axes defined by the strands. In some embodiments individual strands in a layer may be constrained at second positions and can be contained in a plane or slab that can be parallel to a longitudinal axes defined by the strands. The strands can be constrained at multiple positions across or along their lengths, i.e., they may be constrained at the first position and at the second position, as well as one or more intermediate positions and/or one or more positions that are axially beyond either the first position or axially beyond the second position, or both. The constrained strand regions and optional constrained perimeter regions can form a layer, slab or sheet. In embodiments of the disclosure, each layer of constrained strands can be handled separately from other layers. In other embodiments of the disclosure, two or more layers of constrained strands may be joined relative to each other, either fixedly or detachably, such that when in a joined configuration, the two or more layers of constrained strands define a subassembly that can be handled as a unit. In some embodiments the media may have mechanical anchors of a given diameter securing the media to a support tray.

In embodiments of the disclosure, the strands that make up a layer of constrained strands exhibit sufficient rigidity/strength to span the distance from the first constrained position to the second constrained position without substantial sagging or downward deflection of the strands. Support directly below the span of the strands can be optional and not required. However, the strands that make up each layer of constrained strands exhibit sufficient flexibility that lateral deflection or arching/bowing is permitted to separate portions of strands, such that as a seed germinates and roots extend downward between adjacent strands, an arching/bowing of the side-by-side strands (in opposite directions) may occur to accommodate passage of the root, increase in diameter of the plant's stem and any other plant-related developments associated with plant growth.

Figure 3C:
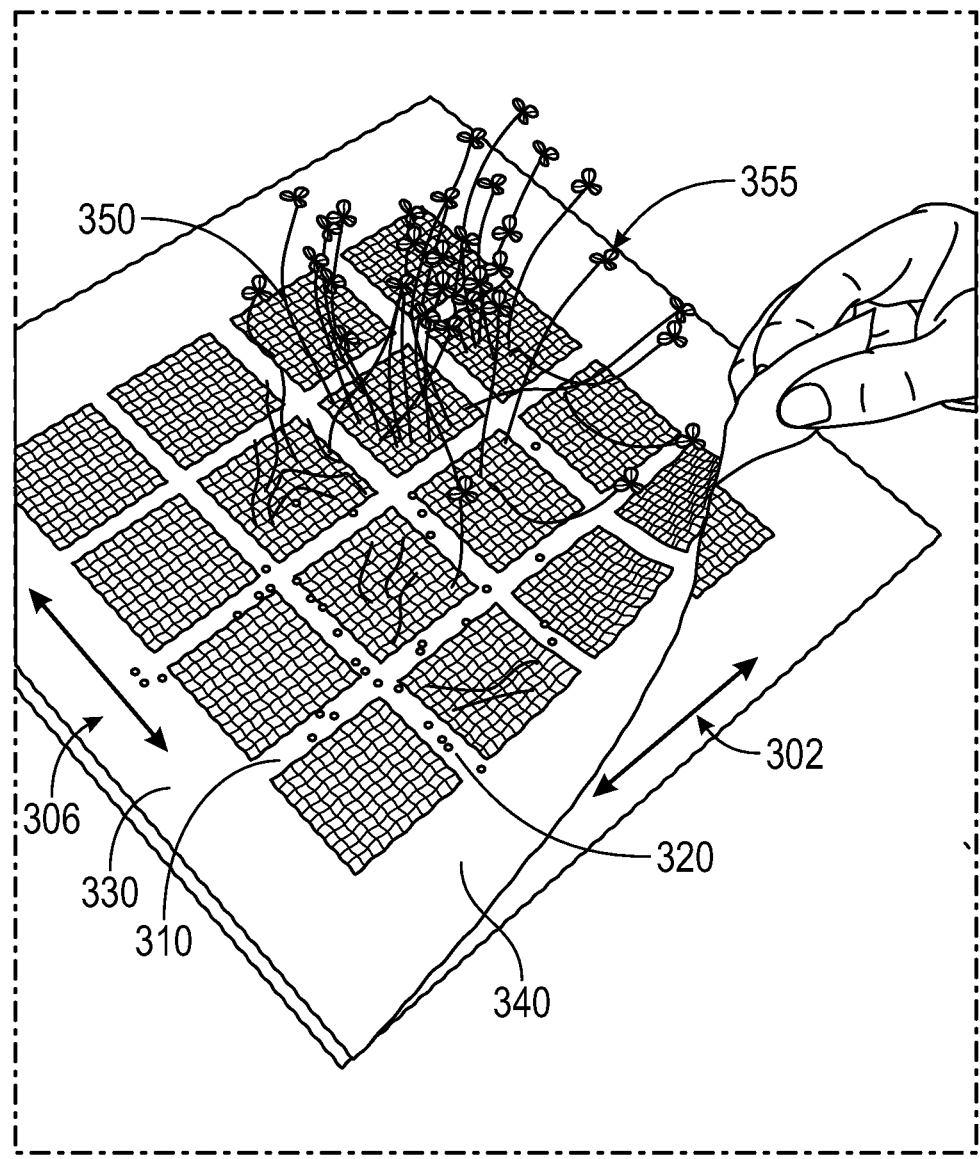

In embodiments of the disclosure, the strands that make up a layer can be flexible and a layer including the strands can be rolled and unrolled, thereby exhibiting an ability to move between a planar or substantially planar orientation and a non-planar orientation, e.g., a rolled or folded orientation. An example of this property of the resilient media is illustrated in FIG. 3C where the top layer is partially rolled or bent relative to the bottom layer. The layers may individually assume a non-planar orientation, or they may be in a side-by-side configuration as they together assume a non-planar orientation. Thus, in embodiments of the disclosure, multiple layers made up of constraining regions and strands may be rolled up together, e.g., into a substantially cylindrical configuration. Such a roll can be unrolled on a support frame to position the resilient media layers on the frame. In a layer of the media, the plurality of strands can be positioned in close, side-by-side proximity to one another along their length and between the constraining positions. The strands can be touching along their length (in whole or in part) or separated/spaced from each other. In embodiments where the strands are separated/spaced from each other along their lengths (between the constraining positions), the space between the separated/spaced strands can define an opening, a flexible opening, a flexible elongated opening, and combinations of these, that extends from the first constrained position to the second constrained position.

Figure 2A:
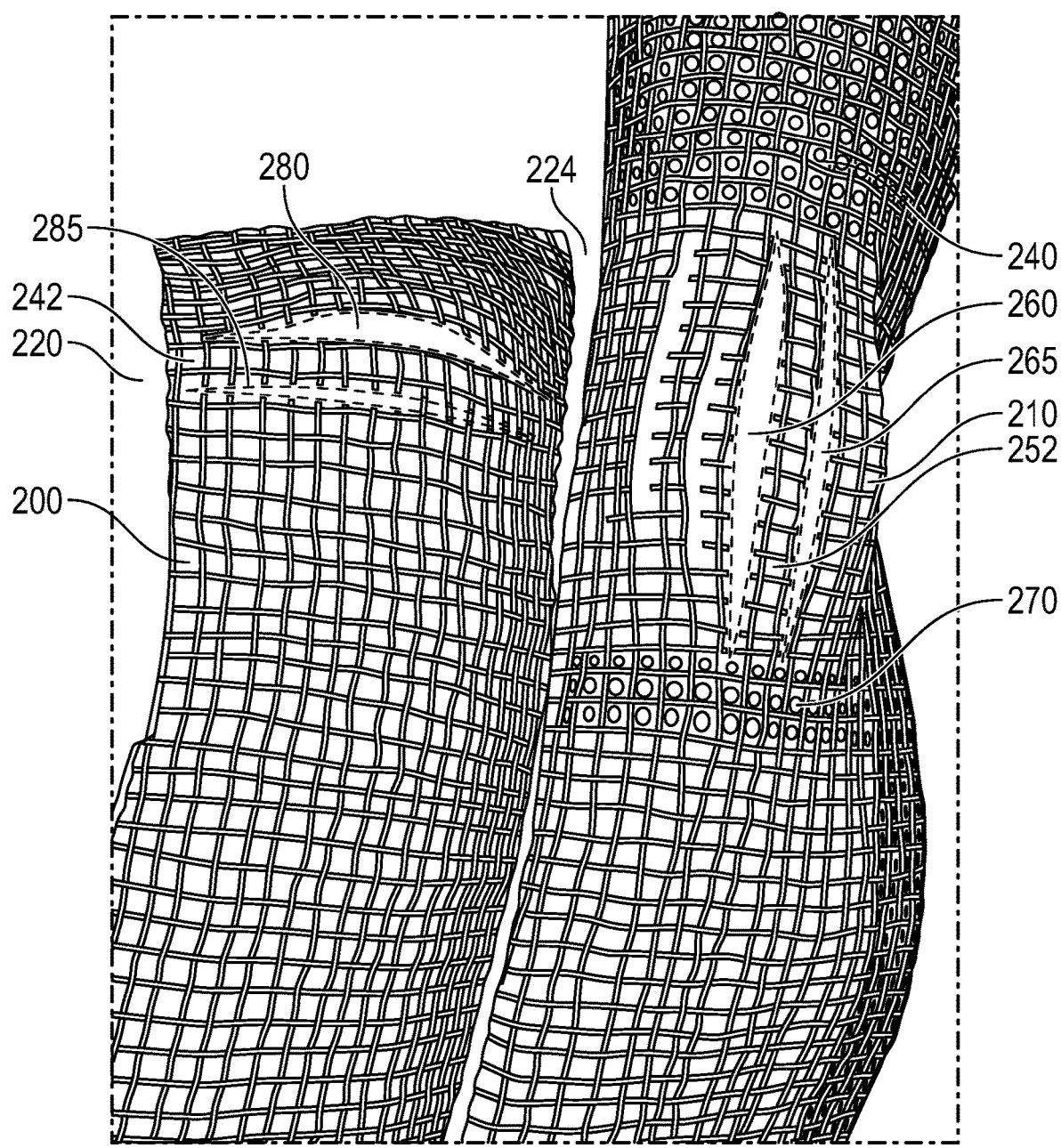
FIGS. 2A-B illustrate various aspects of two layers of a resilient media used for germinating seeds and developing plants.
Figure 8A:
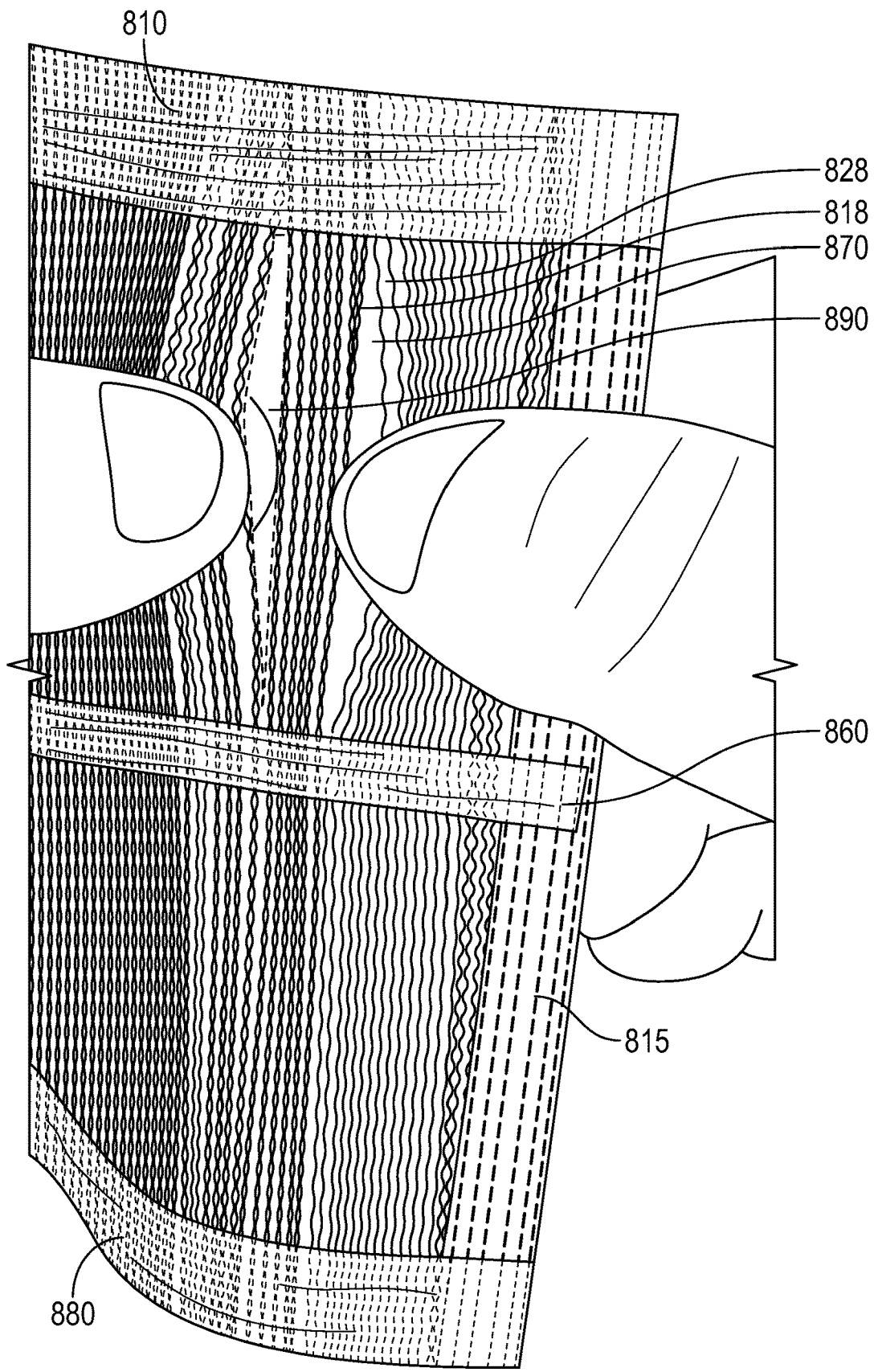
FIGS. 8A-E sequentially illustrate a resilient media with adjacent strands, openings formed by separating or laterally bending/arching strands, resilient constraining regions, and the resilient media in stretched and relaxed states.
Figure 8B:
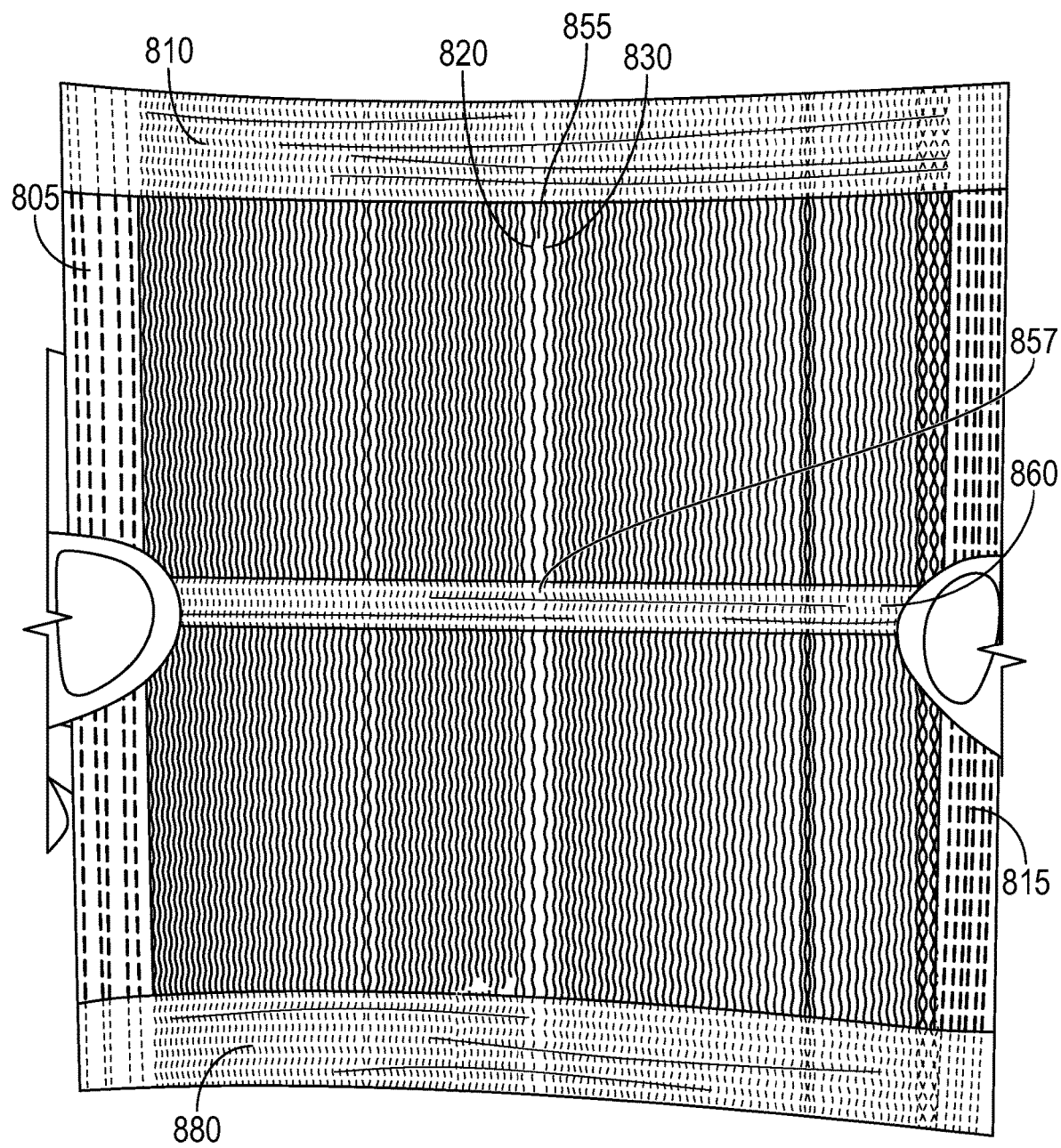

Adjacent strands in an unstretched state, or adjacent strands in a laterally bent/stretched state, can have openings between the strands approximating shapes such as rectangles, rhombuses, slits, and the like; the openings can also have irregular shapes that can vary in dimension as illustrated by openings 260 and 280 in FIG. 2A, opening 890 in FIG. 8A, and opening 855 in FIG. 8B. The openings may be defined at the time the layer is fabricated, i.e., a plurality of strands may be formed in a side-by-side/spaced arrangement and constrained at first and second positions (and potentially additional constraining positions), the openings can be formed by separating adjacent strands, or the openings can be formed by a combination of these (e.g., separating initially spaced strands).

In some embodiments of the disclosure, the resilient media can have more than one layer, for example a first layer, a second layer, a third layer, and so on. For example, as illustrated in FIG. 1A and FIG. 16D, a multilayer resilient media can include a first layer that can have a plurality of adjacent strands having an initial orientation, the strands constrained at two or more separate positions across or along a length of the strands. The multilayer resilient media can include a second layer that can have a plurality of adjacent strands having an initial orientation, the strands constrained at two or more separate positions. The second layer can be in a stacked relation relative to the first layer. One or more of the strands in any layer can be resilient. Each of the layers can optionally have perimeter constraining regions. The strands of the first layer and the strands of the second layer can be in a non-aligned orientation relative to each other. In some embodiments of the disclosure, the plurality of adjacent strands in at least one of the first layer or the second layer can be in a spaced or a side-by-side relation, the spaced strands can define openings between adjacent strands. Some embodiments of the resilient multilayer media can have enlarged openings between one or more of the adjacent strands in at least one of the first layer, the second layer, or both, wherein the openings can include strands deflected or arched laterally from their initial orientation. In embodiments of the disclosure, the strands of the resilient media can be continuous, without gaps or breaks, between constraining regions. Continuous strands between constraining regions or positions can be advantageous for resilient media because they can support seeds and plants across their length and increase the available area for developing plants. In embodiments of the multilayer resilient media the strands can be continuously smooth, the strands can be wavy or undulating, or the strands can have texture selected from the group consisting of nubs, appendages, openings within portions of the strands, or any combinations of these. In embodiments of the multilayer resilient media the strands are flexible and can be continuously smooth or the flexible strands, can be wavy or undulating, or can have texture selected from the group consisting of nubs, appendages, openings within portions of the strands, or any combinations of these. The size of openings in one layer of a multilayer media with such strands can be the same or different from the size of openings in adjacent layers.

Figure 14B:
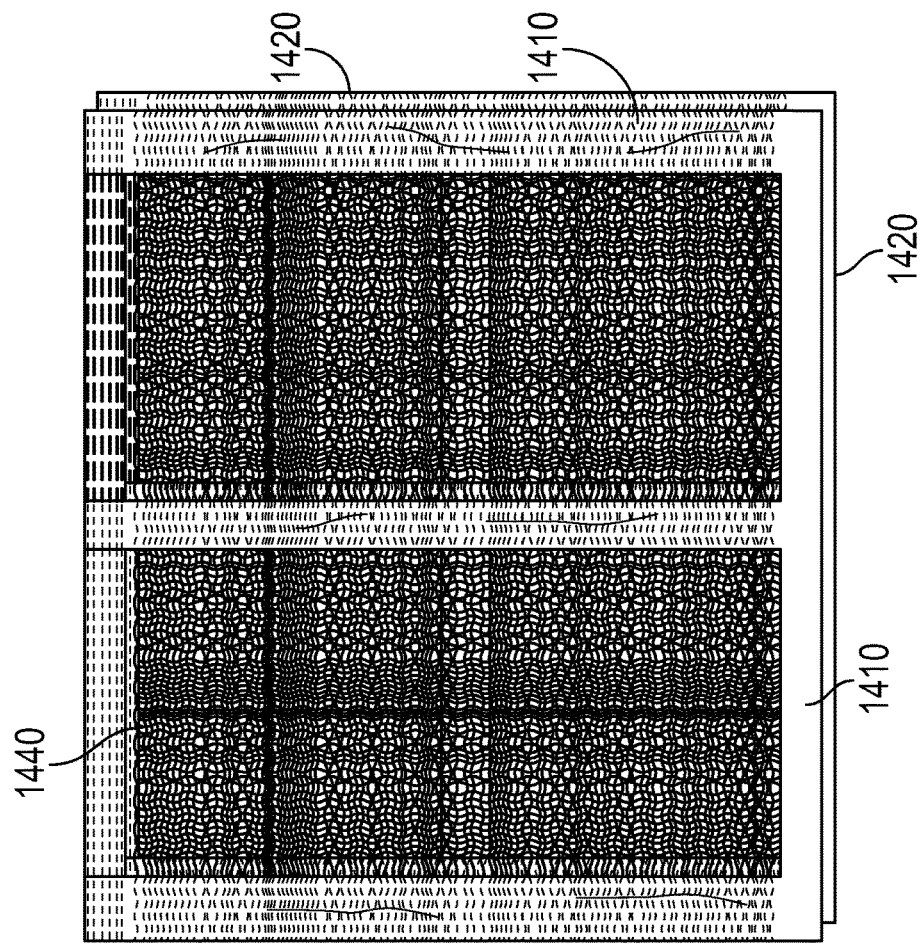
FIG. 14B illustrate two layers of resilient media stacked together to create a resilient media having a mesh like structure with smaller flexible openings having improved light blocking properties compared to the single layer resilient media in FIG. 14A.
Figure 15B:
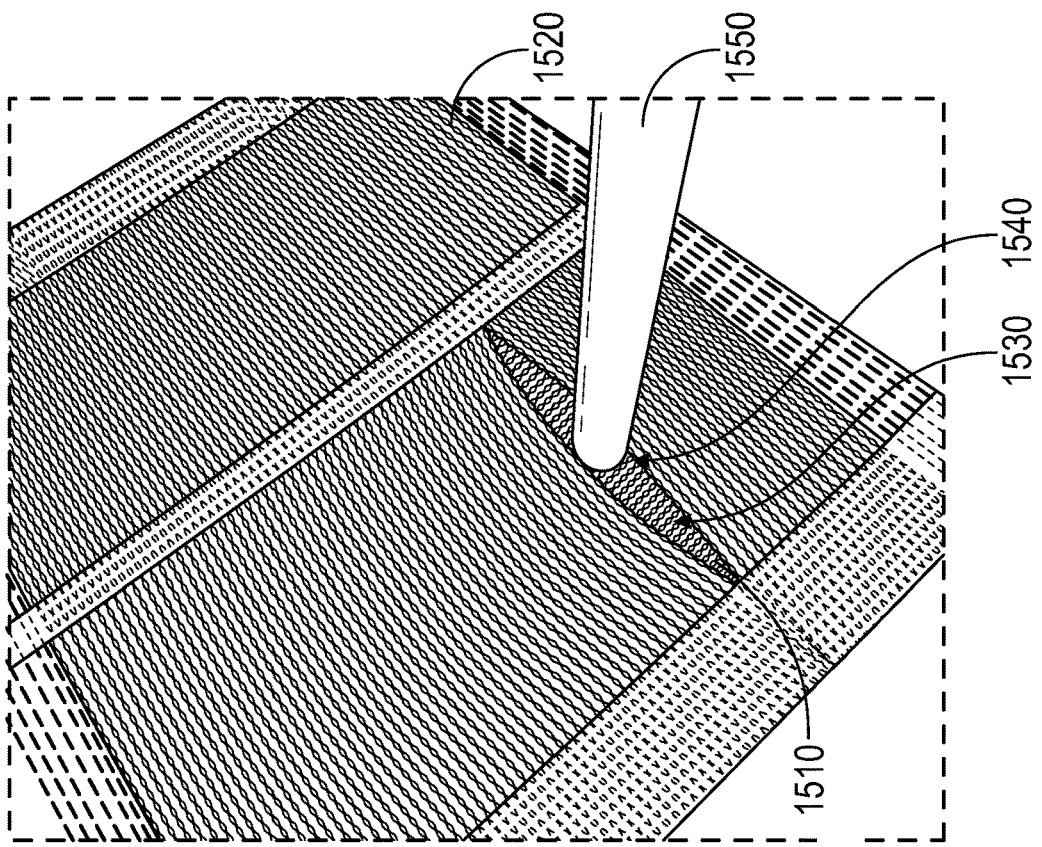
FIG. 15B illustrates openings formed through two adjacent layers of resilient media and the partial overlap of strands from each layer with openings in the adjacent layer.
Figure 15A:
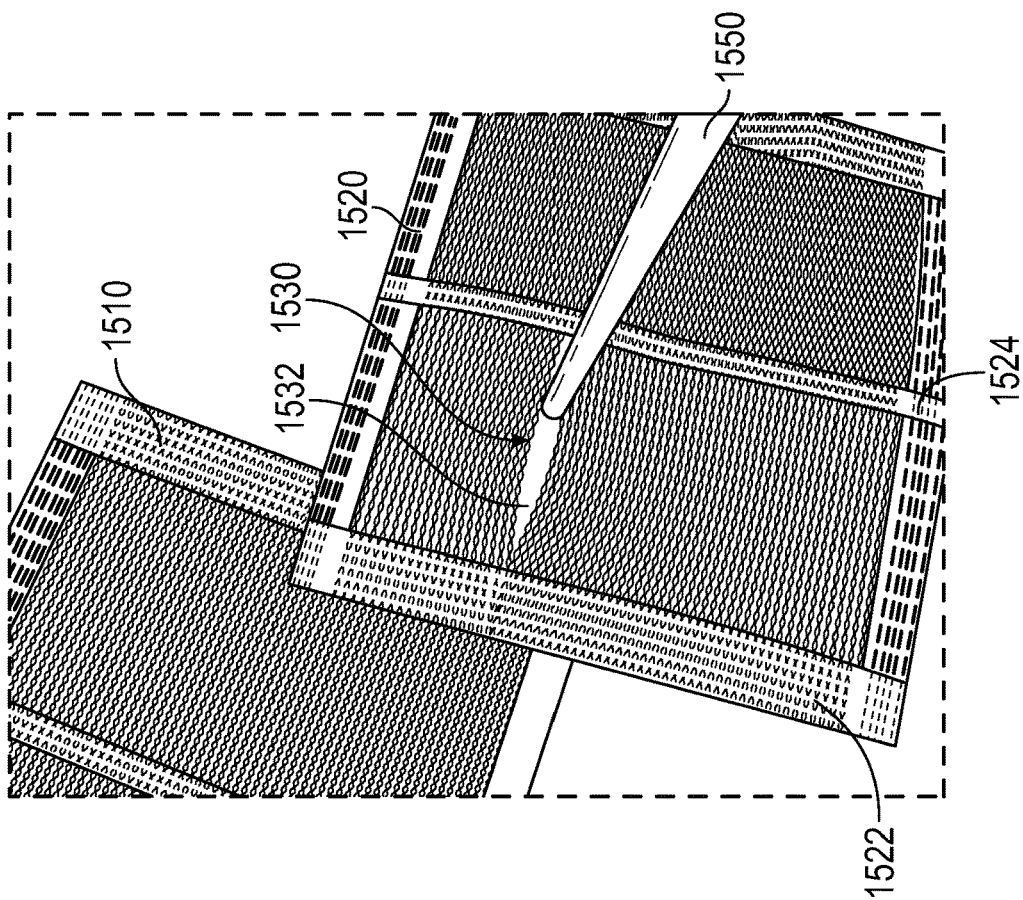
FIGS. 15A illustrates openings formed in a first layer of resilient media by separating adjacent strands.

The strands in each layer can move independently of other strands in the layer and the strands in each layer can move independently of strands in adjacent layers. Such movement occurring for each of the strands in the regions between the constraining first/second positions. The openings in each layer of the multilayer media can combine to effectively create a plurality of openings or passages from a first layer to an adjacent layer as illustrated in FIG. 14B, FIG. 15B, and FIG. 16D. For example, in FIG. 14B, two layers of strands can be positioned adjacent to each other at various angles and can produce a mesh like structure when viewed through adjacent stacked resilient media layers 1410 and 1420 as shown in FIG. 14B. This can result in the formation of numerous openings, for example light areas 1440, as shown in FIG. 14B. These openings 1440 can be highly flexible and resilient and can form larger openings through the layers when strands in each layer are separated by an object such as a stem or root that protrude through both layers. In FIG. 15A bottom layer 1510 of resilient media and top layer 1520 of resilient media are shown separated (strands do not overlap). An elongated opening 1530 can be formed in layer 1520 by separating adjacent strands between constraining regions 1522 and 1524 with an object 1550. The opening 1530 is occupied in part by the object 1550 and the opening can have an unoccupied region 1532; unoccupied region 1532 of opening 1530 could allow light into nutrient solutions or permit overspray by aeroponic nozzles. FIG. 15B shows layer 1510 and layer 1520 in a stacked relationship with the axes of the strands in each layer oriented about 90 degrees to the other (similar to the two stacked layers in FIG. 14B). An object 1550 when positioned through the layers can form opening 1530 in the top layer and opening 1540 in the bottom layer. Strands from the bottom layer 1510 cover open or unoccupied areas of opening 1530 from below. The expandable openings, 1530 and 1540, can have two sides from each layer 1510 and 1520 that contact the object 1550 extending through the stacked layers. Strands from the top layer 1520 cover open areas below (not shown) of opening 1540 in the bottom layer 1510 formed by the object 1550. Positioning layers of resilient media in embodiment of the disclosure adjacent to one another can cover open areas of openings formed in the adjacent layers. For plant development, this can reduce light penetration and water evaporation compared to a single layer.

FIG. 15A illustrates a bottom layer 1510 of resilient media and a top layer 1520 of resilient media; the two layers are shown separated. Elongated opening 1530 can be formed when strands in the top layer 1520 are separated by an object 1550. The opening 1530 includes an unoccupied region 1532 between the separated strands. Resilient silicone constraining region 1522 of layer 1520 allows greater separation of adjacent strands (compared for example to less flexible constraining region 270 with physical attachment 254 between the adjacent strands 250 and 252 in FIG. 2B) and can facilitate removal of roots and stems near constraining region edges because greater separation of the strands near the constraining region is possible.

FIG. 15B shows the bottom layer of resilient media and top layer of resilient media in a stacked relationship. Strands of layer 1510 are oriented about 90 degrees to the strands in layer 1520. With two 90 degree oriented layers, an object 1550 that passes through each layer forms an opening 1530 in the top layer and an opening 1540 in the bottom layer. Each opening 1530 and 1540 in the stack has an unoccupied open region similar to 1532 in FIG. 15A that is formed by the object 1550 inserted through the two layers of media. FIG. 15B illustrates that strands from the bottom layer 1510 are visible in the gap of opening 1530 and that strands from the top layer 1520 cover over the unoccupied region (not shown) of opening 1540 formed in the bottom layer.

Flexible and resilient openings in adjacent layers of resilient media are also illustrated in FIGS. 16A-D for two adjacent layers 1640 and 1660. Each layer 1640 and 1660 can include adjacent strands. The layers can form a stack with numerous expandable openings or passages similar to that shown in FIG. 14B. Each of the expandable openings extends through the stack and can have two separate sides from strands in each layer moving from one side of the stack to the opposite side through the resilient media layers. The adjacent layers can be touching, separated by air, or separated by a layer of liquid water or nutrient solution. The strands in each layer can provide two flexible sides of each of the openings through the stack as illustrated for example in FIG. 16D. FIG. 16A shows a layer 1630 of resilient media with adjacent strands such as 1642,1644, and 1650, opening 1652 between non-arched strands 1644 and 1650, constraining regions 1610 and 1620, and optional perimeter constraining areas 1616 and 1626. FIG. 16B illustrates lateral bending or separation of adjacent strands 1642 and 1644 in a layer of resilient media 1640 when an object 1605, e.g., a stem, stalk, root, tool, or rod, is positioned between the strands 1642 and 1644 to form opening 1646. FIG. 16C illustrates lateral bending or separation of adjacent strands 1662 and 1664 in another layer of media 1660 (note 1660 is oriented 90 degrees to media layer 1640) when an object 1605, e.g., a stem or rod, is positioned between the strands 1662 and 1664 to form opening 1666. Between the separated or arched strands in FIG. 16B and FIG. 16C, gaps or openings such as 1646 and 1666 can be formed in each layer (similar to unoccupied region 1532 in FIG. 15A). FIG. 16D illustrates positioning the two layers 1640 and 1660 adjacent to each other in a stacked relationship to form a stack 1670. The stack 1670 can form numerous openings like 1680 (shown as un-separated adjacent strands) and 1682 (shown as separated strands formed by arching of adjacent strands in each layer by object 1605). The use of crisscross layers can reduce or close up openings formed by the growth of the plant (see for example FIG. 16D) and can also mechanically anchor the plant to the resilient media. In media 1670 opening 1682 can be formed by object 1605 inserted between strands 1642 and 1644 of layer 1640 and by insertion of object 1605 between strands 1662 and 1664 of layer 1660. Expanded opening 1682 has flexible sides formed by strands 1642 and 1644 of the top layer 1640 and has another set of flexible sides formed by strands 1662 and 1664 of the bottom layer 1660. The elongated openings 1646 and 1666 in each layer of the multilayer resilient media 1670 can be larger than the combine opening 1682 formed through adjacent layers 1640 and 1660. Additional layers (not shown) can be positioned with respect to the other layers and used to form additional pairs of sides.

Positioning the layer 1640 in a stacked relation relative to the layer 1660 such that the strands of the first layer and the strands of the second layer are in a non-aligned orientation relative to each other can be beneficial in controlling nutrient solution light contact and evaporation. For example, compared with single layers of media where object 1605 can form elongated opening areas 1646 and 1666 and permit some light penetration or nutrient solution evaporation between separated strands, two or more layers of resilient media can be positioned adjacent to each other such that the strands from one layer can overlap the open areas between separated strands in an adjacent layer. The overlap of strands from an adjacent layer with open areas within a layer can reduce light penetration or nutrient solution loss as depicted at 1646 and 1666 in the stack 1670 illustrated in FIG. 16D.

When the object 1605 between and through strands in the one or more stacked layers is removed, the strands in each layer can return to their original or substantially original position in the absence of the object.

Figure 1B:
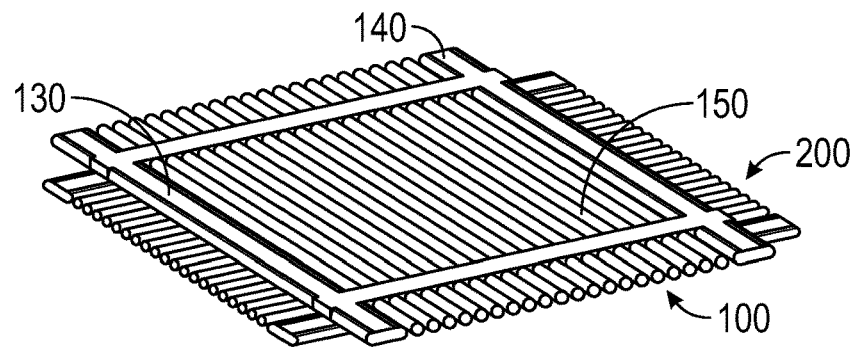
Figure 1C:
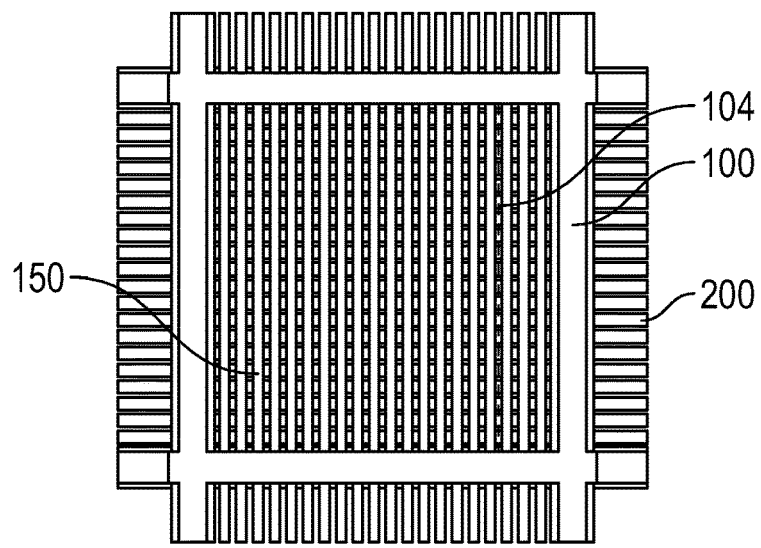

FIGS. 14A-B, FIGS. 15A-B, and FIGS. 16A-D illustrate resilient media that include a layer having a plurality of adjacent and laterally bendable or laterally separable strands that have an initial orientation and that are constrained at two or more separate constraining positions across or along a length of the strands. The resilient media can further include at least a second layer as shown in FIG. 14B, FIG. 15B. and FIG. 16D. The second layer can include a plurality of adjacent and laterally bendable or separable strands having an initial orientation that are constrained at two or more separate constraining positions across a length of the strands. The second layer can be in a stacked relationship with the first layer such that the strands of the first layer cross the strands of the second layer and can form a plurality of resilient and flexible openings as shown in FIG. 14B, 15B, and FIG. 16D. The resilient and flexible openings can be formed by the crossing of the strands in the two layers. The strands from each layer can form two sides of each opening when passing through the opening from the first to the second (or last) layer. The strands from adjacent layers can cover portions of openings formed by separated strands in the other adjacent layers as illustrated in FIG. 15B and FIG. 16D. The strands of the first layer can cover portions of openings formed by separating strands in the second layer, and strands of the second layer can cover portions of openings formed by separating strands in the first layer; the openings in the first layer and the openings in the second layer form flexible passages through the resilient media that can be traversed by roots, stems, plant cuttings, or various tools. An additional layer with resilient strands can cross one or more of the first or second layers and can provide additional sides to the openings moving from the first layer to the last layer. The resilient strands in any additional layers can also cover portions of openings form by separated strands in other layers. The first, second, and any additional layers may be in contact with each other and/or they may be separated by an air gap and as illustrated in FIG. 1A-C. The first, second, and any additional layers may also be separated by a film of nutrient solution or water, any of the layers may contain nutrient solution or water within openings of the layer, contain nutrient solution or water between the layers, or any combination of these as illustrated by liquid 1740 in FIG. 17B.

The numerous flexible and resilient openings or passages of the resilient media can be sized to be small enough to support a wide range size of seeds, rhizomes, or germplasm with sizes ranging from sub millimeter to centimeter or larger, can retain liquid during germination and plant development, and the openings can be expanded large enough to allow root and stem penetration of plants geminated and developed from the seeds, rhizomes, or germplasm.

The strands in each layer can move independently of strands in the same layer and/or strands in adjacent layers. The strands in each layer can touch strands in adjacent layers, however the strands in each layer can move independently of strands in the same layer or adjacent layers. Such strand movement occurring for each of the strands in the regions between the constraining first/second positions (and other constraining positions) in each layer. The openings in each layer of a multilayer resilient media can combine to create a plurality of passages from above the layer to below the layer. Strands from adjacent layers can act to support and distribute the weight of developing plants growing on the resilient media of the disclosure. Strands from adjacent layers can cooperate to support developing plants. In addition to supporting developing plants, the strands in adjacent layers can cooperate to prevent sagging and low spots on the media which can reduce puddling and provide a consisted plant height for harvest. The layers of the disclosed resilient media facilitate plant growth, as well as provide for ease of plant harvest relative to the top-most layer, and ease of cleaning for reuse. Separation of layers can further aid in the cleaning of the media layers individually for reuse.

In embodiments of the disclosure the layers and their strands can be in direct contact, separated by an air gap, separated by a film or nutrient solution and/or water, or any combination of these. For example, an air gap may exist between regions or areas between some layers and direct contact or separation of layers by a film of nutrient solution or water may exist in other regions. The film of nutrient solution and/or water between strands allows the resilient media to retain liquid and can beneficially support seed germination and plant development without the need for a second type of media like paper, cloth, or other fabric. The absence of a growth media like paper, cloth, or other fabric between the resilient media layers reduces material costs and waste after harvest and can facilitate ratooning or coppicing of plants using the resilient growth media with multiple layers.

In some embodiments of the disclosure a layer may initially take the form of a mesh or grid structure of openings that can be made up from spaced adjacent strands. Elongated opening(s) may be formed from the mesh or grid structure by cutting or slitting the mesh/grid structure along a first axis. Further cuts/slits may be effectuated parallel to the initially described cut/slit, such that a plurality of adjacent strands forming elongated openings can be defined in a parallel orientation/alignment within the layer. In embodiments of the disclosure, a cut/slit can be effectuated between adjacent mesh openings, spaced mesh openings, and any combination of these to form pair of strands that can be spaced such that all strands are then free to bow/arch along their lengths to form openings as described herein. The foregoing elongated openings (e.g. cuts/slits) may extend from the first constraining position to the second constraining position such that first and second constraining positions constitute points/regions at which the cuts/slits are discontinued. In some embodiments of the disclosure a layer may initially take the form of adjacent strands on a surface. The strands can be constrained at one or more regions across the strands and optionally parallel to the strands along the perimeter of the layer. The strands can be constrained mechanically, for example but not limited to clamps or weaving. The strands can be constrained by fusion, or by bonding the strands with a material such as but not limited to an adhesive or a caulking material.

As illustrated in FIG. 19, in some embodiments of the disclosure the strands can be woven along only portions of their length with other strands to form the constraining region(s) 1910, 1920, and 1930 of the resilient media 1900. For example, the weave of any of the constraining regions can be any one of a Plain weave, a Twill weave, a Linen weave, a Dutch weave, or other weave type and the constraining regions separated by non-woven or unconstrained and continuous portions/lengths of strands (e.g., 1942 or 1982). The resilient media 1900 in FIG. 19 illustrates a non-limiting example of woven constraining regions separated by unconstrained portions or lengths of strands. One or more of the constraining regions can be coated or infiltrated with a polymer or elastomer that seals opening between woven strands in the constraining region. Sealing can reduce plant development and seed germination in the constraining regions. The unconstrained strands, for example strand portions between or spanning across the space between constraining regions, can have a length that is greater than the spacing between adjacent unconstrained strands. In FIG. 19, the length of the unconstrained portion of the strands, for example 1942 and 1944, spanning across or between constraining regions 1910 and 1920 can be greater than five times the spacing 1943 between unconstrained strands 1942 and 1944. In some embodiments the length of the unconstrained portion of the strands, for example 1942 and 1944, spanning across or between constraining regions 1910 and 1920 can be between 100 and 500 times the spacing 1943 between unconstrained strands 1942 and 1944. Similarly, and as shown in greater detail In FIG. 19A, the length of the unconstrained portion of the partially illustrated strands, for example 1982 and 1984, spanning across or between constraining regions 1930 and 1920 can be greater than five times the spacing 1983 between unconstrained strands 1982 and 1984. In some embodiments of the disclosure the spacing between adjacent longitudinal or lengthwise strands 1982 and 1984 in unconstrained regions can be chosen to hold seeds or other germplasm. In some other embodiments of the disclosure the spacing between adjacent longitudinal or lengthwise strands 1982 and 1984 in unconstrained regions can be between 0.3 millimeter and 2 millimeters, or greater. In some embodiments of the disclosure the spacing between adjacent transverse strands 1960 in the constrained region can be from a minimum distance possible based on strand diameter up to 1 millimeter between adjacent strands. In some embodiments the spacing between transverse strands of separated constraining regions, e.g., the unconstrained or longitudinal or lengthwise strand length, can be 10 millimeters or greater, or can be between 10 millimeters and 100 millimeters. In a weave, the spacing of the constraining regions or supports for the strands can permit enough free or unconstrained length of strands to bow/arch and produce a larger opening between the strands.

In embodiments of the disclosure, the resilient media can have a non-uniform weave including woven constrained regions 1910, 1920, and 1930 that are separated by regions of elongated longitudinal strands as shown by the non-limiting illustration in FIG. 19. In some embodiments the woven constrained regions can be further coated with polymer or elastomer. A polymer or elastomer coating can provide flexibility to the constraining region and prevent unwanted root penetration in the constraining region. FIG. 19 illustrates a single layer of resilient media. Two or more layers of this resilient media can be stacked together as described herein and illustrated in FIGS. 16A-D to create a resilient media having a mesh like structure with smaller flexible elongated openings having improved light blocking properties compared to the single layer resilient media.

In some embodiments the resilient media can be structured such that the adjacent longitudinal or lengthwise strands 1982 and 1984 fibers are regularly spaced and woven with regularly spaced transverse fibers that cross the longitudinal strand 1982 and 1984 in the constraining regions. In other embodiments the resilient media can be structured such that the longitudinal fibers 1982 and 1984 are regularly spaced and the resilient media strengthened through irregularly spaced transverse fibers in the constraining regions. In some embodiments of the disclosure the resilient media can be composed of fibers that have been coated with an elastomer or polymer prior to forming the resilient media. In some other embodiments of the disclosure the mesh can be composed of a pre-woven material with constraining regions and longitudinal strands that can subsequently be coated with an elastomer or polymer to create final resilient media.

The one or more constraining regions in a layer of resilient media can have a fixed or a substantially fixed position in the layer. Where the constraining region is formed by cutting slits into a mesh as in FIGS. 1A-C, FIGS. 2A-B, and FIG. 3A, the position of the constraining regions are fixed in the layer. As illustrated in FIG. 4B, the constraining regions can be in fixed positions within the layer, but the position of the fixed constraining regions can vary across the layer which can provide elongated openings of different sizes within the layer.

The dimension/width of openings, or space, between strands in the resilient media, which can include elongated openings, can be adjusted in various ways, e.g., by varying where the strands are constrained at one or both ends, or by including/retaining intermediate spacer(s) or nub(s) along one or both adjacent strands. Adjusting and/or controlling the dimension/width of openings between adjacent strands in a layer may provide one or more benefits, e.g., allowing for accommodation of different sized seeds and shoots between strands, supporting seeds on top of strands, controlling spray loss and/or evaporation from spray nozzle droplets or hydroponic containers, controlling light penetration into nutrient solutions or drip trays, making it easier to remove root and/or shoot mass from the resilient media following harvest of developed plants, and combinations thereof. The dimensions of the space between non-arched or non-bowed adjacent strands, e.g., 1983 in FIG. 19 or the spacing between adjacent un-bowed strands of opening 104 in FIG. 1C, may be the same or may vary across the plane of a layer. Thus, for example, a larger/greater dimension/space may be provided between adjacent un-bowed strands in a first region of the layer, e.g., to accommodate larger seeds, and a smaller/lesser dimension/space may be provided between adjacent un-bowed strands in a second region of the layer, e.g., to accommodate smaller seeds. There is no limit on the number of regions that may be defined in a layer by adjusting the dimension, spacing, or width of the elongated opening between adjacent un-bowed or un-arched strands as described herein.

The constrained strands in a layer may be further separated from one another, thereby enabling larger openings to be created between strands, by exerting a force on one or more of the strands. The force to create a larger opening between adjacent strands could be from a mechanical force or from a germinating seed or when plant matter, like roots and/or shoots, are removed from between the strands. An opening that experiences a force designed to create a larger opening or greater separation between the strands may be allowed to return to an initial relative position of the opening when the force acting on the strand(s) or the object between the strands is removed. The level of force application, and the associated increase in the size of the opening, may vary along a continuum to achieve varying levels of separation between adjacent strands.

The resilient media in embodiments of the disclosure includes resilient openings formed by the strands such that the resilient media can be repeatedly used and reused for developing and harvesting plants without tearing or shrinking the strands or openings of the resilient media. This is an advantage compared to cloth which can tear and shrink. In some embodiments of the resilient media of the disclosure, the strands in at least one layer can be bent, arched, or separated between constraining regions at their center by about 0.25 millimeters (mm) to about 4 mm by a force to create openings, although smaller and larger openings can be formed and the disclosure is not limited to this range. Also, unlike cloth media where roots and stems can become entangled and entrained with the fibers of the cloth after harvesting, the same roots and stems can easily be pulled or pushed through the openings formed by displaced strands in the resilient media in embodiments of the disclosure. The ease of removing roots and stems from the resilient media can reduce cleaning costs and improve cleaning efficiency. Further, compared to grow boards and the like that use disposable media such as paper to support seeds and plants, the resilient openings in embodiments of the disclosure can support seed germination, root penetration, and root removal without a disposable media which can reduce waste generation and processing steps.

The strands in some embodiments of the disclosure can be non-absorbent strands. Non-absorbent strands can have reduced capacity for the uptake and retention of liquids like nutrient solution and water during plant development. This non-absorbency can be advantageous compared with fibers, yarns, and the like that are used to make cloth, fabrics, or fiber based plant development media which can become saturated with water and nutrient solution leading to algal growth and high evaporation rates. The non-absorbent strands in some embodiments of resilient media of the disclosure can eliminate the problem of wicking water or nutrient solution from a lower surface in contact with liquid to an upper surface as is observed with absorbent cloth media. This non-absorbency can beneficially allow the top surface of resilient media layers to become dry and reduce conditions where algae and mold can grow. In some embodiments of the disclosure the strands can be resilient and non-absorbent for nutrient solution and water. The non-absorbent strands can reduce or eliminate water held by the non-plant supporting portions of the resilient media. With cloth growth media or other liquid absorbent growth media, water and nutrient solution held by non-plant supporting portions of growth media can be transferred to a grow room by evaporation which can increase air conditioning needs and energy use. Also, with cloth growth media, water and nutrient solution held by non-plant supporting portions of growth media can support algae growth.

The resilient plant growth media in embodiments of the disclosure containing non-absorbent strands can have substantially reduced surface area compared cloth or fabrics made from porous and permeable fibers, yarns, and the like. The non-absorbent strands of resilient media in embodiments of the disclosure can also reduce sites for algal growth within the fibers and yarns and thereby reduce cleaning costs. Water and nutrient solution held by openings of the resilient media in embodiments of the disclosure can be controlled by the number and size of the openings. The resilient media and resilient media having one or more layers, can be flushed with water through the resilient openings to facilitate cleaning.

Each of the layers in the disclosed resilient media can be the same or they can be different. For example, each of the layers in the disclosed resilient media can have the same thickness, or they may exhibit different thicknesses. Each of the layers can have the same size and type of openings, or some layers can have small openings and other layers larger openings or elongated openings. Thus, a first layer in the disclosed resilient plant development media may have a first thickness (e.g., based on the diameter of the elongated strands that define such first layer) with grid openings; a second layer in the disclosed resilient media that is associated with the first layer may have a second thickness (e.g., based on the diameter of the elongated strands that define such second layer) and elongated openings. The thickness of each layer may be constant across the plane of the layer or may vary across the plane. Thus, for example, a layer may include strand(s) of a first diameter and strand(s) of a second diameter, such that the thickness of the layer varies based on the variable diameter of the strands that form such a layer. A layer with different diameters can be advantageous in providing additional openings for root and shoot penetration as well as for retaining seeds.

Figure 9A:
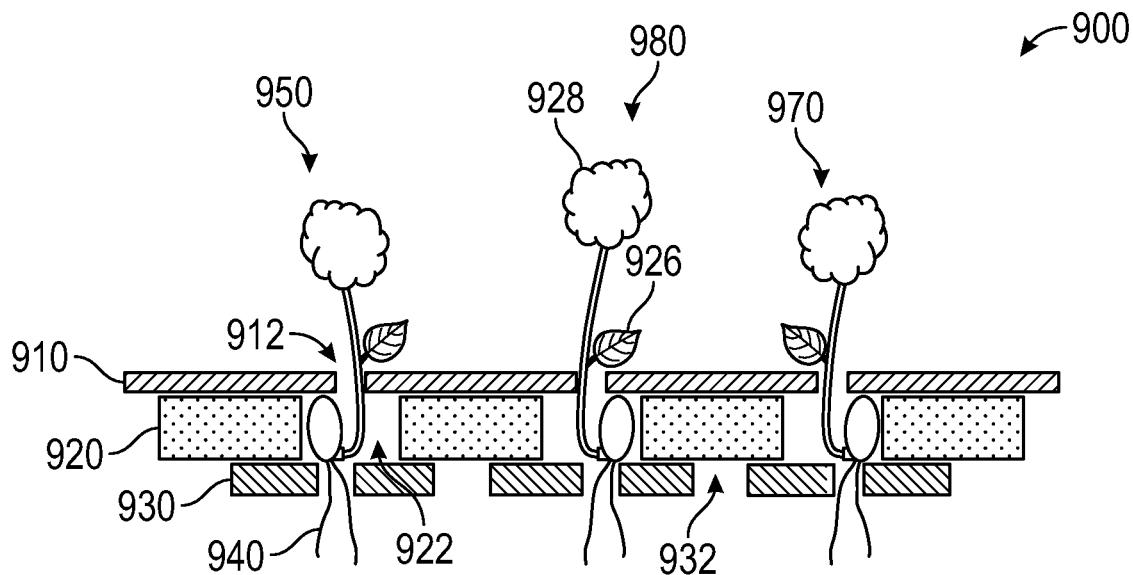
FIGS. 9A-D sequentially illustrate harvesting developed plants using a resilient media for multiple plant development cycles.
Figure 9B:
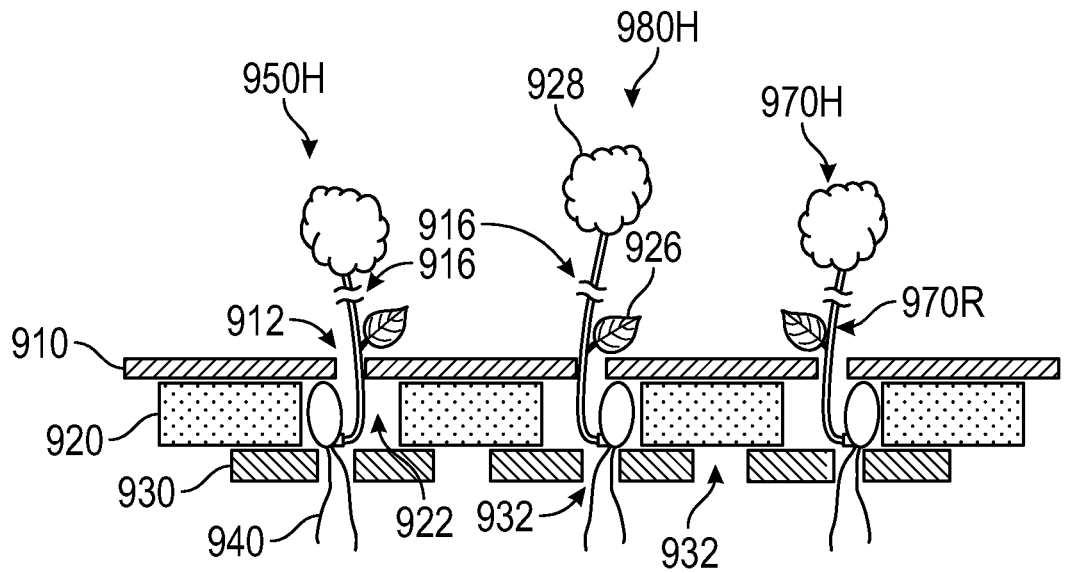
Figure 9C:
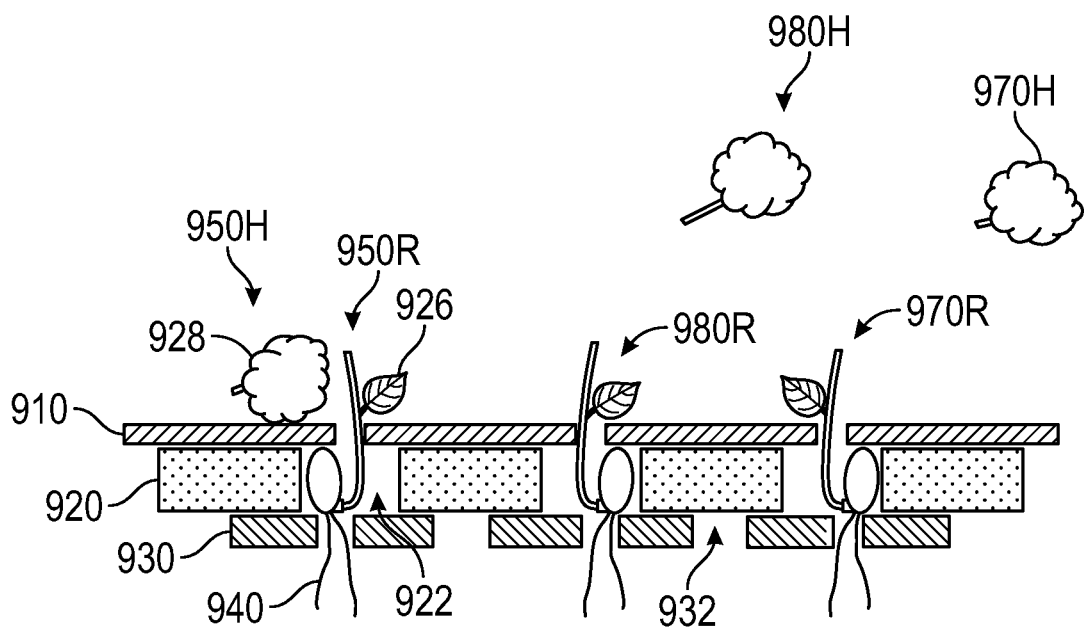
Figure 9D:
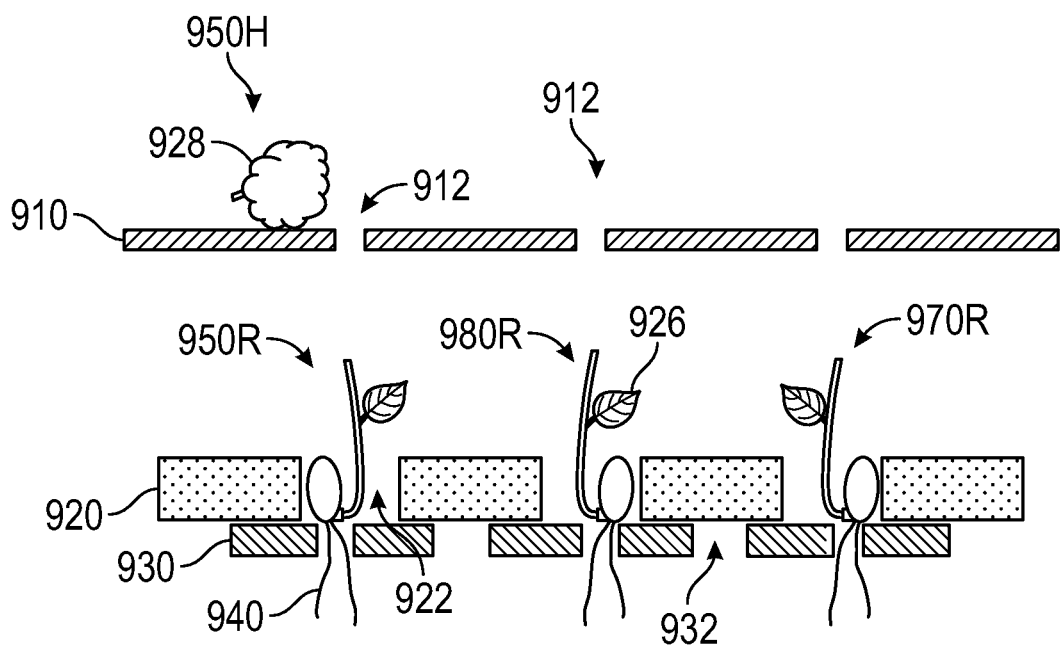

As illustrated in FIGS. 9C-D, the flexible and resilient openings of a layer of resilient media 910 in embodiments of the disclosure can be adapted to allow passage of lower plant portions, for example secondary lower leaves 926 and stems 950R remaining after harvest of the upper portion of the developed plants, through the openings of the outer resilient media layer 910. After harvest the outer layer 910 can be removed from the stack while the plant portions remain. The resilient openings 912 can separate as layer 910 is removed which allows the plant parts like 926, 950R, 970R, and 980R to redevelop while being supported by the remaining layers 920 and 930 (e.g., FIG. 9D). The remaining plant parts like 926, 950R, 970R, and 980R can continue to develop after layer 910 is removed. The harvesting and layer removal process can be repeated for subsequent layers. In some embodiments of the resilient media of the disclosure, the dimensional aspects of openings in a layer, for example the distance between the adjacent resilient strands, the distance between resilient constraining regions, or any combination of these can permit passage of the lower plant portions (stems and secondary leaves) of harvested leafy greens or other plants to pass through the layer openings when the layer is removed. Openings with a larger longest aspect can be beneficial in minimizing or eliminating damage to remaining stems and leaves when layers of resilient media are removed for ratooning cycles. Openings formed by resilient strands and resilient constraining regions, for example see opening 1530 in FIG. 15A, can be beneficial for aiding in the removal of an upper layer when remaining lower plant portions are positioned near the constraining region part of an opening. Resilient media can have layers arranged with smaller openings in bottoms layers near the roots and can have layers with larger openings in upper layers near the stems and leaves. Such an arrangement of layers can be beneficial in retaining roots of plants in the lower layers of the media while facilitating removal of upper layers with minimal leaf and stem damage during various plant development or ratooning processes.

Strands that can be used to construct a layer or a sheet of the resilient media may be fabricated from the same material or from one or more different materials. Some or all of the strands that are used to construct a layer may include one or more coatings on a core fiber or substrate. The strands can also be made by molding, extrusion, or spinning such materials individually or with a core fiber or substrate. The materials, e.g., coating(s) can be those that facilitate plant growth, coating(s) that facilitate interaction with nutrient solution, coating(s) such as phosphors that facilitate interaction with light and result in emissions that promote plant growth, coating(s) that facilitate separation of harvested plants/stems/roots from the strand(s), coating(s) that increase rigidity/strength of the strand(s), coating(s) that provide an indicia of the type of plant/seed being grown in association with the strand(s), coatings that inhibit algal growth, and combinations thereof. Strands of differing material composition may be alternated across a layer to provide variable levels of flexibility/rigidity to adjacent strands, thereby further facilitating a desired lateral arching/bowing of adjacent strands to form openings and accommodate the plant development cycle.

Figure 2B:
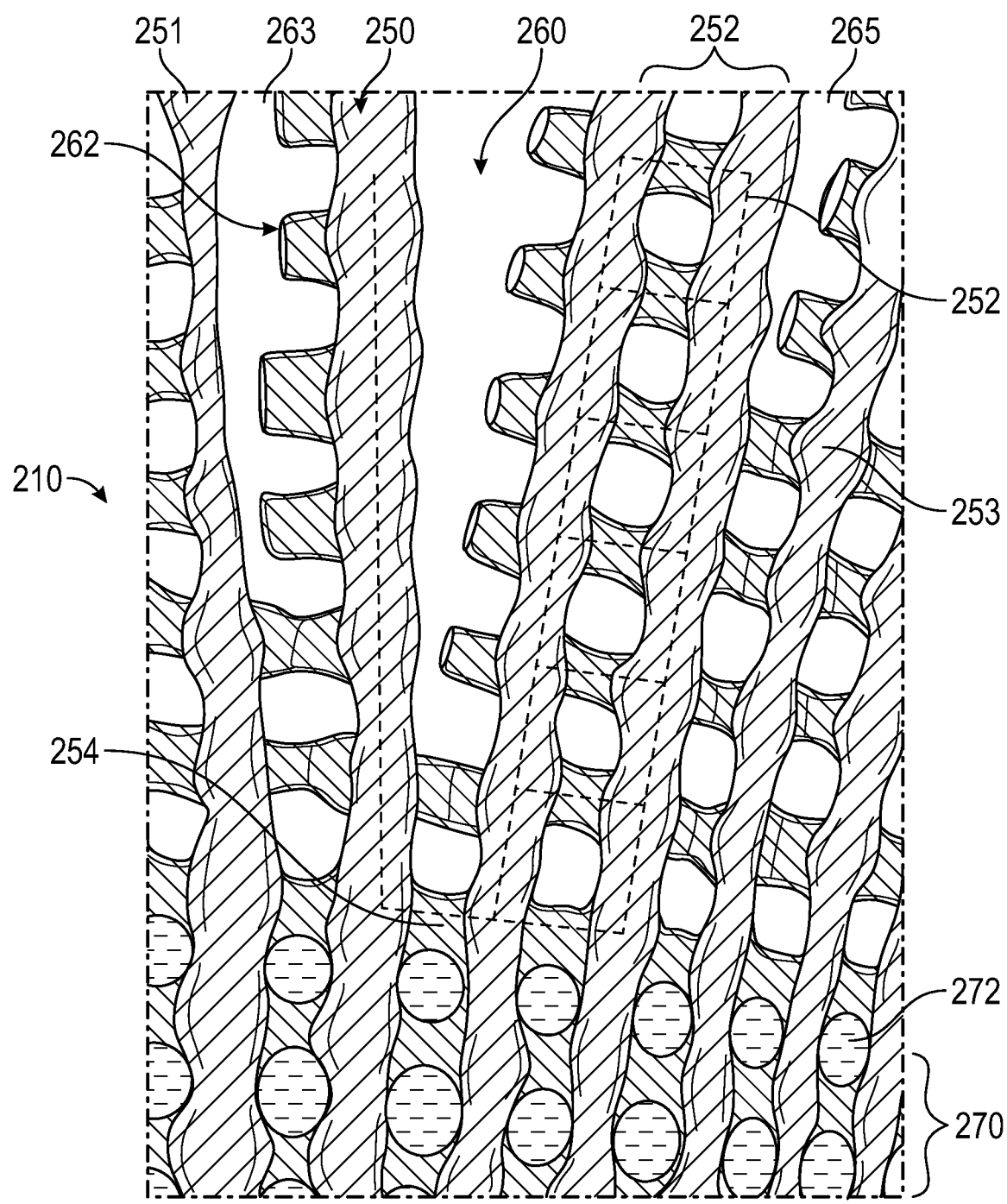

The strands that can be used to construct a layer, sheet, or slab of resilient media in embodiments of the disclosure may have the same cross-sectional geometry, see for example FIG. 1, or the strands can have different cross-sectional geometries and/or non-geometric cross-sectional geometries as illustrated in (FIGS. 2A-B). The strands can have features and/or texture on their surface. Thus, the strands may feature a substantially circular cross-section, a substantially rectangular or square cross-section, a substantially elliptical cross-section, a substantially trapezoidal cross-section, or another geometric cross-section. The strands may feature a constant cross-sectional geometry along their lengths, or the strands may feature different cross-sectional geometries along their lengths. Thus, for example, a strand may feature a circular cross-section that transitions to an elliptical cross-section and then back to a circular cross-section. Other variations in cross-sectional geometry of the strands may be utilized, whether along the length of individual strands or as between strands that define a layer of the multilayer resilient media (or both). In some embodiments of the resilient media the non-absorbent strands can have features and/or texture including one or more nubs, appendages, or extensions that can protrude into the opening between strands as illustrated in FIG. 2A. In some embodiments, these features can have size or scale similar to, or the same as, the diameter of the strands. For example, strand 250 in FIG. 2B can have nub or extension 262 that protrudes from the strand 250 by an amount equal to or less than the diameter of the strand. These strand features can improve the wetting and drying properties of the media and can beneficially aid in the positioning and retention of seeds between strands. The strands can also have openings therein as illustrated in FIG. 2A for strands 242 and 252. Different cross-sectional geometries and/or appendages, nubs, and the like of the strands can be used to increase or reduce the nutrient solution retaining capacity of the resilient media for specific seeds and plants, these features can also reduce the amount of light transmitted by the media into nutrient solutions, and they can further support seeds during the germination process. The different cross-sectional geometries and/or surface features such as appendages and nubs can be beneficial in these aspects while not impeding plant growth (e.g., the appendages/nubs do not impede root travel) through the layer(s).

The strands comprising the resilient media may be made from various materials. The strands can be a single material, the strands can be a composite material, or the strands can have a core with one or more outer materials or coatings. Strands can have a core with high strength and an outer resilient material coating a core material. In some embodiments the strands can be fabricated from a composite of a ceramic core fiber and an elastomer coating. The ceramic core fiber can be a fiber glass material and the elastomeric coating can be silicone. Materials that can be used in fabricating the strands can include polymeric materials such as polyethylene, polypropylene, and the like; polymeric materials that can be elastomeric can include neoprene, silicone rubber, and the like; metals; ceramics; or any combination of these. In some embodiments of the disclosure the surfaces of the strands can be lyophilic or hydrophilic, lyophobic or hydrophobic, or any combination of these. In some other embodiments the polymers and elastomers comprising the strands can have surface energies or critical surface tensions of between about 20 mN/m (millinewton per meter) and 34 mN/m. Resilient media having adjacent strands with surface energies between about 20 mN/m (millinewton per meter) and 34 mN/m can provide drier top surfaces for growing plants which can reduce algae growth on the media surface.

Figure 18:
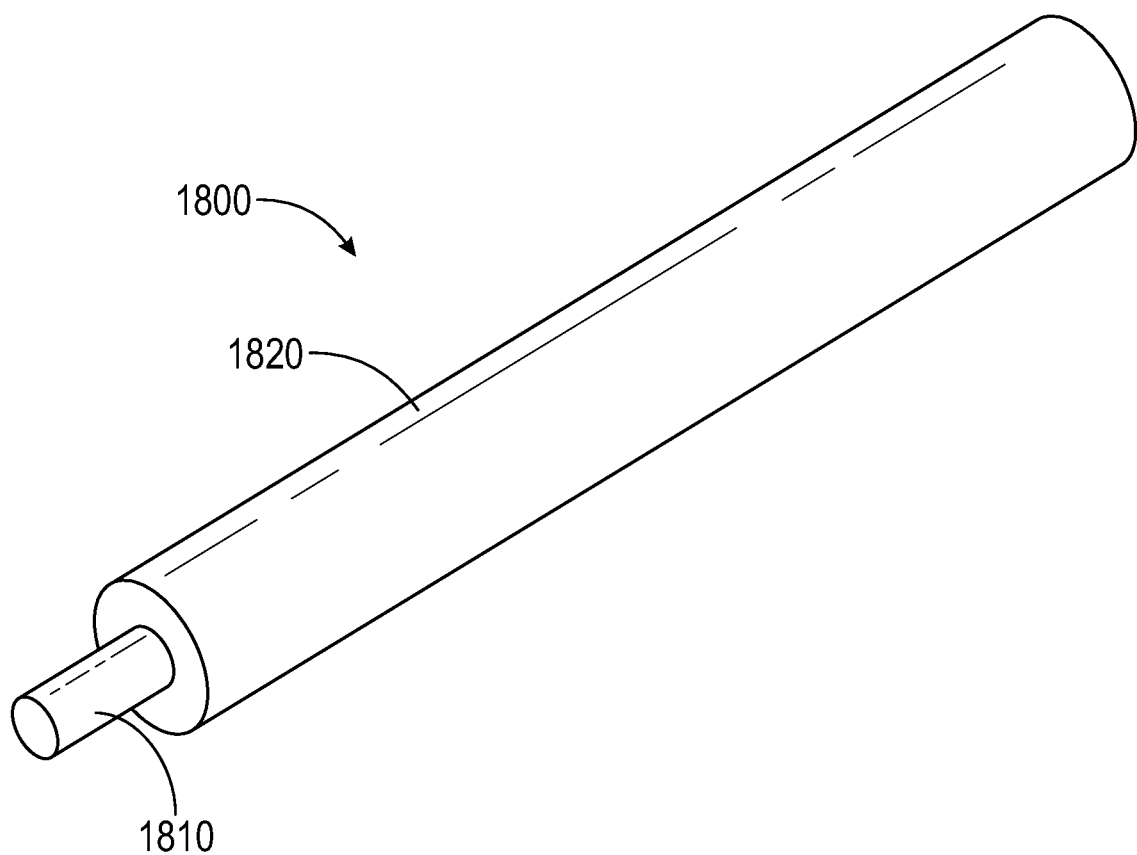
FIG. 18 illustrates a strand in embodiments of the disclosure including a core with an elastomeric coating.

FIG. 18 illustrates a strand in an embodiment of the disclosure. FIG. 18 illustrates a strand 1800 that includes a core 1810 and an outer elastomeric coating 1820. The strand 1800 can be resilient or rigid. The strand can have a circular, elliptical, rectangular, triangular, or other geometric or non-geometric cross section. The strand can be a single material, a composite material, or can be any of these and can have a core. The strands that span between the first constrained and the second constrained position can be spaced from adjacent strands such that the strands can support seeds and developed plants and there is minimal sagging or no sagging of the strands which can be a problem with cloth soilless grow media. Strands made from materials with high tear strength, that are resilient, and can optionally include a core can resist sagging. The strand and/or core of the strand can be a fiber composed of a glass, polypropylene, polyethylene, polyester, an aramid, or combinations of these. The core can provide additional strength to the strands. The core fiber can have a diameter or thickness of its largest aspect in the range of 0.25 millimeter (mm) up to 1 mm although other larger and smaller diameters and thickness are possible. A coating can be applied to the strand or core. The strand can be an elastomer or can include an elastomer. The coating can be an elastomer or can include an elastomer. In some embodiments the elastomer can be poly(dimethylsiloxane) e.g., silicone, or an elastomer including silicone. In some embodiments the coating atop the core fiber can be a perfluorinated polymer including polytetrafluroethylene, perfluoroalkoxy alkanes like MFA, PFA, and the like. The coating can support strand resiliency and the coating can provide a dry resilient media top surface that can reduce wetting of the resilient media by nutrient solutions below the media. The elastomer coating on the fiber can be smooth or can have a texture such as dimpling or a roughness. The surface features when present can have sizes on the order of the coated fiber diameter or smaller. Textured coatings can facilitate the adhesion of water and nutrient solution to the resilient media and between adjacent layers of resilient media. The coating or elastomer coating on the core can have a thickness of between about 0.1 millimeter up to 1 millimeter, and in some embodiments the elastomer coating on the core can have a thickness greater than 1 millimeter. The final diameter or thickness of the strands that make up the resilient media can be 0.4 mm or greater. In some embodiments the diameter or thickness of the strands that make up the resilient media can be from about 0.4 millimeter to about 2 millimeters. The thickness of a layer of resilient media can be between the thickness of the largest strand to about twice the thickness of the largest strand. In some embodiments the thickness of a layer of resilient media made from such strands can be about 0.8 millimeters to about 4 millimeters. To support plants and root masses the strands including the final diameter or thickness of the core and elastomer coating can have a tear strength of 600 pounds to 1000 pounds, or a tear strength of greater than 600 pounds.

In some embodiments of the disclosure, adjacent layers of resilient media can have different lyophilic and/or lyophobic surface properties. For example, a top layer (plant shoot system or light facing side of a layer, e.g., 1750 and 1755 in FIG. 17B) of resilient media in a multilayer stack can have surface properties different from a bottom layer (root or nutrient solution facing side 1752 and 1757 in FIG. 17B) to allow more or less moisture on the top level to support different seed germinating requirements. For example, a hydrophilic coating material on a core fiber, ribbon, and/or strands with suitable surface features could be used for the top strands of a top layer of resilient media to retain water for seeds which require more water contact time for germination. Strands of a lower layer of resilient media, e.g., below the top layer, can have more hydrophilic properties (higher surface energy) compared to the top layer to control wicking of water and retention of water between layers during plant development in an aeroponic system.

The features of the strands, arrangement of the strands, and materials of composition of strands within a layer and between layers can combine to support the developments of plants at all stages including germination and growth. For example, and without wishing to be bound by theory, water used to initially wet seeds on a top layer of resilient media can be retained by the surface features and can be retained between the layers. This surface moisture can support germination and initial root penetration through the media. This surface moisture can evaporate at the seedling stage, even from hydrophilic coated fibers, when the media is placed in a growth chamber and can leave the top surface essentially dry which can inhibit algae, rot, or mold on a top surface of the media. Liquids like water and/or nutrient solution can be held between adjacent layers and strands. This retained liquid can act as a reservoir for plants and can act as a partial or complete vapor barrier and can also limit evaporation or overspray from nozzles or hydroponic trays below the plants. The features of the strands, the arrangement, spacing and the resiliency of the strands, as well as the materials of composition of strands within a layer and between layers can combine to facilitate liquid retention by the media and improve cleaning compared to cloth media.

In use, seeds can be positioned on an outward facing layer of the resilient media, the media with seeds can be placed on a support tray, and the resilient media wet with water. Water can be retained by the openings in the layers and between adjacent layers. Water or nutrient solution held between layers can act as a liquid reservoir for germinating seeds, new root radicles and root hairs. With the roots exposed below the resilient media, the growth support tray and media can then be moved to a growth chamber where the roots can contact nutrient solution, and the seedlings can be exposed to lighting of suitable wavelengths and carbon dioxide to facilitate plant growth. The plant roots can be sprayed from below by aeroponic nozzles or allowed to contact a hydroponic solution or a nutrient film. A liquid nutrient solution like Hoaglands solution, or water, can be retained in openings of the lowest or closest resilient media layer to the nutrient source and/or between higher layers (or those media layers further away from the nutrient source) while keeping the top or outermost surface relatively dry which can reduce algae growth on the top or outermost media surface and reduce competition between developing plants and algae for nutrients. The liquid held within the openings between strands in a layer along with the film of nutrient solution or water between the layers can act as a vapor barrier and a light barrier and can reduce algae growth in the nutrient solution and can reduce heating, ventilation, air conditioning (HVAC) costs in an indoor farm. When plants are ready to be harvested, they can be cut above the outer most layer, and in some cases between layers. The flat surface of the media allows close cutting near the media surface. Remaining roots and stems can be removed from the openings more easily than with cloth during cleaning because the openings between strands can be enlarged in each layer thereby minimizing entanglement of roots with the media. Advantageously, the strands and constraining regions, wherein either or both are resilient, can enable return of the strands to their adjacent positions so that the media can be reused for subsequent seeding and germination.

In the development of plants from seeds it can be beneficial to germinate the seeds by overlaying a mat or blotting paper atop seeds. Once the seeds have germinated, the mat or paper can be removed. However, the removal of the overlying mat or paper can damage delicate root hairs, damage seedlings, and can also create waste and added costs related to the disposal of the mat or paper. In some embodiments of the disclosure seeds can be germinated by positioning the seeds on a top surface of a first layer of resilient media with adjacent strands and the resilient media can be supported on an open tray or lattice. A second layer of resilient media with adjacent strands can be placed in a stacked relationship atop the first layer of resilient media with the seeds thereon. The seeds can be wet and germinated with or without added light to develop seedlings. After germination, the roots of the seedlings can protrude downward below the first layer and between the adjacent strands of the first layer; the shoot portion of the seedlings can protrude upward and between the adjacent strands of the second layer atop the first layer. Advantageously, because the resilient strands in the first and second layers are separable and can be arched, the second layer of resilient media does not need to be removed after seed germination. In some embodiments of the disclosure the spacing between constraining regions in the second layer of resilient media can be the same or different than the spacing between constraining regions in the first layer of resilient media. In some embodiments of the disclosure the spacing between constraining regions in second layer of resilient media can be larger than the spacing between constraining regions in the first layer of resilient media.

In another use of the resilient media in embodiments of the disclosure, bare root plant portions, root cuttings, rhizomes, and the like can be supported and developed using one or more layers of the resilient media. In some embodiments of the disclosure, layers of resilient media can be oriented such that the strands of one layer and strands of the other layer are in an orientation relative to each other to allow the insertion of the root portions through the layers of resilient media and that provide support to roots portions and any optional shoot portions. In some embodiments of the disclosure, layers of resilient media can be oriented such that the strands of one layer and strands of the other layer are in a non-aligned orientation relative to each other. A passage or opening can be formed through the resilient media layers and the bare root plant portion can be inserted into the opening. The resilient and flexible opening can close to secure the bare root plant portion with the media and support any optional shoots portions. The one or more sheets of the resilient media can be placed in a growth chamber and the plants can be developed. Multiples sheets of resilient media can provide greater support to the bare root plant portions, root cuttings, rhizomes, and the like.

A length of each of the strands can span between the first/second constraining regions or positions and can generally be adapted for lateral bowing/arching of the strands relative to each other to create greater spacing as compared to the opening between strands in the absence of such bowing/arching. This unconstrained length of strand can have a length that is greater than the spacing between adjacent strands at or near the constraining region. Strands with an unconstrained length that is greater than the spacing between adjacent strands enables larger openings to form between adjacent strands compared with cloth. Larger openings that can form between strands permits plant roots and stalks to be easily removed through these openings after harvest. The larger openings that can be formed by the resilient media in embodiments of the disclosure can facilitate penetration of seedling roots hairs through these openings compared to cloth which can inhibit root penetration and result in root wandering and seedling failure. In some embodiments the unconstrained length of strand can be at least five times the spacing between the adjacent strands at or near the constraining region. In some embodiments the unconstrained length of strand can be between 100 and 500 times the spacing between the adjacent strands at or near the constraining region. Spacing of the constraining regions or supports for the strands can permit enough free length (e.g., unconstrained strand length) of strands to bow/arch and produce a larger opening between the strands. The noted lateral bowing/arching of the strands of resilient media to form an opening may be prompted, for example, by the growth of plants and/or the passage of roots through the openings defined between strands. In some other embodiments of the disclosure the spacing between adjacent longitudinal strands in unconstrained regions of the resilient media can be between 0.3 millimeters and 2 millimeters, or greater. The longitudinal or lengthwise dimension of the strands can be between 10 millimeters and 100 millimeters, or can be 10 millimeters or greater.

Lateral bowing/arching of adjacent strands to form openings can be achieved by applying a force to adjacent strands of resilient media. The resulting elongated openings that can be formed include those illustrated, but not limited to, openings 260, 280 and 285 in FIGS. 2A-B, openings such as 870 and 890 (asymmetric openings) in FIG. 8A, and openings such as 1646 and 1666 (symmetric openings) in FIGS. 16B-C. The openings can be formed by lateral bowing/arching of strands having different surface features or profiles. For example, openings between adjacent strands can be formed with strands having nubs or surface features on the scale of the strands as illustrated by openings 260 and 280, openings can be formed with strands having a wavy or undulating profile as illustrated by the openings 870 and 890, openings can be formed by strands with smooth cylindrical profiles as illustrated by the openings 1646 and 1666 (smooth), and openings can be formed by any combination of these strands in one or more layers of resilient media.

The strands can be constrained at least at a first position or region and a second position or region in each layer. The strands can be constrained adjacent to and/or separated from other strands. The strands that span between the first constrained and the second constrained position can be spaced from adjacent strands such that the strands can support seeds and developed plants and there is minimal sagging or no sagging of the strands which can be a problem with cloth. In some embodiments strands with minimal sagging constrained between the first position and the second position are strands that are positioned within 1 to 2 strand cross sections or less above or below a plane or straight edge positioned across the first and second constraining regions or positions. Minimal or no sagging of strands can prevent light penetration through the media and can prevent seeds from falling though the media layers before they have germinated which can increase crop yield and growth uniformity on the media. The resiliency of each strand constrained at the at least two separated positions allow adjacent strands in each layer to be laterally moved/deformed or separated from their initial position, for example by a root or plant stem, and then substantially returned to the initial position or returned to within ±1 to ±2 strand cross sections from the initial strand position in a layer of the media. Constraining regions can also optionally be formed at the perimeter edges of a layer. Entire strands, portions of mesh, or woven portions that can be made from the strands may be constrained at perimeter regions. The perimeter constraining regions can overlap with constraining regions that cross the spanning strands as shown in FIGS. 1A-C, FIG. 3B and FIG. 8B. In FIG. 1B for example, the perimeter constraining regions 130 and 140 can intersect with the constraining regions 110 and 120 spanned by the strands 150. Strands can be constrained at two or more positions by an adhesive, by fusion or molding, by knotting or weaving, by mechanical clamping, or by a combination including any of these. The constraining or fixing of the position of the strands at two separated positions can be achieved with an adhesive, a filler such as a caulking, mechanically as by weaving or knotting, or any combination of these. The adhesive or filler can be pliant or elastic food safe material.

FIGS. 1A-C illustrate a non-limiting example of a resilient media of the disclosure. The schematic depictions in FIGS. 1A-C show top plant or light facing layer of resilient media 100 and bottom root or nutrient solution facing layer of resilient media 200, each layer of resilient media comprising a plurality of substantially parallel strands 150. The adjacent strands can be separated from one another and fixed along their length by the different constraining regions 110 and 120 that cross the strands. Without bowing or arching of the strands, the separated strands and constraining regions in the layer of this example can define an opening such as 104 in the layer 100 between the strands (e.g., dashed regions between strands in FIG. 1C illustrates an opening in the top layer 100). The opening 104 can further be enlarged by bowing or arching the strands. The strands can have a smooth surface texture.

FIG. 1A and FIG. 1B shows top layer strands 150 constrained at first and second positions or regions 110 and 120 by filler or adhesive. Strands 150 span first and second constraining regions. Top layer strands are oriented 90 degrees with respect to bottom layer strands. The strands can be soft silicone coated fiber webbing and a silicone solid skin. FIG. 1B illustrates perimeter constraining regions 130 and 140 that can intersect with the first and second constraining regions 110 and 120 spanned by the strands 150. The number of layers can be adjusted per seed growth requirements. FIG. 1C illustrates a resilient media that can have a top layer 100 and a bottom layer 200. The XY grid spacing of the strands 150 in the top layer 100 and bottom layer 200 can be selected for plant growth versus water loss in a grow tower.

As illustrated in FIG. 1A-B, strands 150 in combination with the constraining positions or constraining regions 110 and 120 can together provide the layer or sheet of resilient media in embodiments of the disclosure. The mechanical properties of the strands 150 can range from resilient to non-resilient, or elastic to rigid respectively, and variations between these. The mechanical properties of the constraining positions or constraining regions 110 and 120 can range from resilient to non-resilient, or elastic to rigid respectively, and variations between these. The resilient media can resist deformation such that after being used, the resilient media can substantially resume its original shape.

The openings, e.g., 104, formed between un-bowed separated strands in each layer 100 and 200 in FIG. 1A-C can have an axis that is substantially aligned with the strands. The elongated strands 150 can be fixed or constrained at first/second positions 110 and 120 by an overlaid structure or filler, e.g., a silicone solid skin. The strands and/or axes of elongated openings of the first/top layer are illustrated as being rotated by 90° relative to the strands and or axes of the elongated openings of the second/bottom layer. First layer openings between un-bowed strands can be oriented about 90 degrees across elongated opening formed between un-bowed strands in the bottom layer 200 below.

As illustrated in FIGS. 1A-C, individual layers of the seed germination and plant development resilient media in embodiments of the disclosure can be made by positioning separate strands along their length adjacent to or separated from other strands and constraining or fixing the position of the strands. The strands can be constrained at two separated positions with an adhesive, a filler, or mechanically as by weaving. A layer of resilient media having a plurality of strands and the elongated opening(s) can also be formed by cutting or slitting a pre-made mesh or grid made from a non-absorbent resilient material along one or more rows or columns of openings in the grid. Strands formed by the slitting a pre-made mesh can include one or more nubs, appendages, or extensions that can protrude into the elongated opening as illustrated in FIGS. 2A-B. In some embodiments, the one or more nubs, appendages, or extensions that can protrude into the elongated opening as illustrated in FIGS. 2A-B can have a dimension that is on the same scale or smaller than the diameter of the strands.

In embodiments of the disclosure, a multilayer resilient media can include a layer that can have a plurality of adjacent strands having an initial orientation, the strands in the layer constrained at two or more separate constraining positions across a length of the strands. The resilient media can further include at least a second layer that can have a plurality of adjacent strands having an initial orientation, the strands constrained at two or more separated constraining positions. The strands of the second layer can be in a stacked relation relative to the strands of the first layer. In some embodiments of the multilayer resilient media the strands of the second layer can be in a hexagonal or trigonal stacked relation relative to the strands of the first layer viewed cross sectionally as depicted in the non-limiting diagram of two layers in FIG. 17B. In some other embodiments of the multilayer resilient media, the strands of the second layer can be in a stacked relation relative to the strands of the first layer wherein the strands in one layer can cross the strands of the other layer as depicted in the non-limiting diagram of two layers in FIG. 1B.

In some embodiments of the disclosure the layers can be oriented relative to each other such that the strands or openings of a first layer can be non-aligned relative to the strands or openings of a second or adjacent layer. In some embodiments, the elongated openings of a first layer can be oriented at an angle of 90° relative to the elongated openings of a second layer as illustrated in FIG. 1A, FIG. 2A and FIG. 3C. For example, in FIG. 2A elongated openings 260 and 265 in the top layer 210 were formed by separating adjacent resilient strands in the top layer 210. Openings 280 and 285 in the bottom layer 200 were formed by separating adjacent resilient strands in the bottom layer 200. Openings 260 and 265 in the top layer 210 are oriented approximately 90 degrees to the openings 280 and 285 in the bottom layer 200. In an embodiment of resilient media with two or more layers, open areas formed by separated strands in one layer can overlap open areas formed by strands or separated strands in an adjacent layer as illustrated in FIG. 15B and FIG. 16D. Strands in each of the layers can partially overlap an opening between strands in an adjacent layer. In another embodiment, the elongated openings of the first layer can be oriented at an angle of 60° relative to the elongated openings of the second layer. In still further embodiments, the elongated openings of the first layer can be oriented at an angle of 45° relative to the openings of the second layer. The non-alignment of the elongated openings of the first and second layers may range from 5° to 90° and can generally be between 45° and 90°.

Openings or passages in embodiments of the disclosure can refer to an open space bounded by strands and/or constrained positions of the multilayer media as illustrated by the non-limiting examples and illustrations in FIGS. 1A-C, FIG. 2A, FIG. 8A, and FIG. 16A. Openings in embodiments of the disclosure can refer open spaces bounded by strands and/or constrained regions where the adjacent strands can be relaxed or un-arched/un-bowed and openings in embodiments of the disclosure can refer open spaces bounded by strands and/or constrained regions where the adjacent strands can be laterally arched or bowed. In embodiments of the disclosure a layer of resilient media can include any combination of openings bounded by strands and/or constraining regions where the adjacent strands are un-arched or arched. Openings can have a regular shape as illustrated in FIG. 1A or an irregular shape when one or more of the strands are separated as illustrated in FIG. 2A. Openings can approximate rectangles, ellipses, slits, and the like. Openings can be referred to as elongated where one aspect of the opening is greater than another aspect of the opening. FIGS. 1A-C and FIG. 2A show examples of elongated openings. Openings can be aligned or non-aligned in a layer. Openings in one layer can be aligned or non-aligned with openings in other layers. FIG. 2A illustrates elongated openings in each of the two layers. The elongated openings in each layer in FIG. 2A are aligned, for example 260 and 265 are aligned in one layer 210 and openings 280 and 285 are aligned in the other layer 200, and the elongated openings in one layer can be oriented about 90° to the openings in the second or adjacent layer.

Resilient media in embodiments of the disclosure with two or more layers can have openings in the different layers positioned to form one or more tortuous paths between the top layer and the bottom layer. The strands of one layer can at least partially block the openings formed by strands in another layer. For example, the elongated openings of the first layer may be oriented parallel to the elongated openings of a second layer or the openings of the first layer may be oriented at an angle relative to the elongated openings of a second layer. The strands of the elongated openings of a third layer may be positioned atop the second layer and can be positioned over the elongated openings of the first layer. In some embodiments of the disclosure, the angles defined between the axes of the elongated openings or strands of the first layer and the second layer may range from 5° to 90° (e.g., 45° to 90°), and the angles defined between the axes of the elongated openings or strands of the second layer and the third layer may range from 5° to 90° (e.g., 45° to 90°). If additional layers are added to the resilient media, angular orientations between the axes of the elongated openings or strands of adjacent layers and positioning of strands in various layers may be implemented to further amplify the tortuous path from top-to-bottom of the resilient media. Thus, in some embodiments of the disclosure, the strands of adjacent/stacked layers can generally crisscross each other, rather than being aligned, and can define a tortuous path from top-to-bottom through the layers of the resilient media. The spacing/width of the openings in the various layers of the resilient media may differ relative to each other. A tortuous path does not provide a line of sight opening for roots or shoots or maybe even reduce the amount of light that can pass from one side of the media to the other side of the media. Multiple layers can result in a more tortuous path between layers which can reduce water vapor losses and improves light blocking.

Embodiments of the disclosure can also relate to a method that can include the acts or steps of developing plants on a multilayer resilient media and harvesting the plants at a desired stage of growth. The method can further include the acts or steps of re-growing or developing the remaining shoots and/or stems for a subsequent harvest which can be similar to ratooning or coppicing. The method can further include the acts or steps of removing a top layer of the multilayer resilient media after harvest and re-growing or developing the remaining shoots and/or stems for a subsequent harvest which can be similar to ratooning or coppicing. The layers of resilient media can be in direct contact with adjacent layers or separated by a film or nutrient solution and/or water. The acts or steps of harvesting the developing plants and removing the top layer for a subsequent re-growing can be repeated two or more times and is depicted in FIGS. 9A-D. Advantageously, the flexible and expandable openings between strands in a layer of the resilient plant growth media, e.g., 910, facilitates removal of the layer with little or no damage to the remaining shoots and/or stems. Removal of the top layer can be beneficial for removing plant debris that falls on the top layer from the harvest step and reduces rot and algae formation, especially for high density plantings (e.g., greater than about 1 seed or plant per square inch), during subsequent growth and plant development cycles. Advantageously, the resilient media in embodiments of the disclosure is absent a separate growth media between layers which facilitates ratooning, layer removal with minimal damage to remaining plant structures, and can reduce waste.

An example of using the resilient plant growth media for ratooning is illustrated in FIGS. 9A-D. FIG. 9A illustrates a resilient media 900 with three layers and developing plants. The resilient media 900 in FIG. 9A includes a top or first layer 910, a middle or second layer 920, and bottom or third layer 930 that can be positioned adjacent to one another. Developing plants 950, 970, and 980 each having upper leaves 928 and lower leaves 926 are shown developing through openings 912 in the top layer 910, openings 922 in the middle layer 920, and openings 932 in the bottom layer 930. The plants in can be supported by bottom layer 930 where roots 940 can be located in openings 932 and which can be contacted with a nutrient solution.

FIG. 9B illustrates the developing plants 950, 970, and 980 being cut or harvested at a position 916 along the stems, which can be above some lower leaves like 926, resulting in first harvest crop portions 950H, 970H, and 980H. In FIG. 9B, 970R illustrates the portion of a plant remaining after harvest.

Figure 6A:
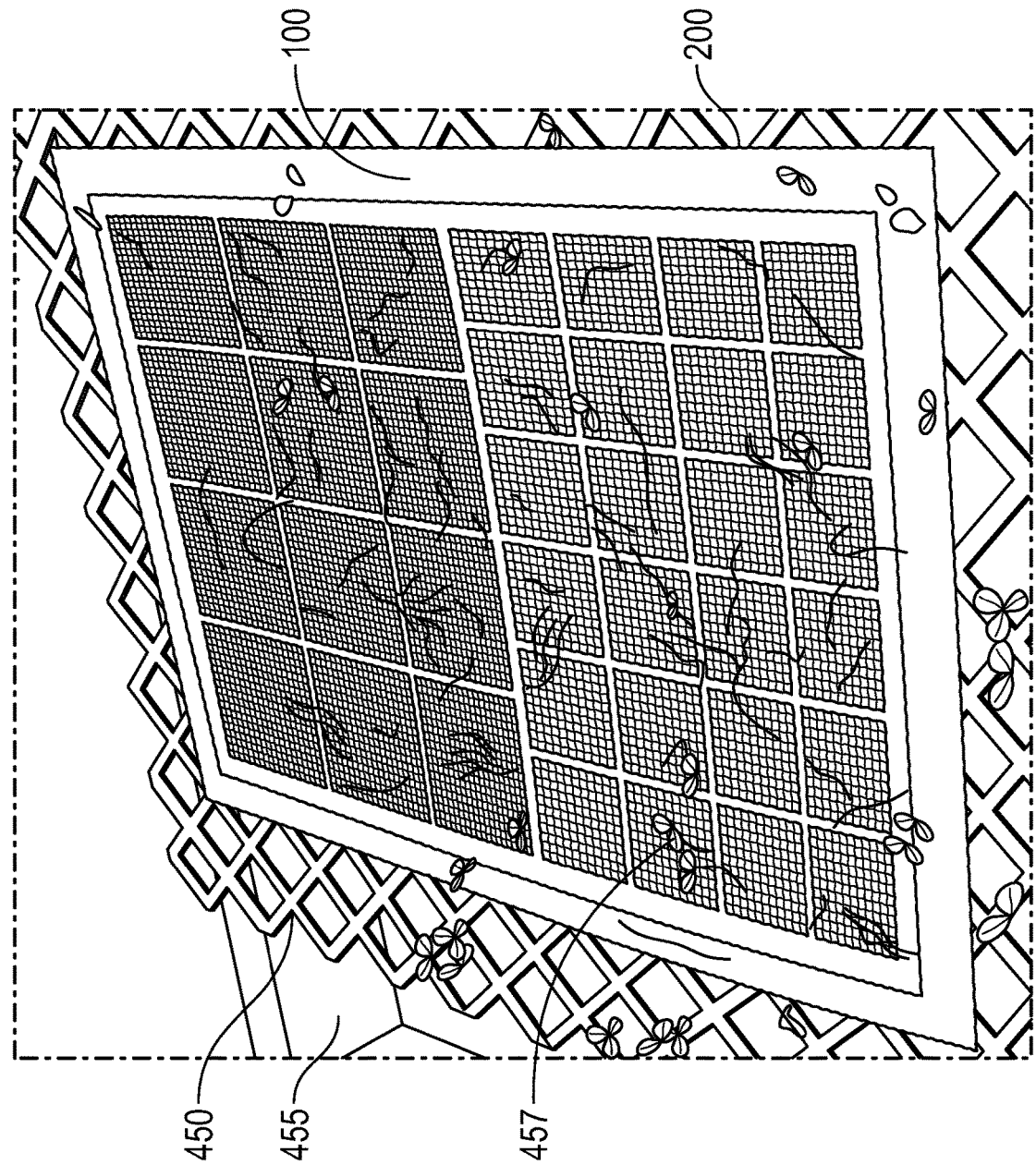
FIG. 6A shows a multilayer resilient media with plant debris, including roots and partial stems, on the top layer of resilient media.
Figure 6B:
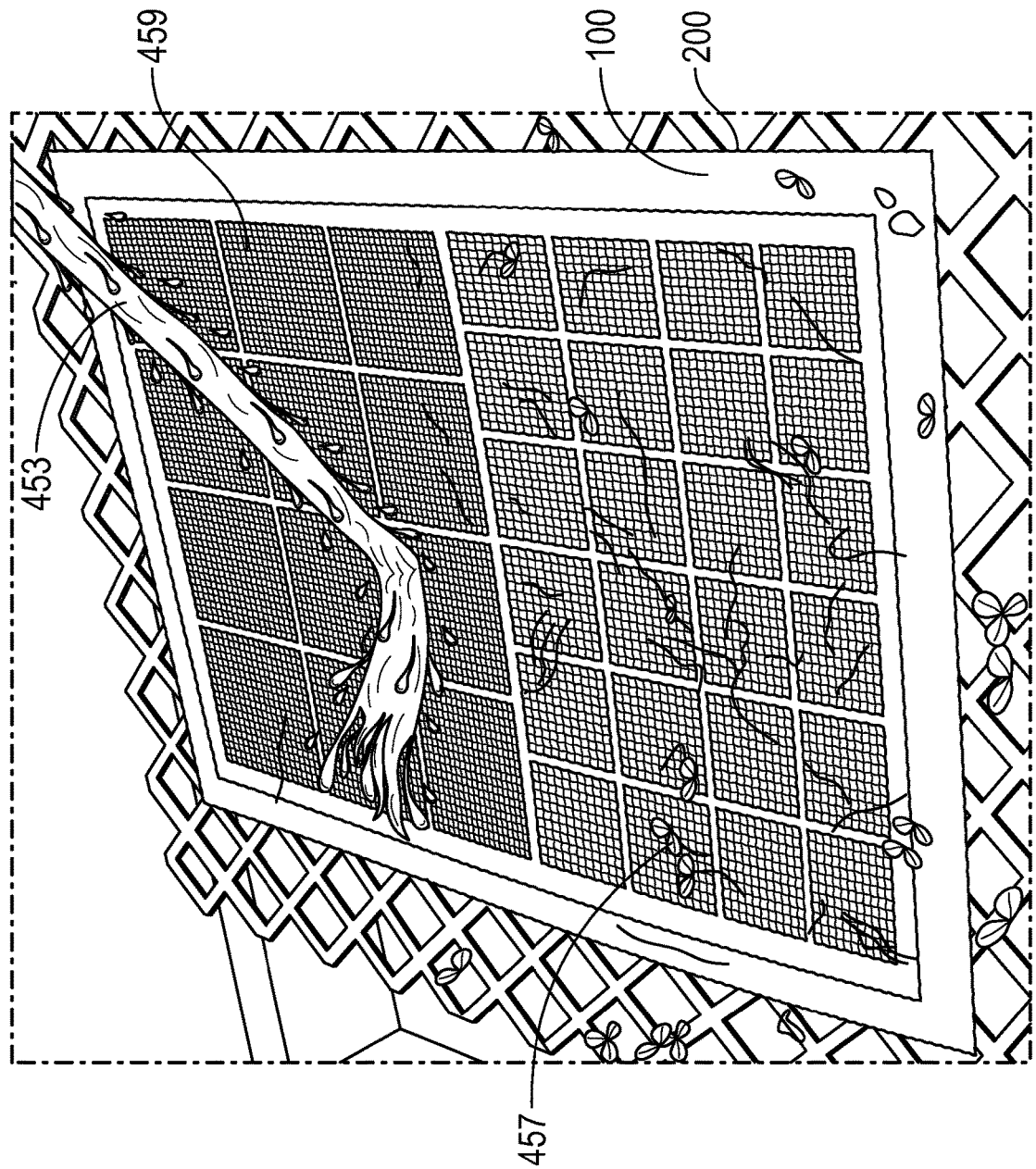
FIG. 6B shows a portion of the media in FIG. 6A after cleaning by spraying with water.

FIG. 9C depicts harvested portions 970H and 980H of the plants 970 and 980 being removed after cutting while harvest portion 950H, which can be upper leaves 928 from plant 950, from plant 950 is illustrated as debris remaining on the top layer 910 and partially blocks opening 912 (see FIG. 6A and 6B for additional examples of debris that can remain on the top layer of the media after harvest which can block openings). Remaining plant portions 950R, 970R, and 980R which can have one or more remaining lower leaves 926 that can be regrown to yield a second crop. Debris like 950H can lead to reduced plant development and increased algal growth, mold, and/or rot, during development of a second crop from the remaining plant portions.

FIG. 9D illustrates that the top layer 910 of the resilient media stack (e.g. layers 910, 920, and 930) can be removed by peeling or lifting the top layer 910 with debris 950H off and away from the three layer resilient media 900. Lifting and separating top layer 910 from lower layer 920 can permit enough free length of strands to bow/arch which can produce a larger opening between the strands for passage of the remaining plant parts 950R, 980R, and 970R therethrough while permitting removal of the layer 910 with debris like 950H/928 from the top surface of resilient media 900. The flexible and expandable openings 912 in the top layer 910 can be sized to support seed germination and subsequently after harvest allow passage of the remaining leaves 926 and stems of remaining plant portions such as 950R, 970R, and 980R to pass through the expanded openings 912 (separated strands) when layer 910 is removed. Once remaining plant portions such as 950R, 970R, and 980R have passed through the expanded openings 912, the strands can return and can assume their original position. Removal of top layer 910 and can facilitate removal of debris such as 950H/928 on layer 910 from the media 900. As illustrated in FIG. 9D, after removal of the top layer 910, the remaining leaves 926 and stems 950R, 970R, and 980R can be regrown to produce a second crop using the remaining layers 920 and 930. The layer 910 can be cleaned and reused.

Once ratooned plant portions 950R, 970R, and 980R have regrown, they can be harvested and ratooned a second time and optionally the remaining top layer 920 removed for still another or third cropping. The number and thickness of the layers in the resilient media can be chosen to support the plants and desired number of ratooning cycles.

Figure 17A:
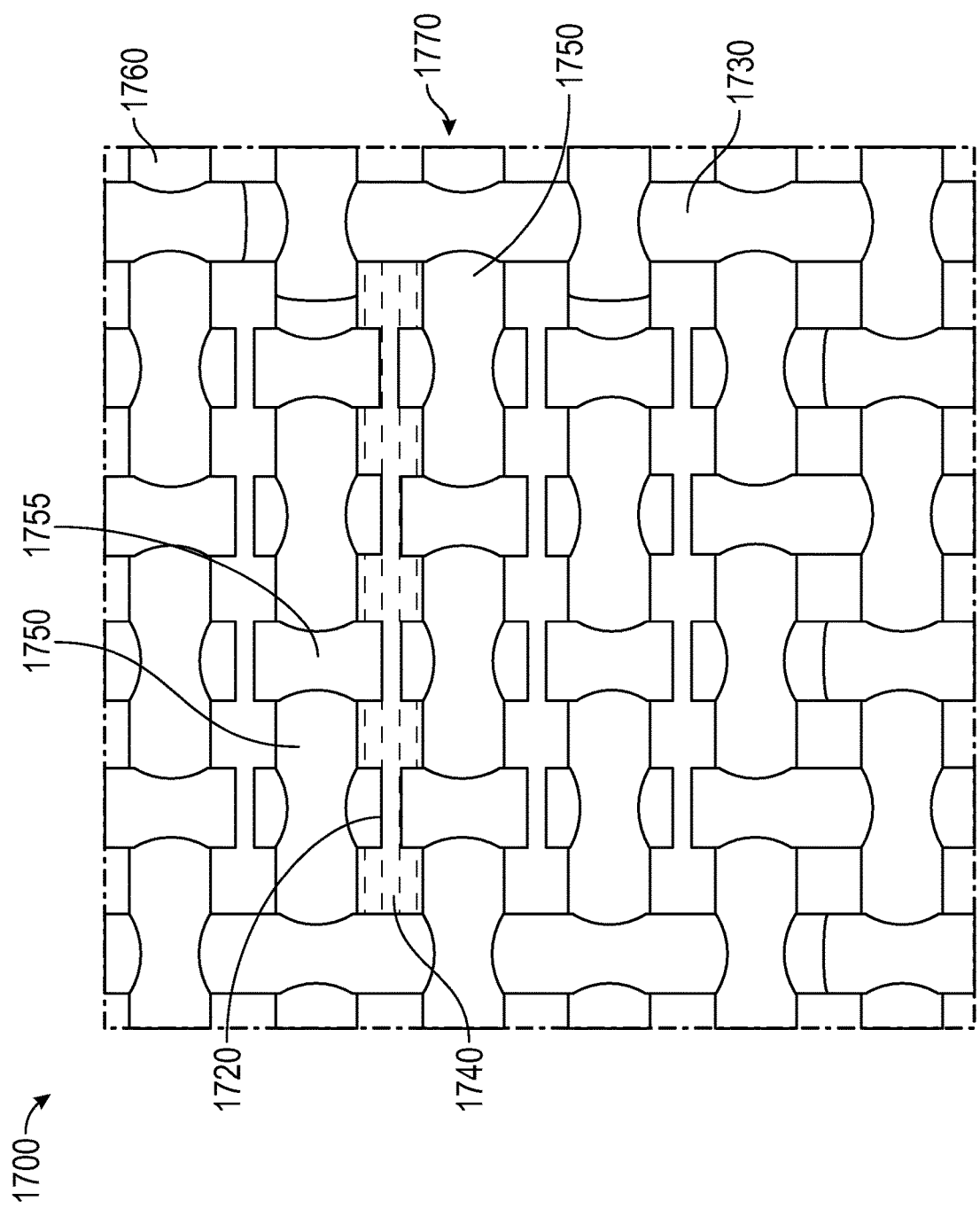
FIGS. 17A illustrate liquid retention between features within a layer of resilient media.
Figure 17B:
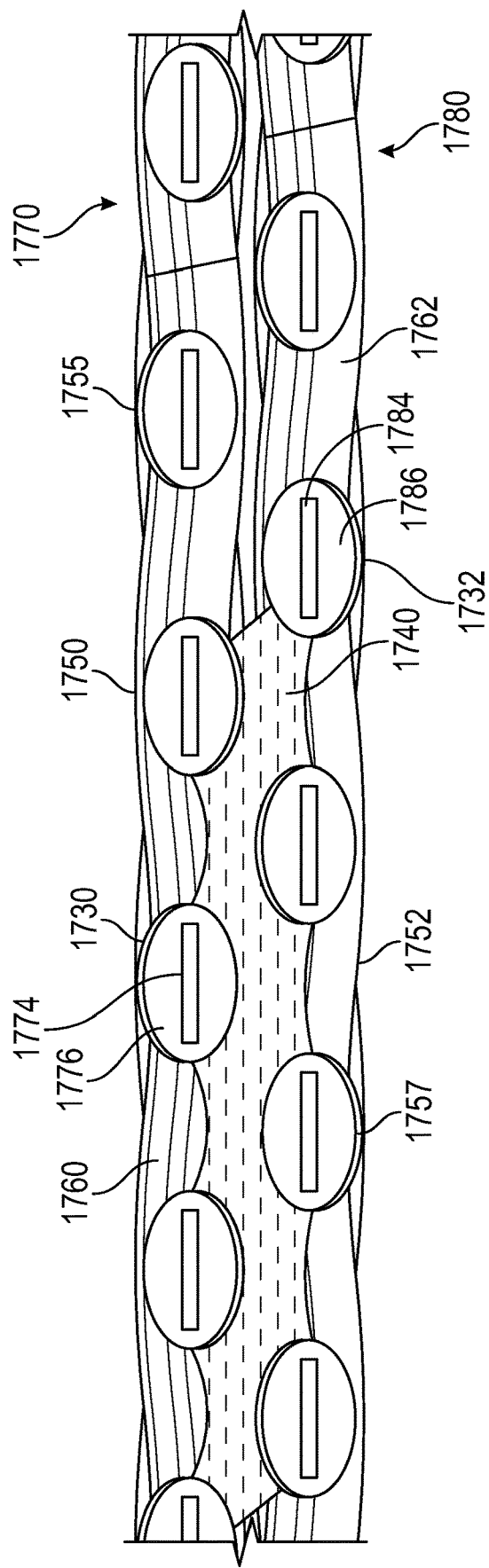
FIG. 17B illustrates liquid retention between adjacent layers and features of the adjacent layers of resilient media.

Top view 1700 in FIG. 17A illustrates a non-limiting example of liquid 1740 retained between features of a layer of resilient media 1770. Cross sectional view FIG. 17B illustrates liquid 1740 retention between adjacent layers 1770 and 1780 of strands and features of the adjacent layers. In some embodiments of the disclosure, adjacent layers of resilient media can have different lyophilic and/or lyophobic surface properties. For example, a top layer of resilient media in a multilayer stack can have surface properties different from a bottom layer to allow more or less moisture on the top level to support different seed germinating requirements.

The retention of liquid within a layer of resilient media in embodiments of the disclosure can be changed by varying the spacing of the strands within the layer, surface features of the strands within the layer, the lyophilic and/or lyophobic surface properties of the strands within the layer, or any combination of these. For multilayer resilient media, the liquid retention of the media can be changed by varying the retention of liquid within a layer and can further depend on the spacing of the strands between adjacent layers, surface features of the strands in adjacent layers, the lyophilic and/or lyophobic surface properties of the strands in the adjacent layers and combinations of these.

As illustrated in FIG. 17A, a liquid 1740 can be retained in openings 1720 between strands 1730 in an outer layer 1750 of resilient media. The liquid 1740 can support seeds during germination and can help control of vapor losses of the nutrient solution during plant growth. The resilient media can retain sufficient water so that seeds can have access to water during germination and can stay moist for the duration of a germination period. The liquid retention of the resilient media layers can be increased or decreased to accommodate the water needs of different seeds and plant cuttings. To prevent drying of seeds during germination, the resilient media can have one or more layers of strands or strand like geometries which forms parallel gaps between the strands and/or small openings or gaps 1720 when viewed from the top. In a non-limiting example of the disclosure, a layer made from a hydrophilic material, for example, water can wick into the openings of the media and stay in place due to adhesive and cohesive forces between the liquid and strand surfaces. In another non-limiting example, a resilient material with multiple layers, can have an additional layer or reservoir of water 1740 that can be retained between two layers 1770 and 1780 of the media as depicted in FIG. 17B. These "reservoirs" of water or nutrient solution 1740 can span both the strands 1730 and 1760 (top layer 1770) and strands 1732 and 1762 (bottom layer 1780) within each layer and/or also between the layer 1770 and layer 1780. These reservoirs can result in strong germination and support the root hairs as the roots start to germinate and continue to move downward finding the water trapped in the media. The openings and flexible porous structure of the resilient media allow for the roots to quickly penetrate below the resilient media layers which is desirable for transfer of the germinated seeds to an aeroponic, hydroponic, or nutrient thin film grow chambers.

FIG. 17A is a view 1700 of a non-limiting example of a top layer of resilient media 1770 formed by, for example, vertical strands 1730 and horizontal strands 1760. The resilient media 1770 can have slit shaped openings 1720 across vertical strands 1730 and parallel to horizontal strands 1760. Liquid such as water or nutrient solution can be repelled from the top surfaces 1750 and 1755 of the resilient media strands and surfaces due to the low surface energy properties of the material in some embodiments of the disclosure. The water or nutrient solution that is repelled from the top surface can be pushed to the openings between layers or into slits 1720 in the media and held in place by adhesive and cohesive forces. Liquid can be pushed between strands and can be held between strands and appendages by adhesive and cohesive forces. By pushing the water away from the top strand surfaces 1750 and 1755, the surface 1750 can become dry during use while a film of water or nutrient solution can be contained in some or all of the openings 1720. The liquid contained in the openings 1720 can support plant development, especially as seedling roots begin to penetrate the media openings and the dry top surface can reduce the growth of algae and mold.

FIG. 17B is a cross sectional view of two layers of resilient media 1770 and 1780 in a stacked relationship. A cross section of strand 1730 in layer 1770 shows a core 1774 and outer coating 1776; a cross section of strand 1732 in layer 1780 shows a core 1784 and outer coating 1786. Layer 1770 can include crossing strands 1760 with outer or top surface 1750 and layer 1780 can include crossing strand 1762 with outer surface 1752. A liquid such as water or nutrient solution can be repelled from the top surfaces 1750 and 1755 of the resilient media strands in layer 1770 and water or nutrient solution can be repelled from the outer or lower surfaces 1752 and 1757 of layer 1780 due to the low surface energy properties of the material in some embodiments of the disclosure. The water or nutrient solution 1740 can be pushed or directed to the openings between layers 1770 and 1780. A liquid 1740 such as water or nutrient solution is illustrated between portions of the layers 1770 and 1780. Multiple layers of resilient media materials 1770 and 1780 can have liquid 1740 between the layers. The liquid can be retained between the layers and held by adhesive and cohesive forces by the layers. The top surface 1750 may be the light facing side of the resilient media with developing plants or seedlings and can become dry during plant development which can reduce algae growth while liquid 1740 between the layers 1770 and 1780 can act as a reservoir for seedling roots. Liquid 1740 can also act as a vapor barrier to reduce evaporation and liquid 1740 can act as a light barrier to reduce light entering or transmitted to nutrient containers and drip pans below the resilient media layer 1780.

In an aeroponics growth chamber the roots of the developing plants passing through openings in the resilient media can be intermittently sprayed or misted with a nutrient solution. In a non-limiting example of resilient media layers having hydrophobic strands, surface nutrient solution can be pushed away from the strand top surfaces and towards openings between strands. This can result in the top surface 1750 of the media being relatively dry and can result in the formation of one or more small water or nutrient "plugs" 1740 in the gaps and openings formed by the strands. Providing a dry top surface 1750 in embodiments of the disclosure can be advantageous in reducing algae growth compared to cloth or rockwool substrates which can remain wet and promote algae growth on their top surfaces. The water or nutrient plugs 1740 in opening 1720 of a layer of resilient media can provide improved vapor barrier and aeroponic droplet barrier properties. Multiple layers of strands can be used to create a longer and/or more tortuous path against nutrient solution droplets which can further improve the vapor barrier and further minimize overspray. Multiple layers of resilient media can create a larger "plug" of water trapped in between the layers which can act as an additional barrier for vapor loss from the spray nozzles. The longer and/or more tortuous path formed by multiple layers of strands can also improve the light barrier properties of the resilient media and help to minimize algae growth in the nutrient solution reservoirs in aeroponic, hydroponic, and nutrient film growth chambers.

In aeroponic or hydroponic vertical farms, loss of nutrient supply to the roots of seedlings or developing plant can sometimes occur due to mechanical failure of pumps, valves, and/or power loss. Depending on the duration and timing in the plants' development, nutrient supply loss can cause stress or death of the developing plants. In this situation, it is beneficial to have some reserve of water in the growth media to extend the time the plants can survive. With a multi-layer resilient media in embodiments of the disclosure, the larger volume of nutrient solution retained between the layers in addition to the volume of nutrient solution within each layer can help extend the survivability of the plants when the nutrient's solution supply is interrupted.

EXAMPLE 1

This example illustrates a two-layer resilient media with resilient openings in each layer.

Each layer of the resilient media included strands. The strands in each layer were constrained as illustrated in FIG. 2A. The strands in the bottom layer 200 were constrained at least at a first constraining position 220 and a second constraining position 224 using, in part, a pliant white adhesive or caulking filler. A length of strand 242 spanned between these two constraining positions 220 and 224. The strands in the top layer 210 were constrained at least at a first constraining position/region 240 and a second constraining position/region 270. A length of strand, e.g., 252, spanned between these two constraining regions 240 and 270.

FIGS. 2A-B, and FIGS. 3A-C, respectively illustrate various aspects of two layers, bottom layers 200 and 302 and top layers 210 and 306 of multilayer resilient media used for germinating seeds and developing plants. The strands were made of fiberglass cores coated with silicone rubber. Each layer included constrained strands that formed a flexible layer, slab, or sheet, that could be handled separately from other layers as shown in FIG. 2A and FIGS. 3C. Each layer was flexible and could be rolled and unrolled. FIG. 2A and FIG. 3C shows each of the two layers being rolled and bent to illustrate the strands and elongated openings (dashed regions). FIG. 2A and FIG. 3C illustrate that the resilient media layers or sheets were able to be rolled or curled for positioning on curved surfaces.

FIG. 2A further shows elongated opening 280 (dashed region) that was formed by separating strands in the bottom layer 200. Strand 242 is an example of a strand with openings therein. Inner strand openings of 242 gave the strand texture. Elongated opening 285 (dashed region) was formed by separating strands in the bottom layer 200. Elongated opening 260 in top layer 210 was formed by separating adjacent resilient strands in the top layer 210. Elongated opening 265 was formed by separating adjacent resilient strands in the top layer 210. Openings 260 and 265 in the top layer 210 were oriented approximately 90 degrees to the openings 280 and 285 in the bottom layer 200. Second constraining region 270 of top layer 210 can include a filler 272 in open areas of the resilient media to further strengthen the constraining region. In FIG. 2B, nub, extension, or appendages 262 on strands 250 and 252 are illustrated. Portion of the elongated opening 260 with non-parallel sides was formed by bending the two adjacent resilient strand 250 and 252 apart from each other. Resilient strands were bent along their length and from where they were constrained (bottom) in region 270. Strand 252 has a lattice structure similar to strand 242. Constraining region 270 illustrates a region that can have limited resilience due to the connecting portion 254 that has high stiffness between strands 250 and 252.

As shown in FIG. 2B, the strands, for example 250 and 252, or 250 and 251, of the top layer 210 were positioned in close proximity to one another along their length and between the constraining positions. Some strands were touching or nearly touching and others were separated. The strands were constrained at the positions in each layer, for example opposing constraining regions 240 and 270 in the top layer 210. Constraining region 270 included an adhesive or filler 272 and physical attachment 254 between the adjacent strands 250 and 252. The strands in this example were made by making cuts into a pre-made silicone woven mat. Some of the strands in each layer had appendages or nubs on one or both sides of the strands. In this example the nubs were the result of cutting slits into the pre-made mat. The small appendages/nubs such as 262 resulted in an irregular cross section along the length of some of the strands and the opening between separated strands formed/defined an elongated opening or slit, e.g., 260, 263, 265 with a combination of smooth and irregular edges. The layers had about the same thickness, as measured between top and bottom surfaces of each layer. The thickness of each layer was about 1 millimeter. Illustrative openings such as 265 can be formed between portions of separated strand 252 and strand 253; opening 260 can be formed between portions of separated strands 250 and 252; and, opening 263 can be formed between portions of separated strands 250 and 251.

The top layer 210 of resilient media in FIG. 2A is shown in greater detail in FIG. 2B. FIG. 2A illustrates a strand 242 in the bottom layer 200 that has openings and that formed a lattice. FIG. 2B shows that some of the strands in layer 210 had nubs or appendages 262 and that one of the strands 252 had openings that formed a lattice. Some nutrient solution or water could be held by surface tension by the appendages or lattice. The strands in this example were fibers coated with a non-absorbent silicone elastomer that prevented absorption of nutrient solution into the fiber.

As illustrated in FIG. 2A, the constrained resilient strands in each of the two layers were further separable from one another to create larger openings such as 260 and 265, and 280 and 285 in the top and bottom layers 210 and 200 respectively (illustrated by dashed regions). These openings were created by exerting a lateral force on the strands. FIG. 3A illustrates an opening 360 between separated strands (dashed region) in a top layer of the two layers (bottom layer opening formed too but is not visible) that was widened as a tool 305 was inserted between the strands (the layers were supported by an open frame, not shown, which allowed the tool to penetrate below the surface), and FIG. 3B illustrates the same opening (360 dashed region) becoming smaller and closing as the tool 305 was removed and the resilient strands were returned to their original proximate position. Thus, the strands exhibited flexibility and resilience.

As shown in FIG. 3A, the strands were constrained at least at a first position (top white adhesive 332), a second position (middle white adhesive 322), and even a third position (lower white adhesive 312) in each layer. Other positions where the strands were constrained are not shown in FIG. 3A but are visible in FIG. 3C. Perimeter constraining regions 324 and 334 are illustrated in FIG. 3B.

FIG. 3B illustrates germinating seeds positioned in contact with adjacent resilient strands and opening formed therefrom. FIG. 3C illustrates elongated openings in the second (top) layer. The arrow mark on second/top layer 306 shows the long aspect of openings in the second/top layer 306 that has strands 350. Perimeter constraining regions 320 and 330 can overlap or intersect with constraining regions 310 and 340 in the top layer 306. Developing plants 355 are shown on top layer 306. Arrow mark on the first/bottom layer 302 shows long aspect of elongated openings in the first (bottom) layer which are oriented about 90 degrees to the long aspect of the openings indicated by arrow in the top layer 306. The top layer or sheet 306 is curled upward to show bottom layer.

FIGS. 3A-C illustrate that the strands were positioned in a layer or slab. The thickness of each layer or slab in this example was about 1 millimeter. There was little or no sagging or bulging of the strands in FIGS. 3A-B, and the strands constrained between the first position and the second position were located within the thickness of the layer or were located above or below that layer by no more than the strand thickness. The resiliency of each strand constrained at the at least two separated positions allowed adjacent strands in each layer to be separated or deformed from their initial position, for example by a root or plant stem, and then returned to the initial position or to within about plus or minus one strand cross section from the original strand position in the layer of the media.

The images in FIGS. 3A-B also shows the multilayer resilient media supported seeds and seed germination on the top layer of the media. The seeds were germinated by placing seeds on the top layer of the resilient media and wetting the seeds and media with water. The size of the openings between the strands in this example prevented the seeds from falling through the media and allowed them to germinate.

FIG. 2A and FIG. 3C together illustrate a resilient media having a first layer that included a plurality of adjacent resilient strands having an initial orientation, the resilient strands constrained at two or more separate positions across a length of the strands. The media had a second layer adjacent to the first layer (below in this example) that included a plurality of adjacent resilient strands that had an initial orientation, the resilient strands constrained at two or more separated positions. The second layer was in a stacked relation relative to the first layer and the strands of the first layer and the strands of the second layer were in a non-aligned orientation relative to each other. FIG. 2A also illustrates two layers of resilient media with strands that were separated from one another demonstrating the flexible nature of the layers, the openings formed, constrained areas, and texture of some of the strands. The strands in each layer moved independently of strands in adjacent layers. The openings in each layer of the multilayer resilient media combined to create paths from top-to-bottom through which roots and or plant shoots were able to penetrate. Strands and openings in the adjacent layers in this example, shown by the directional arrows on each layer in FIG. 3C, overlapped and crossed one another at about 90 degrees, i.e., establish a crisscross pattern. Each layer formed 2 sides of the opening in each layer moving through the resilient media.

The image in FIG. 3A shows strand 350 and strand 352 that were separated by a tool 305 inserted between the opening between these adjacent strands (the media are positioned over an open support) in the top layer and through openings between adjacent strands in the bottom layer. The tool 305 separated the strands 350 and 352 further from each other and formed an elongated opening 360 in the top layer between constraining positions 322 and 332. The elongated opening was formed by resilient strands in the top and bottom layers being deflected or arched laterally from their initial orientation by the tool. Elongated opening 360 is an example of an asymmetric opening formed by laterally arching the strands and the position of the tool. The opening 360 was narrower near constraining region 332 (e.g., strands 350 and 352 were closer nearer the constraining region 332) and the opening was wider near constraining region 322 (e.g., strands 350 and 352 were further apart near the constraining region 322 than they were near the constraining region 332). The maximum separation between the strands 350 and 352 (arch/bow) was closer to the constraining region 322 than to constraining region 332.

The image in FIG. 3B shows the resilient strands 350 and 352 returning to their original position as the tool 305 was removed. The resiliency of each strand constrained at the at least two separated positions allowed adjacent strands in each layer (only top layer shown) to be separated, deformed, or otherwise moved from their initial position when the tool was inserted; the strands returned to their initial position when the tool 305 was removed.

FIG. 3C illustrates the development of plants on the resilient media. The plants were supplied with light and nutrient solution to support their growth and development. The arrow on the perimeter of the top layer reflects the lengthwise direction or axis of the strands and elongated opening defined by the strands 350 of the top layer 306 between constraining regions such as 310 and 340. The arrow on the bottom layer perimeter reflects the lengthwise direction or axis of the strands and elongated openings defined by the strands of the bottom layer between constraining regions. The top layer 306 included perimeter constraining regions 320 and 330. The top layer 306 was in a stacked relation relative to the bottom layer 302. The strands of the bottom layer 302 and the strands of the top layer 306 were in a non-aligned orientation relative to each other and the elongated openings in the two layers were oriented at about 90° relative to each other.

As shown in FIG. 3C, the layer included divisions that define discrete plant development regions. The divisions generally established positions or regions of constraint for the individual strands. Thus, in FIG. 3C, the top and bottom layers were divided into sixteen regions for plant growth. In FIG. 3C, the divisions were established by a silicone skin. The sixteen regions shown in FIG. 3C were square in geometry and of equal size. (Note that different geometries and size distributions of regions may be implemented as illustrated in FIG. 4B and Example 2 below.)

The results of this example show a resilient media that had a first layer and a second layer in a stacked relation. The first layer included a plurality of strands that were in side by side alignment and constrained at two positions. The second layer included a plurality of strands that were in a side by side alignment and fixed at two positions. The second layer was in stacked relation relative to the first layer. The strands of the first layer and the strands of the second layer were in a non-aligned orientation relative to each other. The resilient media was able to support and germinate seeds and to develop seedling plants from the seeds.

EXAMPLE 2

This example illustrates plant development using a multilayer resilient media. The resilient media in this example was prepared according to the method used in Example 1, except that two different length strands and openings were created by cutting slits in a mesh material (large opening regions/boxes with substantially inflexible constraining regions and small opening regions/boxes with substantially inflexible constraining regions). The resilient media had a top layer with elongated openings and a bottom layer with elongated openings. The elongated slit openings in the top layer were positioned across and substantially perpendicular to slit openings in the bottom layer. The two different sized areas were about 13 centimeter squared ($cm^2$) and 36 $cm^2$ with longitudinal or lengthwise strand lengths of about 3.6 centimeter and 6 centimeter for the small and large regions respectively.

Seeds were placed on the top layer of the resilient media, wet with water, and the resilient media was supported on a tray or support 450 with openings that was positioned in an enclosed germination chamber until the seeds germinated.

Figure 4A:
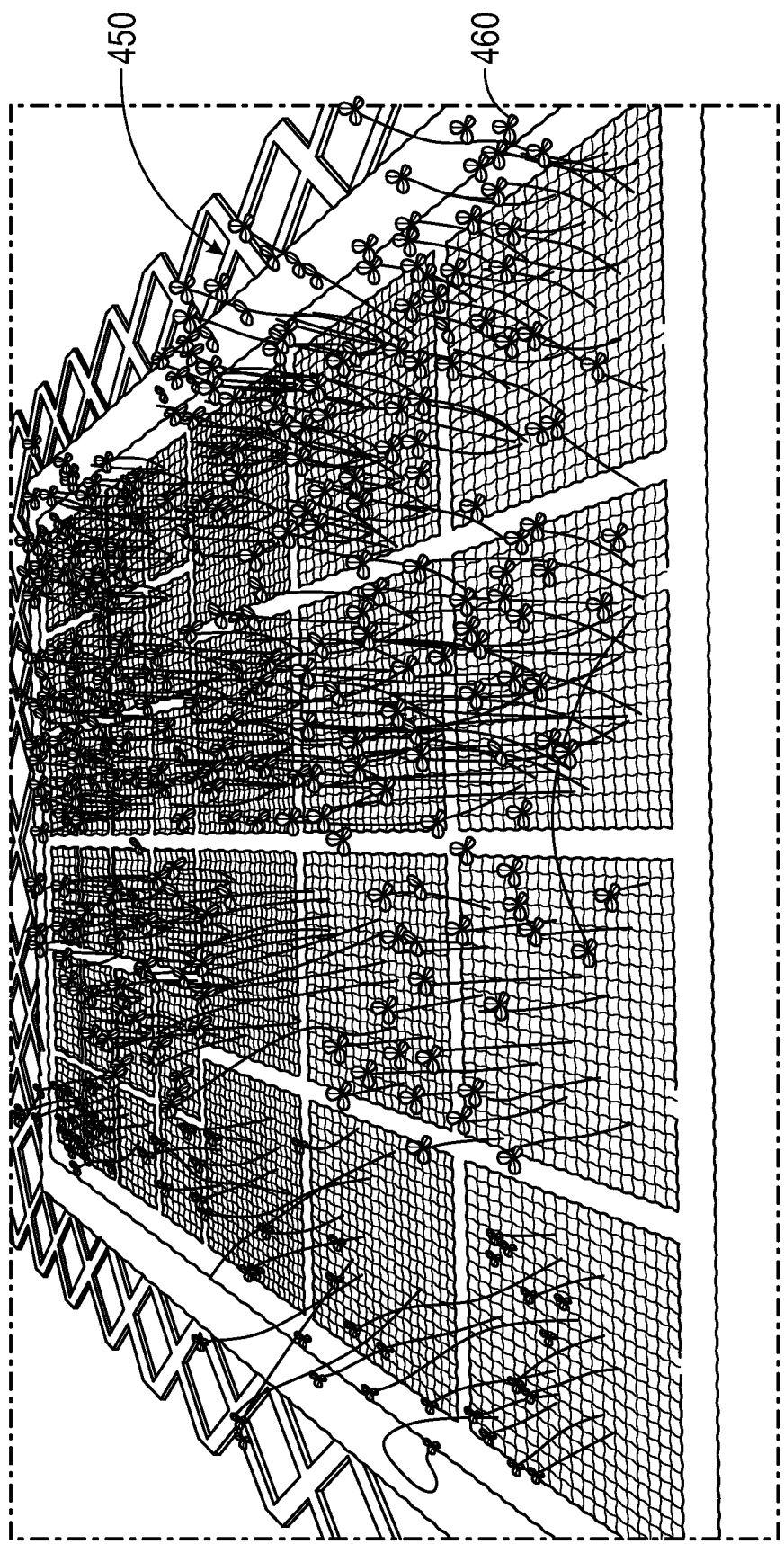
FIGS. 4A-B illustrate germination of seeds using a resilient media with elongated openings in the top layer substantially perpendicular to elongated openings in the bottom layer.
Figure 4B:
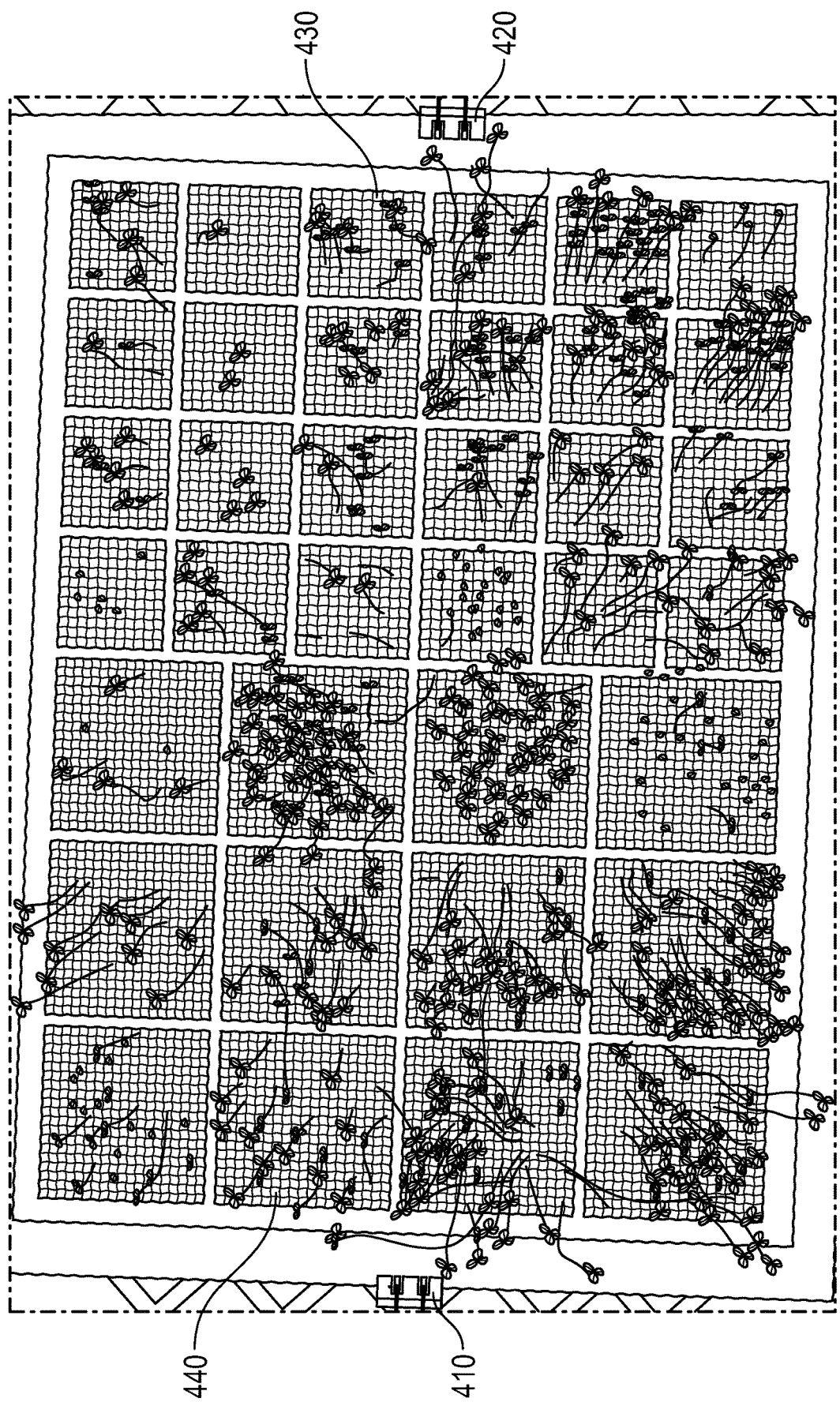

FIGS. 4A-B show side and top views of seedlings 460 from the germinated seeds on the top layer of resilient media. The seeds were supported in part by the crisscrossing of the strands and openings of the two layers prior to germination. The seedling plants 460 grew above the top layer, and the roots extend through the openings or formed openings in the top and bottom layer and through the support tray 450.

As shown in FIGS. 4A-B, the top surface of the resilient media supported by tray 450 was flat and absent any protruding strands that were bowing or bent out of plane. Removable clamps 410 and 420 were used to hold adjacent layers together in a fixed orientation of the openings in the two layers of about 90 degrees. Based on the two different strand lengths of about 3.6 cm and 6 cm, two different sized regions or areas of openings, 430 and 440, were formed. The opening between the adjacent resilient strands in the smaller squares, e.g. 430, were approximately 3.6 centimeters in length (long aspect between constraining regions) and the strands could be separated between 2 millimeters and 3 millimeters or more by lateral bending or separating the strands in the plane of a layer. The openings between the adjacent resilient strands in the larger squares, e.g. 440, were approximately 6 centimeters in length (long aspect between constraining regions) and the adjacent strands could be separated between 2 millimeters and 4 millimeters or more by lateral bending. Both the large and small openings supported seed germination and seedling development at high and low seeding densities.

Figure 5:
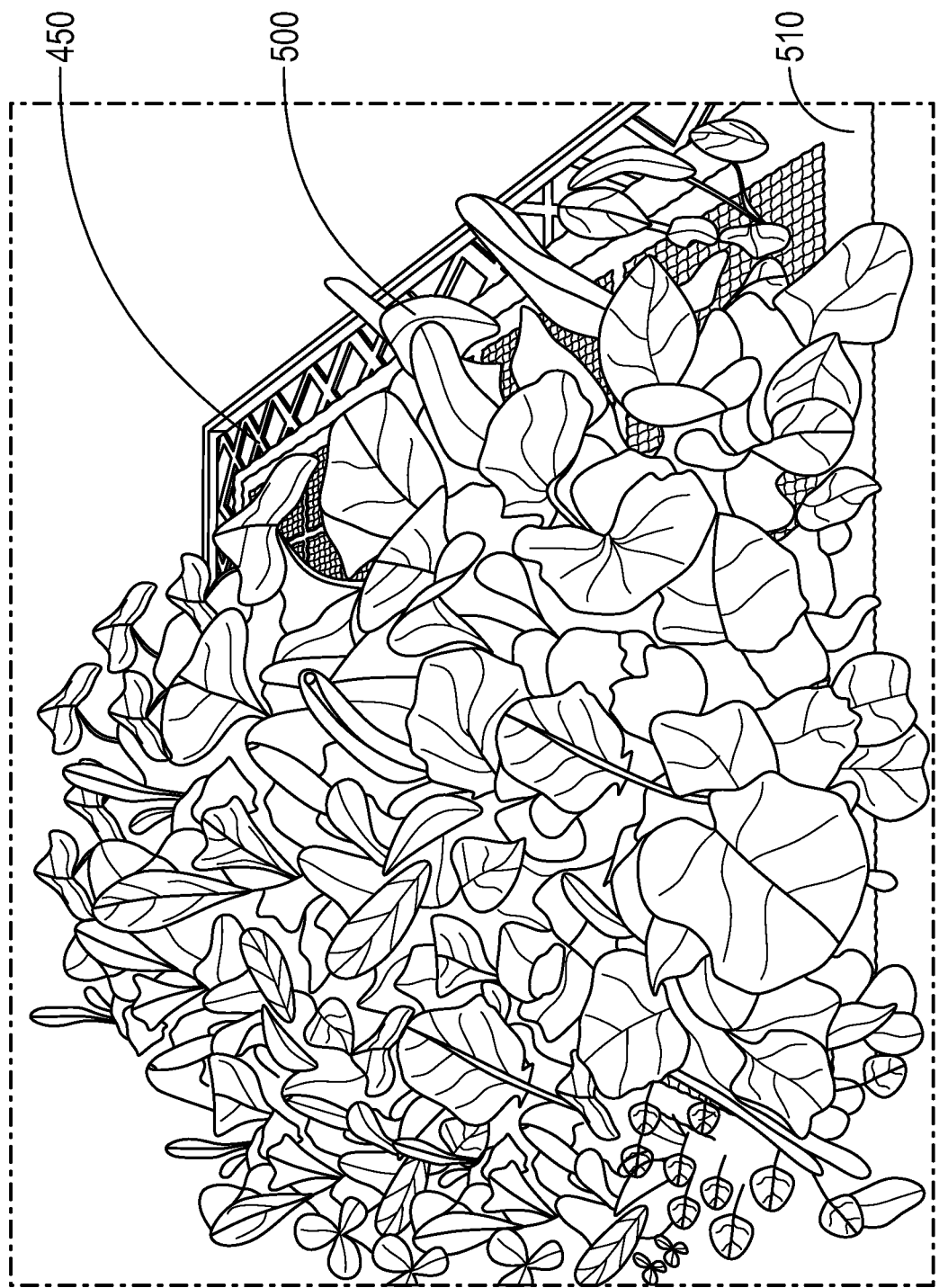
FIG. 5 shows development of plants on a resilient media after 8 days in an aeroponic growth chamber. The resilient media was supported on a tray with openings for roots to contact the nutrient solution and was bordered on edge areas (without resilient media) with coroplast outside of the media to prevent overspray of nutrient solution past edges of the resilient media and onto the developing plants.

FIG. 5 shows the development of the plants 500 after 8 days on the resilient media in an aeroponic growth chamber. The resilient media in the aeroponic chamber was supported on the plastic tray 450 with openings and a metal lattice that supported the resilient media and tray in a container of the aeroponic growth chamber. In this test setup the resilient media 510 was smaller than the container and was bordered with Coroplast™ plastic sheet to prevent overspray. LED lighting and a nutrient solution were used to develop the plants 500 from the seedlings.

The results of this example show that a resilient media with different sized elongated openings were able to be used to germinate seeds and develop plants in an aeroponic growth chamber.

EXAMPLE 3

This example illustrates ease of cleaning a resilient media after germination, plant development, and harvest. After harvesting the plants developed in Example 2, the two layers (e.g. top layer 100, bottom layer 200) of the resilient media were supported on a tray or lattice 450 with openings that was positioned over a container 455 and sprayed with water 453 from a spray nozzle.

FIG. 6A shows the top layer of the resilient media 100 with plant debris 457 including roots, leaves, and partial stems which passed through the two layers (bottom layer 200) and that remained after harvest. FIG. 6B shows a portion of the media after spraying with a cleaning spray 453 such as water from a nozzle. Greater than 95% of the plant debris remaining after harvest was readily removed by the spraying as illustrated in part in cleaned area 459. After cleaning and removal of plant debris, the strands of the resilient media returned to substantially their original position.

The results of this example showed that the resilient strands which supported the development of plants through harvest also facilitated cleaning of the media to remove roots, stems, leaves, and other post-harvest debris.

EXAMPLE 4

This example illustrates the flexibility of resilient strands constrained at two or more positions in a resilient media.

The seedlings shown in FIGS. 7A-D are the same as those that were shown growing in the resilient media of Example 1 (see FIG. 3C).

The dashed circular area 710 in FIGS. 7A-D illustrate sequentially the tender and fragile seedlings being pulled directly from the resilient media with the roots intact.

Figure 7A:
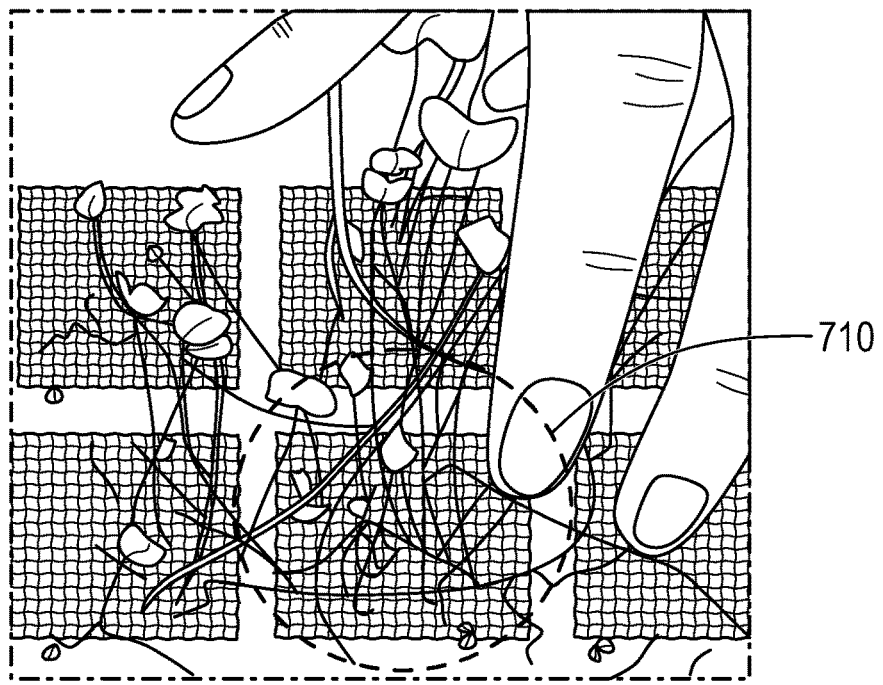
FIGS. 7A-D sequentially show young seedlings growing in the resilient media hydroponically and, at about 3 days post-germination, being pulled directly from the resilient media with the roots intact.

FIG. 7A shows the seedlings that were gathered for removal from a region of the resilient media indicated by the dashed circular region 710. The media was retained in place by hand because without holding, the plants were able to lift the media without being separated from the media.

Figure 7B:
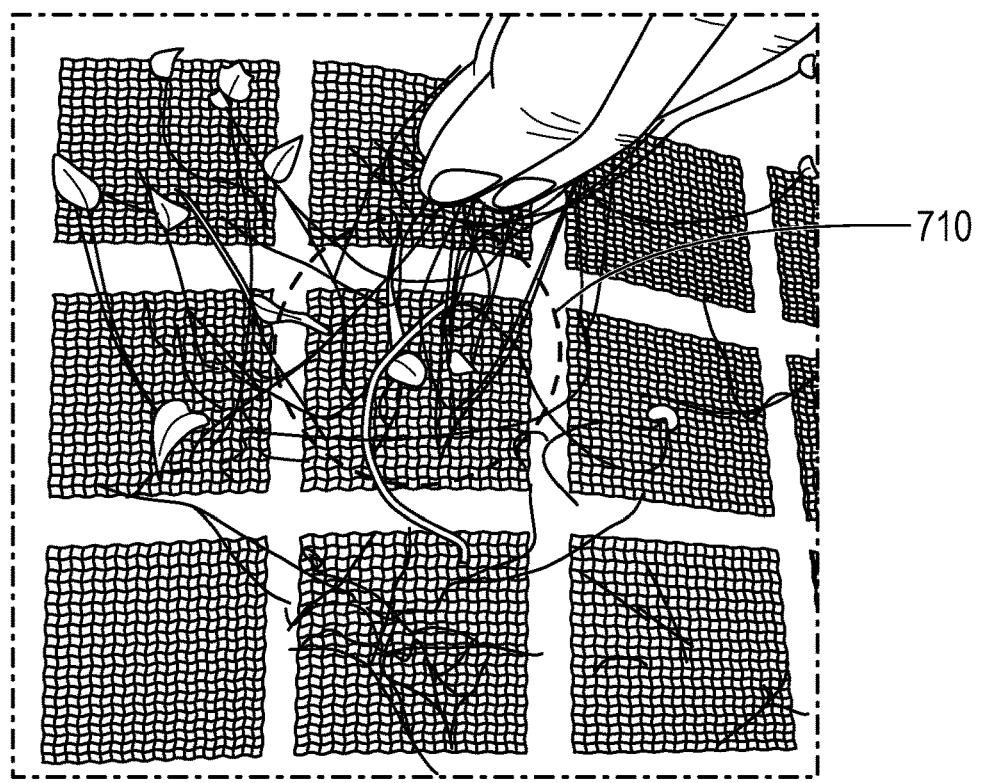

FIG. 7B shows the initial pulling of the seedlings from the resilient media in the region indicated by the dashed circular region 710.

Figure 7C:
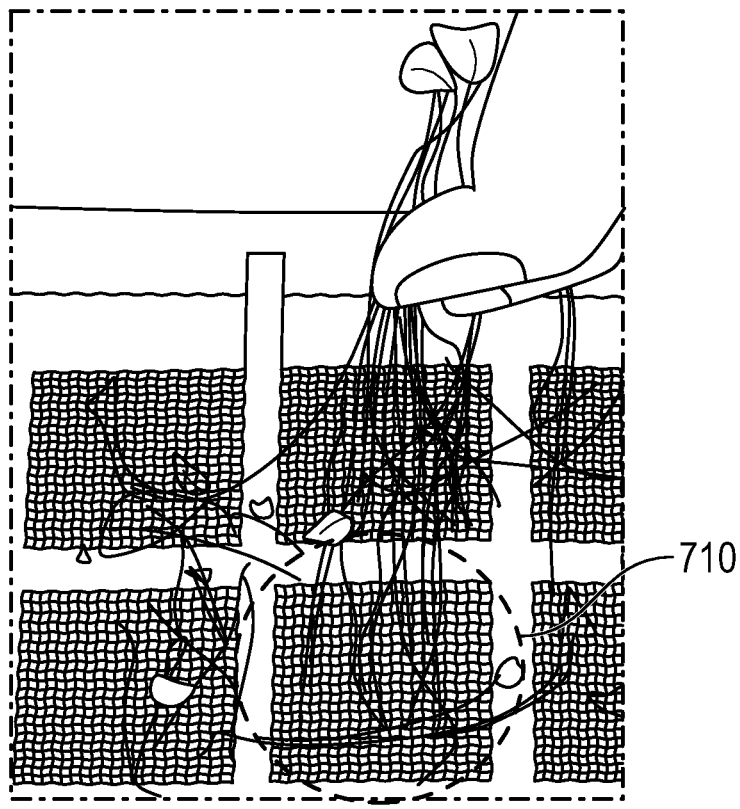

FIG. 7C shows the further pulling of the seedlings from the region of resilient media indicated by the dashed circular region 710.

Figure 7D:
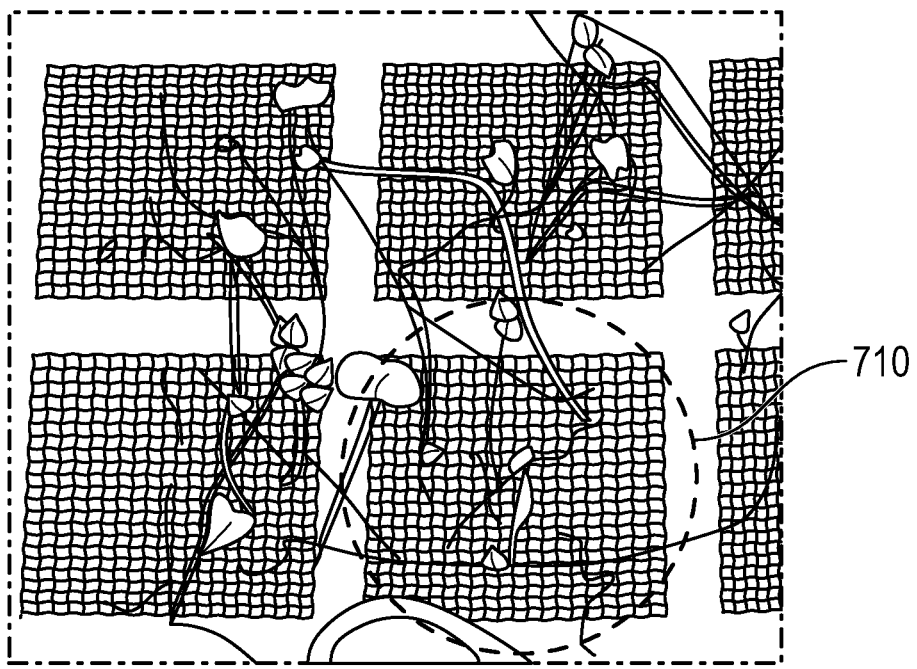

FIG. 7D shows the reduced number of seedlings in the region resilient media indicated by the dashed circular region 710 after pulling. Strands of the resilient media returned to their original positions after the seedling removal.

The results of this example illustrate that the resilient strands support very young developing plants. The results also show that with enough force, the strands can be separated which allowed removal of the roots and stems of the young plants from the media. The openings between the adjacent strands were sufficiently close together to support the plants while they were growing. The strands were resilient enough to permit the seedling with roots intact to be pulled from the media which benefits cleaning and reuse of the media.

EXAMPLE 5

This example illustrates a resilient media that includes a combination of resilient strands and multiple resilient constraining regions.

FIG. 8A shows aspects of a layer of the resilient media that had force applied to it to laterally arch the strands of the media. The resilient media in this example includes a combination of resilient strands fixed along a length of the strands and a resilient constraining composition at multiple constraining regions 810, 860, and 880 that traverses and positions the strands. As illustrated, constraining regions 810, 860, and 880 have fixed positions in the layer of resilient media. The resilient media shown in FIGS. 8A-B also have side perimeter constraining regions 805 and 815. The resilient media as shown in FIG. 8A has three constraining regions 810, 860, and 880 that cross the strands and are in substantially the same plane as the strands. Several of the strands are shown in a bent or arched configuration that resulted from applying a lateral force to the strands in order to pull them apart. FIG. 8A illustrates resilient strands such as 818, and 828 in a laterally arched configuration. Separated resilient strands 818 and 828 formed an opening 870; opening 890 is also shown between separated strands. Separating or arching strands 818 and 828 formed opening 870 between constraining regions 810 and 860 and did not separate the same strands between the center constraining region 860 and lower constraining region 880. The openings 870 and 890 have elongated shapes formed between the strands fixed at constraining positions 810 and 860. The opening 870 has an elongated shaped formed between the strands 818 and 828. Strand 818 and strand 828 are fixed at constraining positions 810 and 860. The strands, for example 818 and 828 have a wavy or undulating structure along their length and are free of any appendages or nubs. Opening 870 illustrates an opening formed by bowing or arching of strand 818 with strand 828 remaining substantially straight. The opening 870 is substantially symmetrical along its length, with similar gaps between the strands near the flexible constraining regions 810 and 860. Elongated opening 890 (e.g., dashed region) is an example of a more asymmetrical opening along its length with the strands that make up the opening closer together for an extended length near constraining region 860 compared to the more abrupt convergence of the strands near the constraining region 810.

FIG. 8B illustrates a resilient media that had resilient constraining regions 810, 860 and 880 perpendicular to the strand axes, resilient constraining perimeters 805 and parallel to the strand axes, and resilient strands such as 820 and 830 in a spaced relationship in constraining regions 810, 860, and 880 when the media was in an unstretched or relaxed configuration. FIG. 8B shows the layer resilient media in a relaxed state (no stretching of resilient strands or resilient constraining regions) with un-bent resilient strands 820 and 830 with small opening 855 between them. Strands 820 and 830 were separated from each other in top constraining region 810 and the center constraining region 860 which formed a small opening 855 between strand 820 and strand 830. In this relaxed un-arched state without force applied to any of the strands, the strands were approximately 5 centimeters in length (strand longitudinal aspect dimension between each constraining region) and between 0 millimeters (strands touching) and about 1 millimeters space between the adjacent strands (strands not touching with gaps indicated by light area). The adjacent strands were touching in some areas and spaced apart in other areas. FIG. 8B shows perimeter constraining regions 805 and 815. The un-bent strands 820 and 830 were fixed by regions of resilient constraining material/composition at 810, 860, and 880. The regions of resilient constraining material were relatively flat and unfurled. The lengths of the strands 820 and 830 between constraining regions 810 and 860 which formed the sides of the opening 855 were at least 5 times the separation between the strands 820 and 830 that form the ends of the opening 855 in the constraining regions 810 and 860.

Figure 8C:
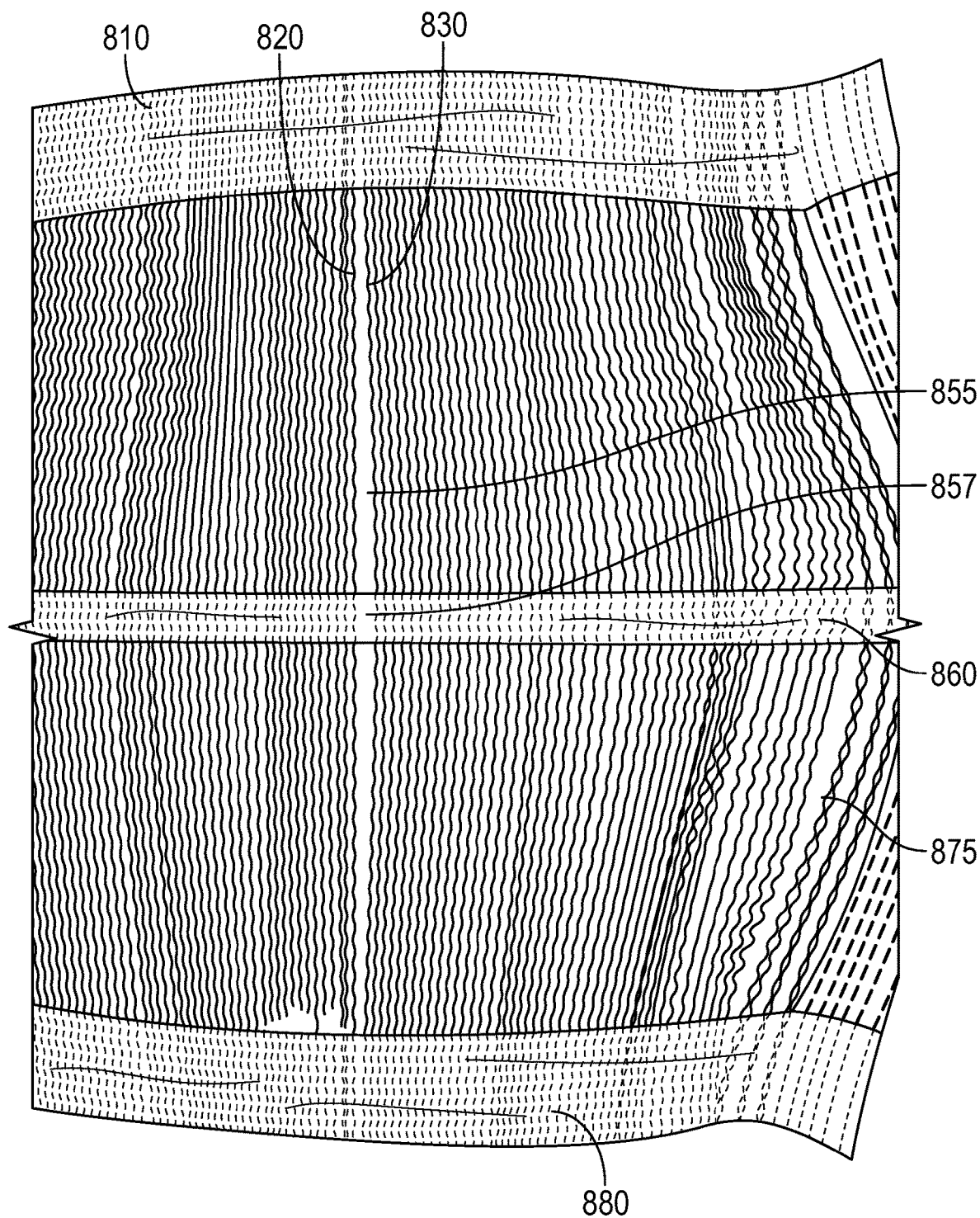

FIG. 8C shows the layer of resilient media of FIG. 8A with the center region 860 of constraining resilient composition laterally stretched (<-->) by application of a pulling force to the opposite center edges of the media at restraining region 860. FIG. 8C illustrates resilient constraining region 860 stretched outwardly (Θ→) which elongated this region and led to opening 855 being enlarged compared the opening 855 illustrated in FIG. 8B. The stretching resulted in greater separation of the strands and formed openings like 855 and 875. Opening 855 illustrates a slit like opening. Opening 875 had an irregular elongated shape formed by bending and separation of the strands near the edges of the media. The top 810 and bottom 880 regions of resilient containing material became curled at the edges and the strands near the edges were more bent than strands at the center as a result of the applied pulling force. The strands in the media were able to be laterally arched but did not elongate when pulled lengthwise. The spacing between strands 820 and 830 was increased because of the outward stretch (Θ→) of region 860 depicted in FIG. 8C compared to the same strands in this region in FIG. 8B. The increased spacing between strands 820 and 830 within and adjacent to the resilient constraining region 860, as shown in FIG. 8C, was the result of stretching (<-->) the constraining region 860. For example, opening 855 formed by strands 820 and 830 in FIG. 8C was larger than opening 855 formed by strands 820 and 830 in FIG. 8B between constraining regions 810 and 860. Separation 857 between strands 820 and 830 in the constraining region 860 in FIG. 8C was larger than separation 857 between strands 820 and 830 in FIG. 8B in the constraining region 860. Opening 875 in FIG. 8C was also formed between strands near a perimeter region of the media. The increased strand spacing between adjacent strands near the constraining region facilitated cleaning the resilient media by more easily freeing stems and roots in these areas compared to less resilient or substantially fixed constraining regions such as 270 in Example 1 (e.g. "v" shaped opening portion of 260 near the connecting portion 254 in FIG. 2B).

Figure 8D:
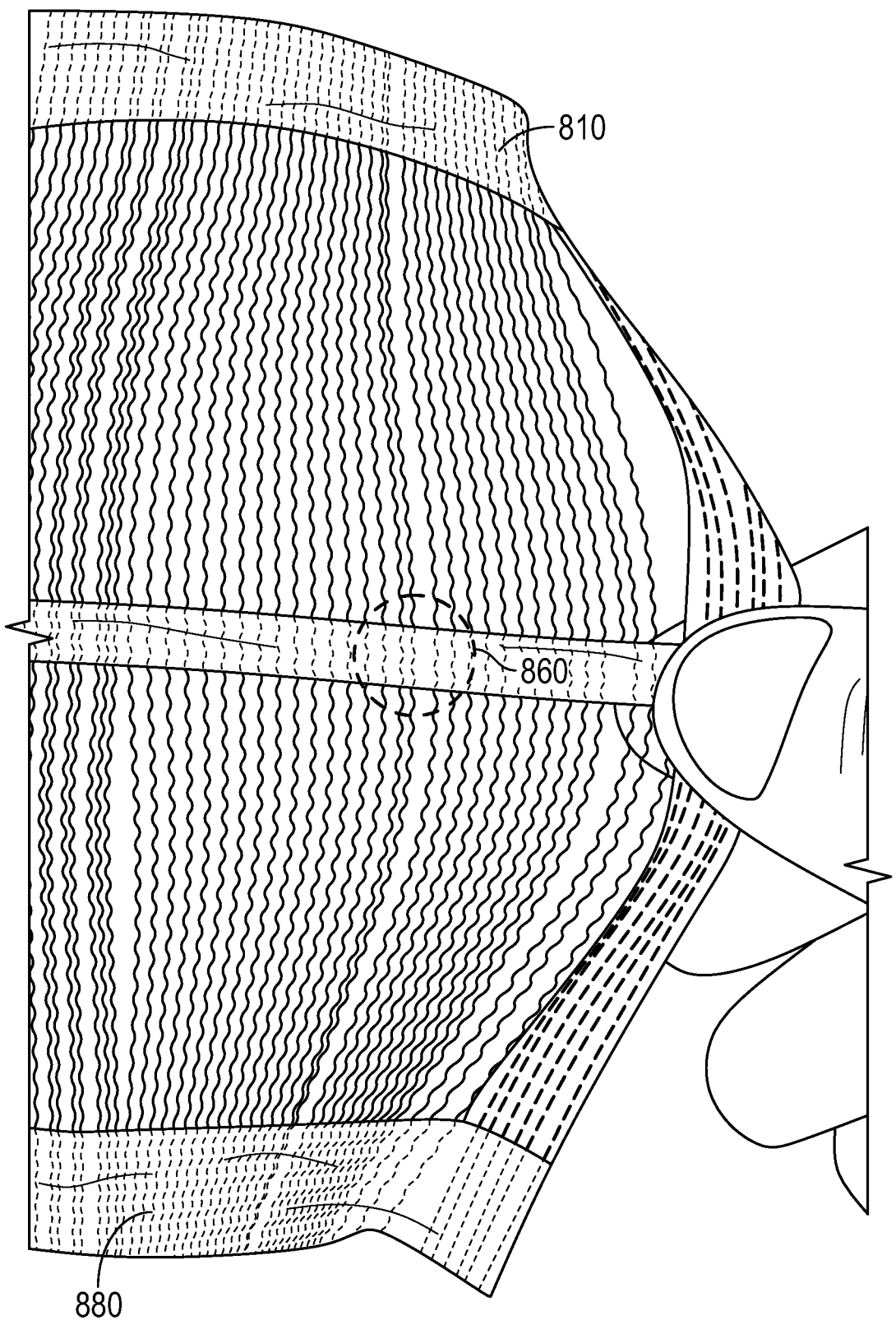

FIG. 8D shows in more detail one edge of the layer of resilient media of FIG. 8A with the center region 860 of constraining resilient composition laterally stretched (<-->) by outward pulling as depicted in FIG. 8C. The strands within the center regions of resilient constraining material are visible and separated by the stretching compared to their position in FIG. 8A. FIG. 8D illustrated separated resilient strands between constraining regions 810 and 860 and 880 when constraining region 860 is stretched or elongated outwardly (Θ→). Strands within constraining region 860 (depicted by dashed circle) were also separated by the elongation of 860.

Figure 8E:
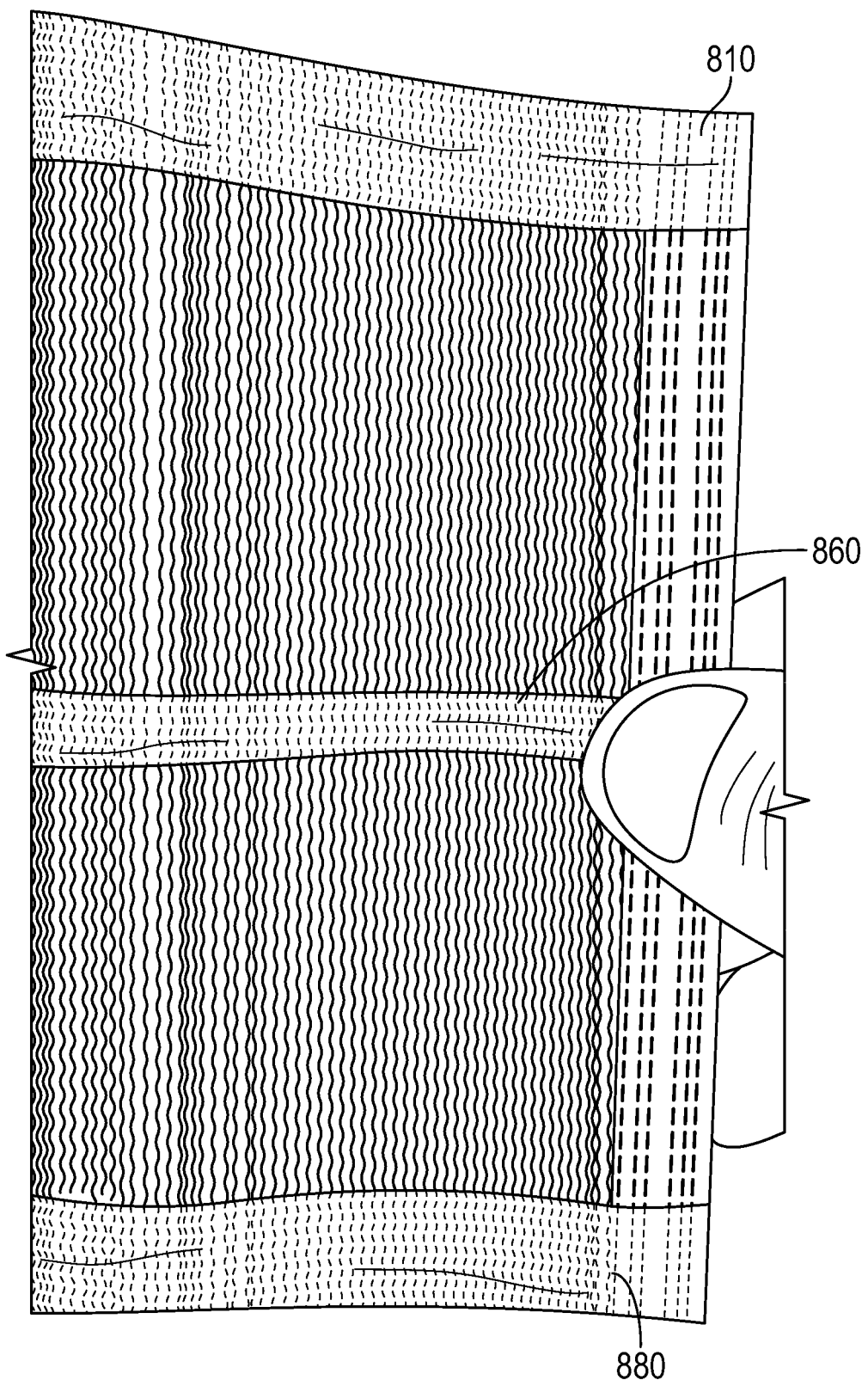

FIG. 8E illustrates the resilient media with resilient constraining regions 810, 860, and 880 in a relaxed and unstretched state following release of the outward stretching force that was applied to the center constraining region 860 in FIG. 8D. The resilient media in the stretched state in FIG. 8D was returned to the configuration shown in FIG. 8A by releasing the pulling tension as shown in FIG. 8E.

EXAMPLE 6

Two layers of the resilient media similar to that shown in Example 7 were placed one on top of the other to form a multilayer resilient plant development material.

Figure 14A:
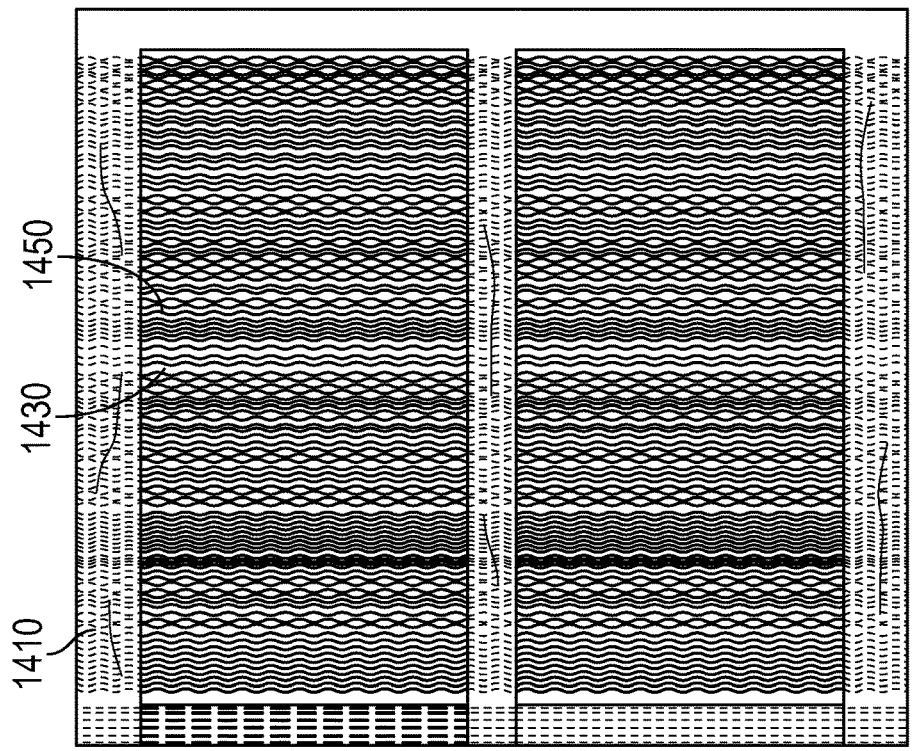
FIGS. 14A illustrates a single layer of resilient media.

FIG. 14A illustrates a single layer 1410 of a resilient media. FIG. 14A shows back light (white area between strands) that passed through openings 1430 between strands 1450 of the single layer of resilient media 1410. The strands were silicone coated glass fibers held in place in constraining regions by a white silicone material Dowsil™ 786.

FIG. 14B illustrate two layers of resilient media, 1410 and 1420, stacked together to create a resilient media having a mesh like structure with smaller flexible openings 1440 (light areas) and darker areas formed where the strands from layers 1410 and 1420 overlapped. The stack of resilient media 1410 and 1420 in FIG. 14B had improved light blocking properties, as illustrated by the darker appearance, compared to the single layer of resilient media 1410 in FIG. 14A. The two layers of resilient media in FIG. 14B were oriented relative to each other such that an axis defined by the openings or strands of the first layer 1410 were non-aligned relative to an axis defined by the openings or strands of the second layer 1420. In FIG. 14B the non-alignment of the axes of the openings or strands of first layer 1410 and second layer 1420 was about 90 degrees.

The openings such as 1440 were highly flexible and resilient and formed larger openings through the layers when strands in each layer were separated by an object. The two layers 1410 and 1420 were separable from one another.

EXAMPLE 7

Algae growth is concern for indoor farming because it can cause large scale algae build up on the plant grow media and fluid delivery system components. Algae also competes with developing plants for nutrients. For an aeroponic growth system using a relatively high surface area fleeced polyester grow media, large amounts of algae were found in the nutrient delivery system pipes along with nozzle plugging being a common issue.

Figure 10:
FIG. 10. illustrates a resilient media with openings after plant development and partial harvest.

FIG. 10 is an image of two layers of resilient media with elongated openings (upper layer has horizontal, left to right elongated openings, not depicted) after plant development and partial harvest. Algae growth was not visible (absent green algae film) on the black strand surfaces 1010 or the white constraining regions 1012 of this harvested region. The resilient media was formed from two separate layers of resilient media whose strands were oriented 90 degrees to each other and the layers were clamped together.

FIG. 11 and FIG. 12 shows the result of an algae growth test after 4 days and 7 days respectively for samples of pond water positioned in containers with or without various grow media under a grow light. A reusable silicone double sheet (two layers of resilient media with strands positioned about 90 degrees relative to each other) with openings and dark opaque silicone coated fibers or strands was compared to an opaque non-woven material (a plant development media) and controls (no media) for light transmission and ability to reduce or inhibit algae growth using pond water. The two different media samples, "silicone mat 2 layers" or silicone double sheet (sheet strands oriented 90 degrees to each other), the opaque "non-woven" grow media material, were placed on top of the open cups with pond water and exposed along with the control cups (no media or cover) to a grow light above the cups.

FIG. 11 shows the result of the algae growth test after 4 days under the grow light. The cups are shown with the media removed from top of the cups after the 4 days of light treatment. After four days, the liquid in the cups 1110 and 1120 that had been covered by the 2 layers of silicone mat were clear (e.g. appear white due to the white cup bottom and absence of visible algae in the drawing images); the liquid in the two control (no cover) cups 1130 and 1150 and the cup 1140 covered by the opaque non-woven material had a light green color (e.g appear light gray but cup bottom is still visible in the drawing images) indicative of algae growth and there was some green (dark) sediment that had accumulated in the bottom of these cups 1130, 1140, and 1150.

FIG. 12 shows the result of the pond water in the cups after seven days grow light exposure. The cups are shown with the media removed from top of cups after the 7 days of light treatment. After seven days, the liquid in the cups 1210 and 1220 that had been covered by the 2 layers of silicone mat were clear (e.g. appear white due to the cup bottom and absence of visible algae in the drawing images); the liquid in the two control (no cover) cups 1230 and 1250 and the cup 1240 covered by the opaque non-woven material had a light green color (e.g appear light gray but cup bottom was still visible in the drawing images) indicative of algae growth and there was some green (dark) sediment that had accumulated in the bottom of these cups 1230, 1240, and 1250. The lighting exposure for the additional 3 days resulted in an increase in algae indicated qualitatively by darker green (darker gray in drawing images) color of liquid and greater amounts of solids on bottom of several of the cups 1230, 1240, and 1250 compared to the respective cups 1130, 1140, and 1150 after only 4 days of grow light exposure as shown in FIG. 11.

As shown by the results in FIGS. 11 and 12 after exposure of the cup pond water contents to the grow light, the cups covered with non-woven opaque material showed a substantial amount of algae growth as did the control cups without any media cover as indicated by the greenish color (grayer shade) of the liquid and green (dark) residues in the cup bottoms. The cups that were covered with the resilient silicone media with openings showed little or only minor algae growth as indicated by the substantially clear liquid and little or no residue in the cup bottoms. (Note, small specks of algae were in original sample of water).

Figure 13:
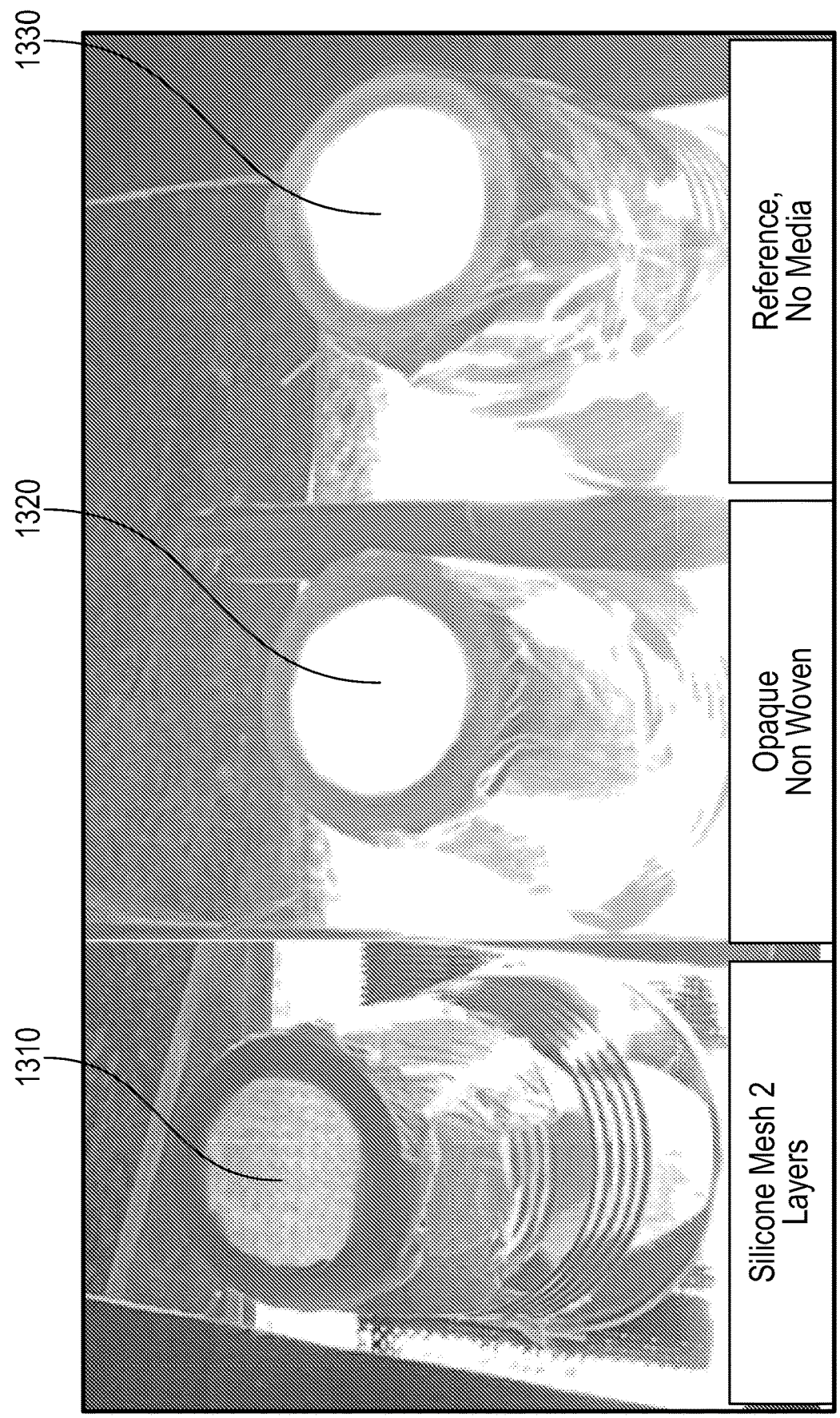
FIG. 13 illustrates light transmission test results.

FIG. 13 show the results of light transmission through: two layers of resilient media in a non-aligned (90 degree) positioning of the openings and strands of the two layers 1310, an opaque non-woven 1320, and a control (no media) 1330. The media were positioned below the cups. The closed end of the cups were cut open and an opaque tissue paper taped to them. The light source was positioned below the cups and was below the media. FIG. 13 shows qualitatively that the two layers of resilient mesh below cup 1310 transmitted less light than the opaque non-woven media below cup 1320 or the control cup 1330 (no media) as indicated by the darker appearance of the tissue paper on the cup 1310 with the two layers of resilient mesh compared to the other two cups 1320 and 1330.

The results of this example show that compared to a non-woven media and control samples, the resilient media with openings in the two layers was effective in reducing light transmission when the strands of the first layer and the strands of the second layer were in a non-aligned orientation relative to each other.

The following clauses define additional aspects and embodiments of the disclosure.

Clause 1. A multilayer resilient media, comprising: (a) a first layer that includes a plurality of strands that are in substantially parallel alignment; (b) a second layer that includes a plurality of strands that are in substantially parallel alignment and that is in stacked relation relative to the first layer; and wherein the strands of the first layer and the strands of the second layer are in a non-aligned orientation relative to each other;

the plurality of strands in at least one of the first layer and the second layer are constrained at least at a first position and at a second position spaced from the first position; and, wherein each of the layers includes a plurality of strands that are adjacent and an unconstrained length of the strands has a length that is greater than the spacing between adjacent strands at or near the constraining positions.

Clause 2: The multilayer resilient media of clause 1 wherein the unconstrained length of strands is at least five times the spacing between the adjacent strands at or near the constraining region.

Clause 3: The multilayer resilient media of clause 1, or 2 wherein each of the layers includes a plurality of strands that are adjacent, and wherein the strands of the layers are angularly oriented relative to each other.

Clause 4. The multilayer resilient media as in any of clauses 1-3 wherein the layers are separable and the unconstrained length of the plurality of adjacent strands between the first position and the second position in the layer is between 100 and 500 times the spacing between adjacent strands at the constraining positions.

Clause 5: A multilayer resilient media, comprising: (a) a first layer that includes a plurality of strands that are in substantially parallel alignment; (b) a second layer that includes a plurality of strands that are in substantially parallel alignment and that is in stacked relation relative to the first layer; and wherein the strands of the first layer and the strands of the second layer are in a non-aligned orientation relative to each other.

Clause 6: The multilayer resilient media according to clause 5, wherein the strands in the first layer, the second layer, or both layers are resilient and continuous between the first and second positions.

Clause 7: The multilayer resilient media as in any one of clauses 5-6, wherein the plurality of strands in at least one of the first layer and the second layer are in spaced, side-by-side relation and the spacing between adjacent longitudinal strands in unconstrained positions of the resilient media is between 0.3 millimeter to 2 millimeters and the lengthwise dimension of the strands is between 10 millimeters and 100 millimeters.

Clause 8: The multilayer resilient media as in any one of clauses 5-7, wherein the plurality of strands in at least one of the first layer and the second layer are constrained at least at a first position and at a second position spaced from the first position.

Clause 9: The multilayer resilient media as in any one of clauses 5-8, wherein a length of at least one of the constrained plurality of strands extends between the first position and the second position.

Clause 10: The multilayer resilient media as in any one of clauses 5-9, wherein the plurality of strands in at least one of the first layer and the second layer are constrained at a plurality of spaced positions.

Clause 11: The multilayer resilient media according to any one of clauses 5-10, wherein each of the first layer and the second layer are adapted to be handled separately.

Clause 12: The multilayer resilient media according to any one of clauses 5-11, wherein the first layer is joined relative to the second layer.

Clause 13: A multilayer resilient media according to any one of clauses 5-11, wherein the first layer is fixedly joined relative to the second layer.

Clause 14: A multilayer resilient media according to any one of clauses 5-11, wherein the first layer is detachably joined relative to the second layer.

Clause 15: A multilayer resilient media according to any one of clauses 5-14, wherein the plurality of strands in at least one of the first layer and the second layer are constrained at least at a first position and at a second position spaced from the first position, said plurality of strands form openings sized to pass developed plant leaves and stems therethrough, and wherein at least one constraining position is resilient.

Clause 16: A resilient media, comprising: a first layer that includes a plurality of adjacent non-absorbent strands having an initial orientation, said strands constrained at two or more separate constraining positions across a length of the strands, an unconstrained length of the first layer strands is at least five times the spacing between the adjacent strands at or near the constraining positions;

a second layer that includes a plurality of adjacent strands non-absorbent strands having an initial orientation, said strands constrained at two or more separated constraining positions across a length of the strands, an unconstrained length of the second layer strands is at least five times the spacing between the adjacent strands at or near the constraining positions, said second layer is in a stacked relation relative to the first layer; and wherein the strands of the first layer and the strands of the second layer are in a non-aligned orientation relative to each other.

Clause 17: The resilient media according to clause 16, wherein one of more of the strands are resilient, one or more of the constraining positions are resilient, or any combination of strands and constraining positions are resilient.

Clause 18: The resilient media according to clauses 16 or 17, said resilient media further comprising elongated openings between one or more of the adjacent strands in at least one of the first layer or the second layer.

Clause 19: The resilient media as in any one of clauses 16-18, wherein the strands have surface features or texture.

Clause 20: The resilient media as in any one of clauses 16-19, wherein the non-absorbent strands comprise an elastomeric coating and a core fiber.

Clause 21: The resilient media as in any one of clauses 16-20, wherein the layers are in contact with adjacent layers, separated by a film of nutrient solution or water, contain nutrient solution or water within openings of the first or second layer, or any combination of these.

Clause 22: A method comprising: developing plants on a resilient media comprising a layer of strands that bend laterally and form openings, and harvesting the plants at a desired stage of growth.

Clause 23: The method of clause 22 wherein said resilient media comprises two or more layers comprising strands that bend laterally and form openings, and wherein the strands of at least two of the layers are in a non-aligned orientation relative to each other.

Clause 23: The method as in any one of clauses 21 or 22, further comprising: removing a top layer of the resilient media after harvest; and, re-growing or re-developing the remaining stems and secondary leaves supported by a lower layer for a subsequent crop.

Clause 24: The method of clause 23 further comprising harvesting the re-developed plants; and, optionally removing a top layer of the resilient media after harvest and re-growing or re-developing the remaining stems and secondary leaves for a second subsequent crop.

Clause 25: The method as in any one of clauses 21-24, wherein the top layer of the resilient media that is removed comprises plant debris from a harvest.

Clause 26: A method comprising: developing plants on a resilient media as in any one of clauses 1-24, or 29-34 comprising a hydroponic, aeroponic, or nutrient thin film technique; harvesting the plants at a desired stage of growth; removing a first light facing layer of the resilient media after harvest; and, re-growing or re-developing the remaining stems and secondary leaves supported by a second layer of resilient media for a second harvest.

Clause 27: The method of clause 26 further comprising harvesting the re-developed plants; and optionally removing the second layer of the resilient media after harvest; and, re-growing or re-developing the remaining stems and secondary leaves for a third subsequent harvest.

Clause 28: The method as in any one of clauses 26-27, wherein the layer of the resilient media that is removed comprises plant debris from the harvest.

Clause 29: The resilient media as in any one of clauses 1-20, wherein the layers are in contact with adjacent layers and separated by a film of nutrient solution or water, contain nutrient solution or water within openings of the first or second layer, or any combination of these, and the length of the strands between constraining positions in the first light facing layer is greater than the length of the strands between constraining positions in the second layer.

Clause 30: A resilient media, comprising: a layer that comprises a plurality of adjacent and laterally bendable strands having an initial orientation, said laterally bendable strands constrained at two or more separate constraining positions across a length of the strands.

Clause 31: The resilient media of clause 31 wherein the unconstrained length of the plurality of adjacent strands between the first position and the second position in the layer is between 100 and 500 times the spacing between adjacent strands at the constraining positions.

Clause 32: The resilient media of clauses 30 or 31 further comprising a second layer of resilient media that comprises a plurality of adjacent and laterally bendable strands having an initial orientation, said laterally bendable strands of the second layer constrained at two or more separate constraining positions across a length of the strands, said second layer in a stacked relationship with the first layer, and wherein strands of the first layer cross the strands of the second layer to form resilient and flexible openings between the first layer and the second layer, strands from each layer form two sides of each said opening.

Clause 33: The resilient media as in any one of clauses 30-32, said strands comprising the first layer cover portions of openings formed by separating strands in the second layer, and strands comprising the second layer cover portions of openings formed by separating strands in the first layer, the openings in the first layer and the openings in the second layer form flexible passages through the resilient media.

Clause 34: The resilient media as in any one of clauses 30-33, wherein the first and second layers are in contact with each other, or wherein the first and second layers are separated by a film of nutrient solution or water, or wherein the first and second layers contain nutrient solution or water within openings of the first layer or second layer, or any combination of these.

Clause 33: A kit for use in developing plants, the kit comprising a first resilient media layer comprising a plurality of adjacent and laterally bendable strands having an initial orientation, said laterally bendable strands constrained at two or more separate constraining positions across a length of the strands, a second resilient media layer comprising a plurality of adjacent and laterally bendable strands having an initial orientation, said laterally bendable strands constrained at two or more separate constraining positions across a length of the strands, and a support tray.

Clause 34: A resilient media comprising: a layer that comprises a plurality of adjacent and laterally bendable strands having an initial orientation, said laterally bendable strands constrained at two or more separate constraining positions across a length of the strands.

Clause 35: The resilient media of clause 34, wherein a length of the plurality of adjacent strands between the two or more separate constraining positions is greater than a spacing between the adjacent strands at the constraining positions.

Clause 36: The resilient media as in clause 34 or 35 comprising strands, constraining positions, or combinations of these that are resilient.

Clause 37: The soilless growth media as in any one of clauses 34-36 wherein the plurality of strands constrained between the two or more constraining positions are strands that are positioned within 2 strand cross sections or less above or below a plane or straight edge positioned across the first and second constraining positions.

Clause 38: The resilient media as in any one of clauses 34-37 comprising strands that are non-absorbent for water.

Clause 39: The resilient media as in any one of clauses 34-38 wherein the strands comprise a core.

Clause 40: The resilient media as in any one of clauses 34-39 wherein a length of the plurality of adjacent strands between the two or more separate constraining positions is greater than five times a spacing between the adjacent strands at the constraining positions.

Clause 41: The resilient media as in any one of clauses 34-40 wherein the strands comprise an elastomer.

Clause 42: The resilient media as in any one of clauses 34-41 wherein the resilient media is a plant growth media.

Clause 43: A method of germinating seeds comprising: positioning seeds on a first layer of the resilient media as in any one of clauses 34-41; placing a second layer of the resilient media as in any one of clauses 34-41 in a stacked relationship atop the first layer with the seeds thereon; and, germinating the seeds between the two layers to develop seedlings.

Clause 44: The method of clause 43 wherein the roots of the seedlings protrude between the adjacent strands of the first layer and the shoot portion of the seedlings protrude between the adjacent strands of the second layer atop the first layer.

Clause 45: The method as in any one of clauses 43-44 further comprising the act or step of watering the seeds or seedlings.

Clause 46: The method as in any one of clauses 43-45 wherein the spacing between constraining regions in second layer of resilient media is different than the spacing between constraining regions in the first layer of resilient media.

Approximating language, as used herein throughout the specification and claims, may be applied to modify any quantitative or qualitative representation that could permissibly vary without resulting in a change in the basic function to which it is related. Accordingly, a value modified by a term such as "about" or numerical ranges is not to be limited to a specified precise value, and may include values that differ from the specified value. In at least some instances, the approximating language may correspond to the precision of an instrument for measuring the value.

It will be apparent to those skilled in the art that various modifications and variations can be made in the method and system of the present disclosure without departing from the spirit or scope of the disclosure. Thus, it is intended that the present disclosure include modifications and variations that are within the scope of the appended claims and their equivalents.

While the disclosure has been described in detail in connection with only a limited number of aspects and embodiments, it should be understood that the disclosure is not limited to such aspects. Rather, the disclosure can be modified to incorporate any number of variations, alterations, substitutions, or equivalent arrangements not heretofore described, but which are commensurate with the scope of the claims. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of developing and harvesting plants, the method comprising:
    positioning a first layer of a resilient media on a second layer of the resilient media, wherein the first layer includes a plurality of strands and the second layer includes a plurality of strands, wherein the plurality of strands of the first layer are in a non-aligned orientation relative to the plurality of strands of the second layer, and wherein the plurality of strands of each of the first and second layers are separable to form openings between respective strands;
    developing plants on the second layer, or between the first layer and the second layer, of the resilient media;
    harvesting the developing plants such that plant portions remain and extend through the openings in the first layer of the resilient media; and
    removing the first layer of the resilient media from the second layer of the resilient media, wherein during removal of the first layer from the second layer, the plurality of strands of the first layer separate to form the openings through which the plant portions pass.

2. The method of claim 1, wherein an unconstrained length of the plurality of strands of each of the first and second layers has a length that is greater than spacing between adjacent strands at or near constraining positions.

3. The method of claim 1, further comprising re-developing the remaining plant portions for a subsequent harvest.

4. The method of claim 1, wherein the second layer is a lower layer, and the method further comprises:
    re-developing the remaining plant portions supported by the lower layer for a subsequent crop.

5. The method of claim 4, wherein the first layer is a top layer, and wherein the top layer comprises plant debris from the harvesting.

6. A method of developing and harvesting plants, the method comprising:
    positioning a first layer of a resilient media on a second layer of the resilient media such that the first and second layers are in a stacked relation relative to each other, wherein the first layer includes a plurality of adjacent strands and the second layer includes a plurality of adjacent strands, wherein the plurality of adjacent strands of each of the first and second layers are separable to form openings between respective strands;
    developing plants on the second layer, or between the first layer and the second layer, of the resilient media;
        wherein the plurality of adjacent strands of the first layer and the plurality of adjacent strands of the second layer are in a non-aligned orientation relative to each other, the plurality of adjacent strands in the first layer and the plurality of adjacent strands in the second layer can move independently of strands in the same first or second layer and the strands in each of the first and second layers can move independently of strands in the other respective first or second layer; and
        wherein each of the plurality of adjacent strands in at least one of the first layer and the second layer are constrained at least at a first position and at a second position spaced from the first position, an unconstrained length of the plurality of adjacent strands extends between the first position and the second position;
    harvesting the developing plants at a desired stage of growth such that plant portions remain and extend through the openings in the first layer of the resilient media;
    removing the first layer of the resilient media from the second layer of the resilient media after harvesting, wherein during removal of the first layer from the second layer, the plurality of adjacent strands of the first layer separate to form the openings through which the plant portions pass; and
    re-developing the remaining plant portions supported by the first layer of the resilient media for a subsequent harvest.

* * * * *